US011494708B2

(12) United States Patent
Hashimoto

(10) Patent No.: US 11,494,708 B2
(45) Date of Patent: Nov. 8, 2022

(54) RESOURCE RESERVATION SYSTEM, RESOURCE RESERVATION METHOD, AND INFORMATION PROCESSING APPARATUS

(71) Applicant: Takahiro Hashimoto, Kanagawa (JP)

(72) Inventor: Takahiro Hashimoto, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 384 days.

(21) Appl. No.: 16/582,333

(22) Filed: Sep. 25, 2019

(65) Prior Publication Data

US 2020/0104760 A1    Apr. 2, 2020

(30) Foreign Application Priority Data

Sep. 27, 2018  (JP) .............................. JP2018-182885
Jun. 28, 2019  (JP) .............................. JP2019-122467

(51) Int. Cl.
*G06Q 10/02*  (2012.01)
*G06Q 10/10*  (2012.01)
*G06Q 10/06*  (2012.01)

(52) U.S. Cl.
CPC ....... *G06Q 10/02* (2013.01); *G06Q 10/06313* (2013.01); *G06Q 10/107* (2013.01); *G06Q 10/1095* (2013.01)

(58) Field of Classification Search
CPC ............. G06Q 10/02; G06Q 10/06313; G06Q 10/107; G06Q 10/1095; G07C 9/00

(Continued)

(56) References Cited

U.S. PATENT DOCUMENTS 7,743,120 B2    6/2010  Takagi
8,204,990 B1 *  6/2012  Avery ................. H04L 12/4625
                                                            709/224

(Continued)

FOREIGN PATENT DOCUMENTS

JP    H05-342213    12/1993
JP       3919721     5/2007

(Continued)

OTHER PUBLICATIONS

Jose, Nitin, et al., Connection Rerouting/Network Reconfiguration, DRCN, IEEE Xplore, 2003, pp. 25-26 (Year: 2003).*

(Continued)

*Primary Examiner* — Emmett K. Walsh
(74) *Attorney, Agent, or Firm* — IPUSA, PLLC

(57) ABSTRACT

A resource reservation system for processing a resource reservation includes an information processing terminal associated with a resource and be capable of receiving a use start operation of starting using the resource, and the information processing apparatus configured to include reservation information including a use start time of day, transmit the reservation information to the information processing terminal in response to a periodic request from the information processing terminal, and receive a use start notification from the information processing terminal in a case where the information processing terminal receives the use start operation, wherein the information processing apparatus does not perform the cancel of the reservation information if the periodic request from the information processing terminal is not received within the constant time and even if the use start notification is not received within the predetermined time from the use start time of day.

14 Claims, 24 Drawing Sheets

(58) Field of Classification Search
USPC .......................................................... 705/5
See application file for complete search history.

(56) References Cited

U.S. PATENT DOCUMENTS

| | | | |
|---|---|---|---|
| 8,352,296 B2* | 1/2013 | Taneja | G06Q 10/109 |
| | | | 705/5 |
| 8,659,779 B2 | 2/2014 | Hashimoto | |
| 8,669,844 B2* | 3/2014 | Walker | G06Q 10/109 |
| | | | 340/6.1 |
| 8,908,196 B2 | 12/2014 | Hashimoto | |
| 8,988,722 B2 | 3/2015 | Hashimoto | |
| 9,146,697 B2 | 9/2015 | Hashimoto | |
| 9,292,232 B2 | 3/2016 | Toriumi et al. | |
| 9,710,432 B2 | 7/2017 | Hashimoto | |
| 9,712,710 B2 | 7/2017 | Hashimoto | |
| 9,830,624 B2* | 11/2017 | Thye | H04L 47/822 |
| 10,057,434 B2 | 8/2018 | Hashimoto | |
| 10,129,428 B2 | 11/2018 | Matsushima et al. | |
| 2007/0162315 A1* | 7/2007 | Hodges | G06Q 10/0631 |
| | | | 705/7.12 |
| 2016/0085768 A1 | 3/2016 | Hashimoto | |
| 2016/0216975 A1 | 7/2016 | Hashimoto | |
| 2017/0357917 A1* | 12/2017 | Holmes | G06Q 10/02 |
| 2018/0088883 A1 | 3/2018 | Hashimoto | |
| 2018/0324310 A1 | 11/2018 | Hashimoto | |
| 2019/0012614 A1 | 1/2019 | Yamada et al. | |
| 2021/0058734 A1* | 2/2021 | Nakano | H04W 4/021 |
| 2021/0142246 A1* | 5/2021 | Karlsson | G06Q 10/0631 |
| 2021/0192396 A1* | 6/2021 | Morita | G06F 1/14 |

FOREIGN PATENT DOCUMENTS

| | | |
|---|---|---|
| JP | 2009-217706 | 9/2009 |
| JP | 2012-165166 | 8/2012 |
| JP | 2016-004511 | 1/2016 |
| JP | 2017-157200 | 9/2017 |

OTHER PUBLICATIONS

Wolf, L.C., Steinmetz, R. (1998). Concepts for Resource Reservation in Advance. In: Furht, B. (eds) Multimedia Technologies and Applications for the 21st Century. The Springer International Series in Engineering and Computer Science, vol. 431 https://doi.org/10.1007/978-0-585-2876 (Year: 1998).*

U.S. Appl. No. 16/295,346, filed Mar. 7, 2019.

* cited by examiner

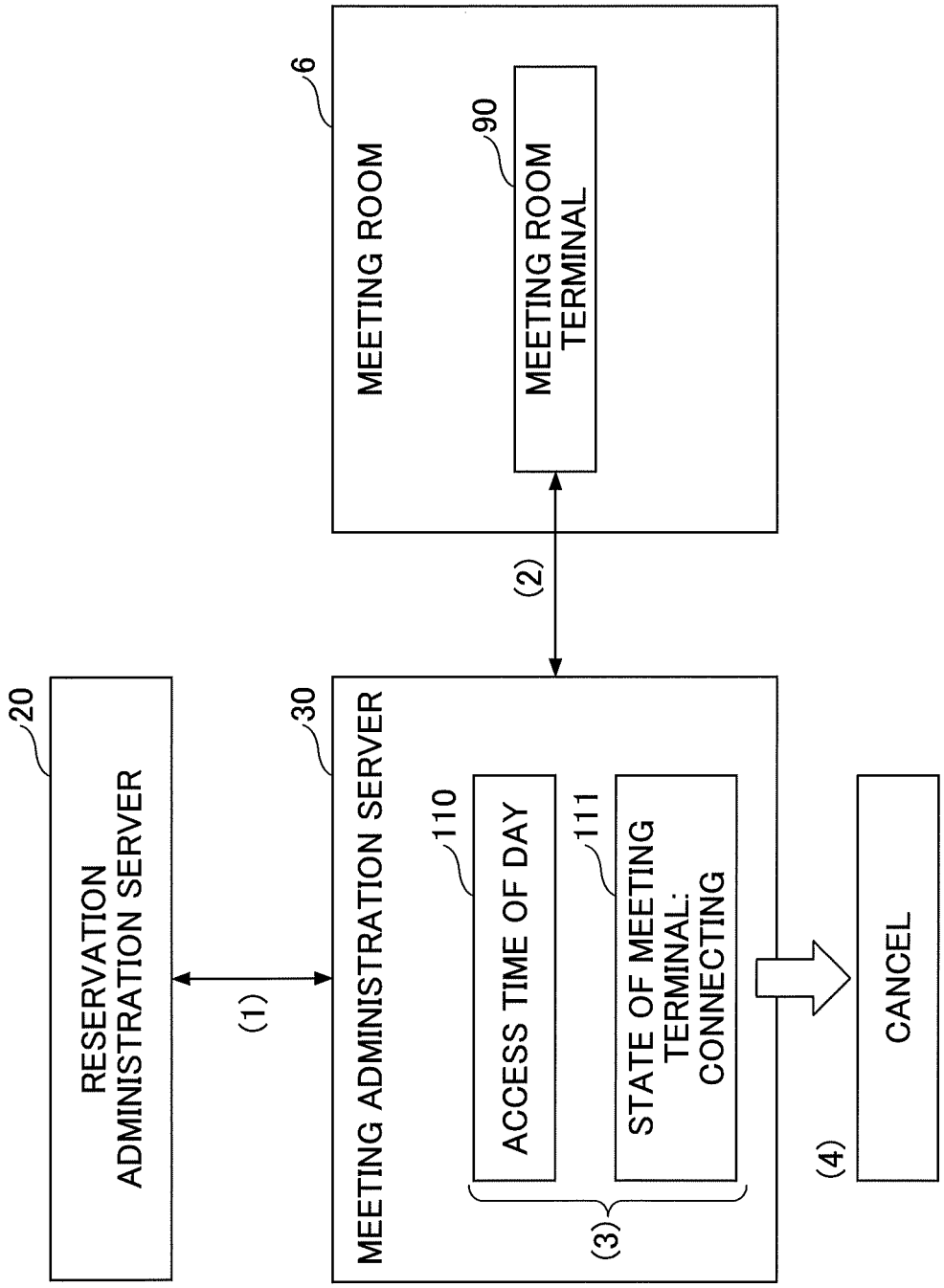

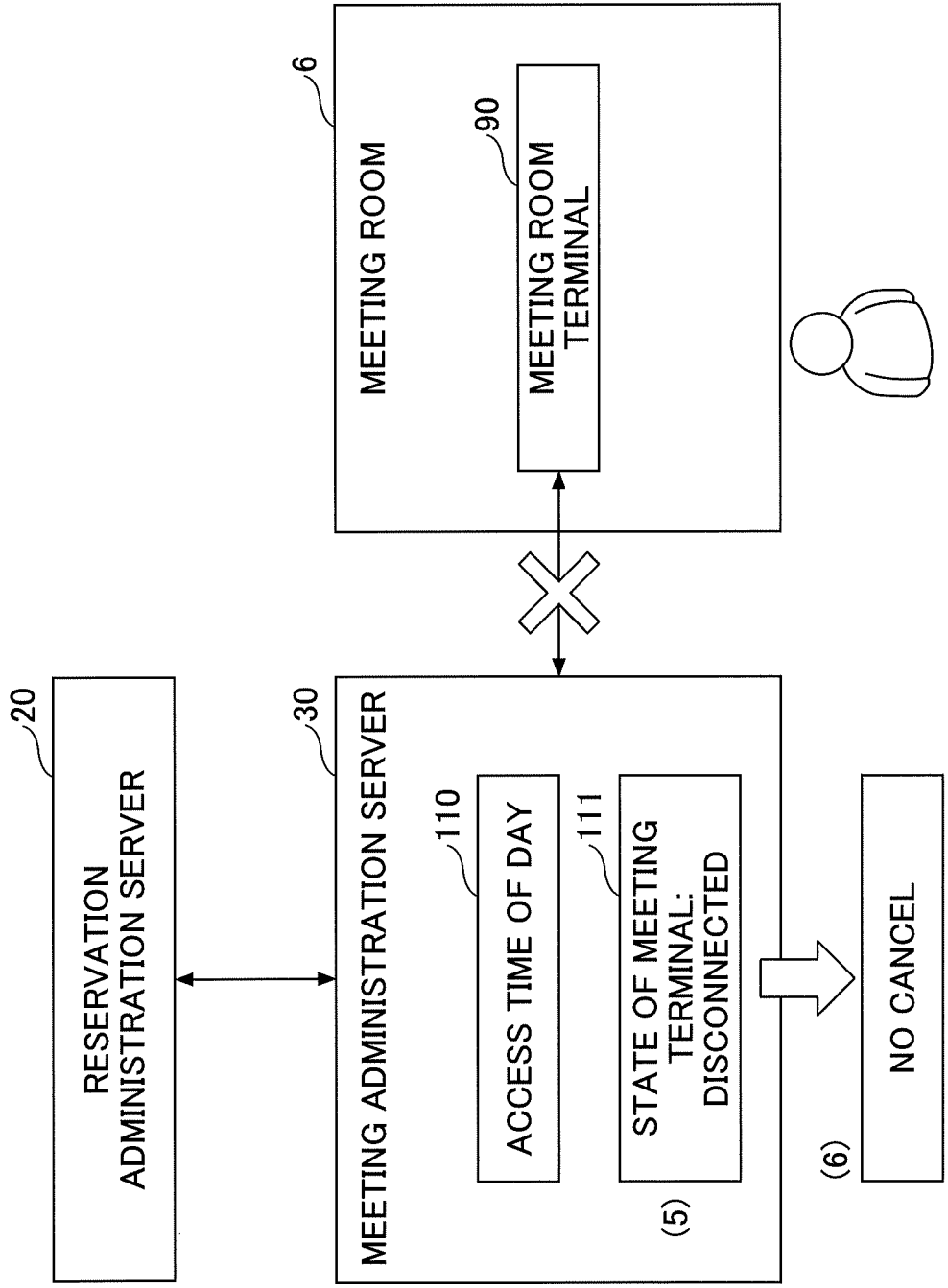

FIG.20

2019/05/14 (TUESDAY) 16:02

MEETING ROOM ADMINISTRATION SERVICE

NOTIFICATION OF CONNECTING STATE OF MEETING ROOM TERMINAL

DESTINATION sample.taroh@xxx.co.jp

CONNECTION STATE OF TERMINAL HAS BEEN CHANGED.

[MEETING ROOM WHERE DISCONNECTED IN TERMINAL OCCURS] 801

| FINAL CONNECTION TIME OF DAY | MEETING ROOM NAME | TERMINAL ID |
|---|---|---|
| 4/5/2019 10:52:56 PM | MEETING ROOM A | AAAA |
| 4/5/2019 04:00:04 PM | MEETING ROOM B | BBBB |

[MEETING ROOM WHERE CONNECTION IN TERMINAL IS RETRIEVED] 802

| FINAL CONNECTION TIME OF DAY | MEETING ROOM NAME | TERMINAL ID |
|---|---|---|
| 5/14/2019 12:24:37 PM | MEETING ROOM A | AAAA |

THIS IS AUTOMATIC TRANSMISSION MAIL FROM SYSTEM.
REPLY TO THIS MAIL WILL NOT BE RECEIVED.

RESOURCE RESERVATION SYSTEM, RESOURCE RESERVATION METHOD, AND INFORMATION PROCESSING APPARATUS

CROSS-REFERENCE TO RELATED APPLICATIONS

This application is based on and claims priority to Japanese Patent Application No. 2018-182885, filed on Sep. 27, 2018, and Japanese Patent Application No. 2019-122467, filed on Jun. 28, 2019, the entire contents of which are incorporated herein by reference.

BACKGROUND OF THE INVENTION

1. Field of the Invention

The present invention relates to a resource reservation system, resource reservation method, and information processing apparatus.

2. Description of the Related Art

A resource reservation system for administering reservations of a resource such as a meeting room is known. A reservation person, such as a prospective participant of a meeting, can make a terminal device communicate with an information processing apparatus, such as a reservation administration server, and reserve a resource, such as a meeting room, in a browser operated in the terminal device. An information processing terminal, such as a meeting room terminal, is installed in the meeting room to accept a check-in. When the reservation person checks in by operating the information processing terminal, the information processing terminal transmits this event to the information processing apparatus.

A technique of receiving a check-in for a meeting room by an information processing terminal is devised (see, for example, Patent Document 1). Patent Document 1 discloses an information processing terminal which receives a check-in by reading the IC card of a reservation person with an IC card reader.

[Patent Document 1] Japanese Laid-Open Patent Application No. 2016-4511

SUMMARY OF THE INVENTION

A resource reservation system for processing a resource reservation includes a hardware information processing terminal associated with a resource and be capable of receiving a use start operation of starting using the resource, and the hardware information processing apparatus configured to include reservation information including a use start time of day, transmit the reservation information to the hardware information processing terminal in response to a periodic request from the hardware information processing terminal, and receive a use start notification of starting using the resource from the hardware information processing terminal in a case where the hardware information processing terminal receives the use start operation, wherein the hardware information processing apparatus performs cancel of the reservation information if the periodic request from the hardware information processing terminal is received within a constant time and if the use start notification is not received within a predetermined time from the use start time of day, and does not perform the cancel of the reservation information if the periodic request from the hardware information processing terminal is not received within the constant time and even if the use start notification is not received within the predetermined time from the use start time of day.

BRIEF DESCRIPTION OF DRAWINGS

FIGS. 2A and 2B illustrate processes corresponding to a communication state of a meeting room terminal and a meeting administration server.

FIG. 13 is an example of a sequence diagram illustrating a process when a reservation person checks in.

FIG. 20 is a diagram illustrating an example of the text surface of an email that a mail transmission unit sends to an administrator, etc.

DETAILED DESCRIPTION OF THE PREFERRED EMBODIMENTS

Figure 1:
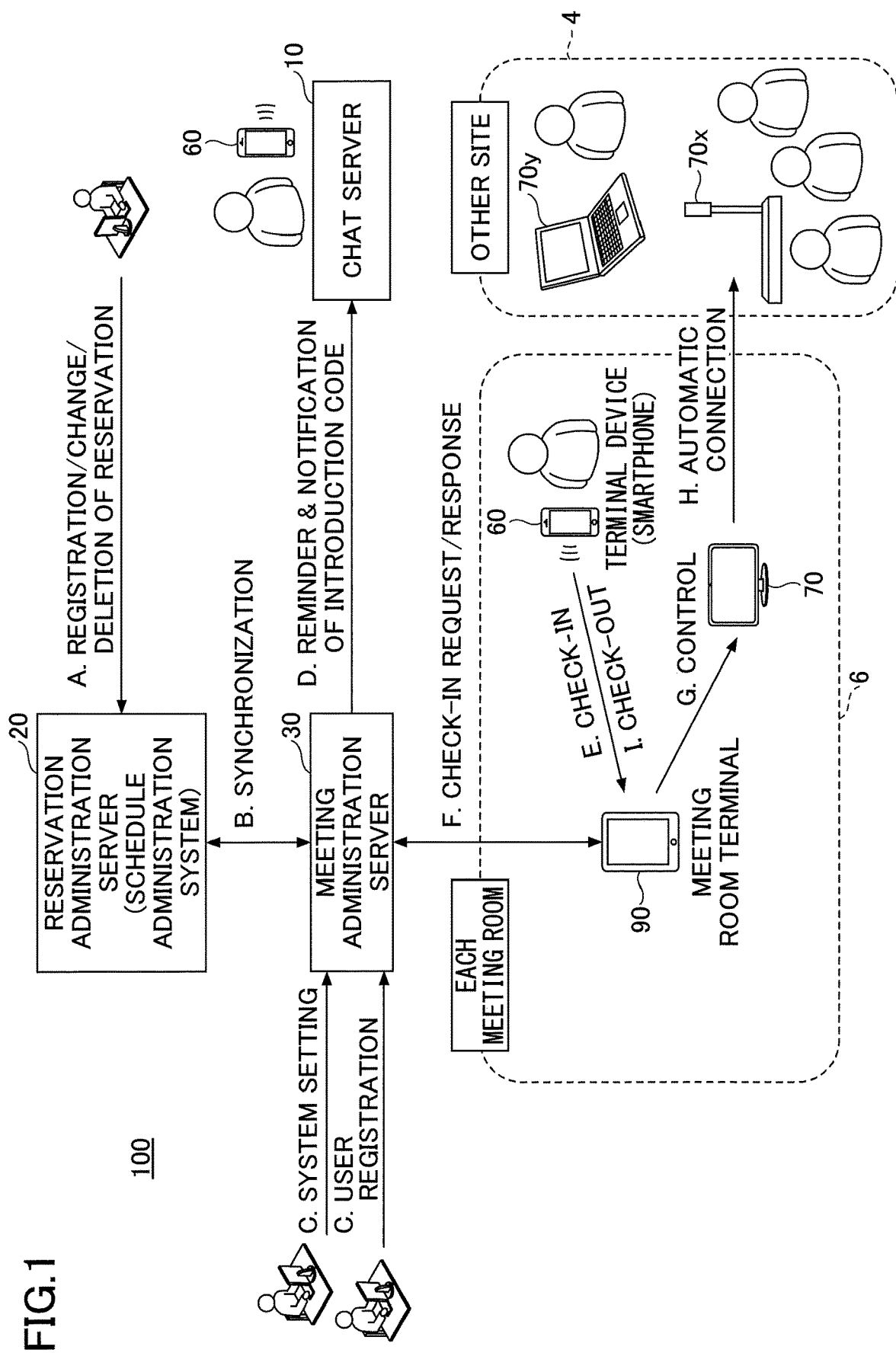
FIG. 1 illustrates an example of an overall operation of a resource reservation system.

However, in this technique, there has been a problem in that the reservation of resource is canceled when the information processing terminal cannot communicate with the information processing apparatus. In other words, depending on the resource reservation system, the reservation of the meeting room may be canceled unless the reservation person checks in to the meeting room by a predetermined time.

When the information processing terminal cannot communicate with the information processing apparatus, the information processing apparatus cannot detect the check-in even if the reservation person operates the information processing terminal for the check-in. Therefore, depending on the operation policy, the reservation of the meeting room is canceled.

When the meeting room reservation is canceled, another user can attempt to use or reserve the meeting room in which the participant resides, which may cause double-reservation.

In view of the above problem, the present invention is to provide a resource reservation system for suppressing the reservation of resources from being canceled when the information processing terminal is unable to communicate with the information processing apparatus.

Hereinafter, as an example of the embodiment of the present invention, a resource reservation system and a resource reservation method performed by the resource reservation system will be described with reference to the drawings.

Reference symbols typically designate as follows:
6: Meeting room
10: Chat server
20: Reservation administration server
30: Meeting administration server
60: Terminal device
70: Electronic apparatus
90: Meeting room terminal
100: Resource reservation system

First Embodiment

<Summary of Resource Reservation System>

First, a resource reservation system is schematically described with reference to FIG. 1. FIG. 1 illustrates an example of the overall operation of the resource reservation system 100.

A. The reservation person operates his terminal device to communicate with the reservation administration server 20 and reserve a meeting room. The reservation administration server 20 is a general-purpose cloud service (Office 365, G Suite ("Office 365", "G Suite" are registered trademarks), etc.). A meeting room owned by an organization such as a company to which the reservation person belongs is registered.

B. The meeting administration server 30 is a server that controls the entire resource reservation system 100 based on the reservation situation of the meeting room.

Because the meeting administration server 30 appropriately communicates with the reservation administration server 20 to obtain reservation information, the meeting administration server 30 is synchronized with the reservation administration server 20.

C. The resource reservation system 100 or the administrator on the organizational side can register the user and perform various settings for the meeting administration server 30. User registration means the registration of a user who is notified using a chat server 10 (slack, Line, Microsoft Teams, etc.).

The notification is performed by the bot sending the message as the meeting administration server 30, the bot provided by the chat server is also registered. The various settings include registering the meeting room terminal 90 and setting the timing of reminders.

D. Meeting administration Server 30 reminds the reservation person of the holding of the meeting when it is predetermined time before the opening of the meeting in the reservation information. This will reduce the number of vacancies in meeting rooms.

The meeting administration server 30 also notifies the user of an invitation code as needed. The meeting reservation person stores information (meeting identification information) for checking in to the meeting room by receiving a reminder in the terminal device 60.

E. Meeting Rooms 6 has a meeting room terminal 90 (an example of an information processing terminal), and the meeting room terminal 90 downloads the reservation information that is made regularly in this meeting room. The meeting room terminal 90 may display a schedule for the day or the latest meeting to enable the participant to confirm the schedule. Shortly before the start time of day of the meeting, the reservation person of the meeting room goes to the meeting room 6 and checks in.

For example, the meeting identification information is input into the meeting room terminal 90, or the terminal device 60 is placed on the meeting identification information (for example, to cause the meeting identification information to be read or communicated).

Such an operation is called a check-in operation, and a check-in operation is an operation for starting a use of the meeting room.

F. The meeting room terminal 90 transmits a check-in request (notification of start of use) to the meeting administration server 30, if authentication is performed by the meeting identification information, a response indicating that the check-in has been completed is received from the meeting administration server 30.

The meeting room terminal 90 indicates that the meeting room is in meeting (using). If the check-in is not confirmed until a predetermined time from the start time of day, the meeting administration server 30 cancels the reservation of the meeting room 6 and transmits this issue as a status included in the reservation information to the meeting room terminal 90. In this case, because the meeting room terminal 90 indicates that this room is vacant, an arbitrary user can use the meeting room 6.

G. The meeting room terminal 90 controls the electronic apparatus 70 upon request from the meeting administration server 30. For example, the power is turned on at the start time of day and the power is turned off at the end of the meeting. This will improve the convenience of meeting participant in operating the electronic apparatus 70.

H. In a case where the electronic apparatus 70 has, for example, a teleconference function, it can communicate with the electronic apparatus (such as a teleconference terminal 70x) of another site 4 to hold a meeting with the other site. Further, the PC 70y for which the app operates can communicate with the electronic apparatus 70. The reservation information includes the destination information (the communication ID of the destination) indicating the other site in advance, and the electronic apparatus 70 can communicate with the teleconference terminal 70x and the PC 70y automatically.

I. When the reservation person closes the meeting, the button of the meeting room terminal 90 is clicked to check out, so the meeting room terminal 90 displays the next reservation status. This enables any user to know the reservation status of the meeting room.

<Summary of Operation for Cancellation of the Resource Reservation System>

FIGS. 2A and 2B are used to schematically explain the process for canceling the meeting room in a case where communication of the meeting room terminal 90 is difficult. FIG. 2 is a diagram illustrating a process according to a communication state between the meeting room terminal 90 and the meeting administration server 30.

First, FIG. 2A illustrates an operation when the communication between the meeting room terminal 90 and the meeting administration server 30 is normal.

(1) The meeting administration server 30 synchronizes the reservation administration server 20 with the meeting room reservation information.

(2) The meeting room terminal 90 periodically requests reservation information and acquires reservation information upon change.

(3) The meeting administration server 30 records the access time in response to regular communication with the meeting room terminal 90. While the access time of day is being recorded, the state of the meeting room terminal 90 is set to "connecting".

(4) When the state of the meeting room terminal 90 is "connected," and the meeting administration server 30 cannot receive the check-in request by the check-in time limit, the reservation may be determined not to be checked in by the reservation person. Therefore, the meeting administration server 30 cancels the reservation of the meeting room.

FIG. 2B illustrates an operation in which communication between the meeting room terminal 90 and the meeting administration server 30 cannot be performed. When communication between the meeting room terminal 90 and the meeting administration server 30 is impossible, the communication is not detected regardless of the cause.

(5) When it becomes impossible for the meeting administration server 30 to detect communication with the meeting room terminal 90, the access time is not updated. Therefore, the state of the meeting room terminal 90 is set to "disconnected".

(6) In this state, if the meeting administration server 30 is unable to receive the check-in request by the check-in time limit, the meeting administration server 30 does not cancel the meeting room.

Hence, it is possible to prevent the participant from automatically canceling the reservation even though it may exist in the meeting room. In addition, the meeting administration server 30 may be regarded as having been checked in by the reservation person.

As described above, the resource reservation system 100 of this embodiment can prevent automatic cancel when the meeting administration server 30 and the meeting room terminal 90 cannot communicate with each other.

Terminology

A meeting room, equipment, devices, people (reception) and s structure that can be used in the meeting room are called a resource. Sometimes a resource that is difficult to move, such as a meeting room, is called facility. In this embodiment, the term "meeting room" is used as an example of a resource.

The participant is who attends the meeting. The reservation person means the person who made the reservation for the meeting room. In general, the reservation person is one of the participants, so it may be unnecessary to strictly distinguish between the two. In this embodiment, the work performed by the reservation person may be performed by the participant. A person who uses the meeting room as a whole is simply called a user.

<Example of System Configuration>

Figure 3:
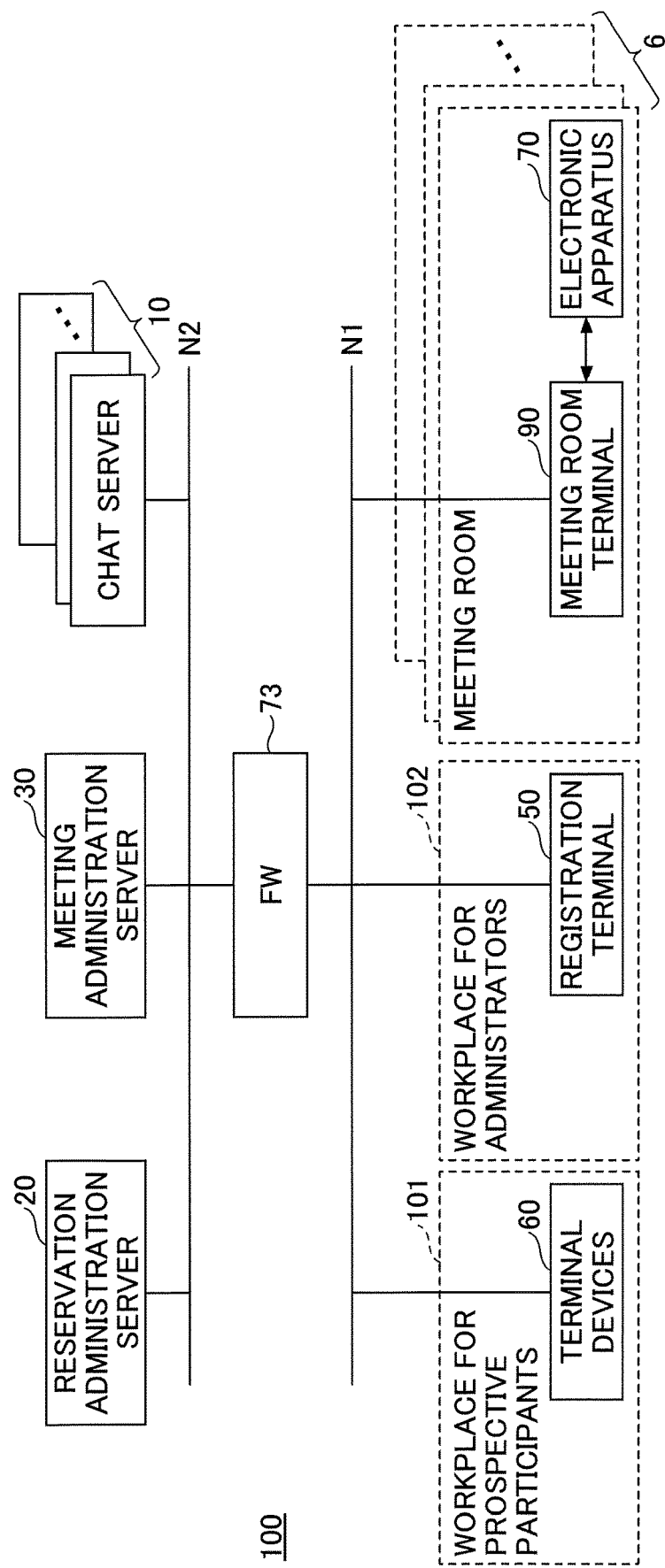
FIG. 3 illustrates an example of a system configuration diagram of the resource reservation system.

FIG. 3 is an example of a system configuration diagram of the resource reservation system 100. The resource reservation system 100 may be divided into an external network N2 and an internal network N1. The internal network N1 refers to the network inside the firewall 73, and the external network N2 refers to a network such as the Internet where an unspecified number of communications is transmitted.

A reservation administration server 20, a meeting administration server 30, and one or more chat servers 10 are connected to the external network N2, and each server can communicate as needed. The external network N2 may be connected to a terminal device 60 operated by a participant in the meeting as needed.

The reservation administration server 20 is implemented by one or more information processing apparatus (computer system) on which a typical server OS or the like is installed. The system related to the reservation of resources provided by the reservation administration server 20 is referred to as the reservation administration system. The reservation administration server 20 has a calendar system and provides a web app for administering various schedules.

Specifically, it has the following functions:

A schedule registration can be accepted and confirmed by the reservation person at any time and from anywhere;

Notifying by email at the set date and time, such as 30 minutes before the scheduled date;

One person can administer schedules in multiple calendars (for work, home, etc.); and Sharing calendars with people in the same group.

The reservation administration server 20 administers the user as an account. An account is a user's right to use a service. In many systems, the user logs into the system using an account. For this reason, the account has a function (identification information function) that uniquely identifies the user of the system.

According to this embodiment, the reservation administration server 20 transmits the reservation information of the previously registered account (domain) to the meeting administration server 30. Alternatively, when the meeting administration server 30 requests the reservation information by specifying the account of the reservation administration server 20, the meeting administration server 30 can acquire the reservation information of the meeting room 6 from the reservation administration server 20. The account may be information that uniquely identifies the user, for example, email, ID, telephone number, or the like.

According to this embodiment, the scheduled reservation is administered in the meeting room 6, but the reservation administration server 20 is not limited to the meeting room 6 and can administer various schedules.

In addition to the meeting room 6, it can be used for reservation of various resources such as rental offices, rental studios, rental cycles, lodging facilities such as rental cars and hotels, and rental spaces for event venues and lockers.

As the reservation administration system, G Suite ("G Suite" is a registered trademark), Office 365 ("Office 365" is a registered trademark), and the like are known. However, the reservation administration system having the function described in this embodiment is sufficient.

Further, in this embodiment, information concerning the meeting room 6 of the internal network N1 is pre-registered in the reservation administration server 20. That is, the web app of the reservation administration server 20 is customized according to the meeting room name, the meeting room ID, the reservation available time, the capacity, and the reservation unit, respectively of each meeting room 6 in the corporate network using the resource reservation system 100. Accordingly, the reservation information is associated with a meeting room 6 of an enterprise utilizing the resource reservation system 100.

The chat server 10 may be implemented by one or more information processing apparatuses (a computer systems) having an ordinary server OS or the like. The chat system is a real-time sharing system for information such as text, audio, video and the like among multiple users provided by the chat server 10. The chat server 10 notifies the terminal device 60 of the information related to the reservation of the meeting room 6. In this embodiment, multiple chat servers 10 having different operating entities may be included.

The shared information includes images, audio, etc., and is not limited to text. However, for the convenience of explanation, this embodiment explains that text is mainly used for the notification. For example, the chat system may provide a voice communication function between groups. A voice call may be one-to-one or one-to-N (N≥2). Accordingly, in this embodiment, when the chat system notifies the information regarding the reservation of the meeting room 6, it may output an audio message as well as a text display. The chat system is known to include LINE ("LINE" is a registered trademark; hereinafter the same), Slack, and Microsoft Teams ("Microsoft Teams" is a registered trademark; hereinafter the same). However, the chat system is sufficient to notify one or more users from the bot (a program that performs predetermined process).

The chat server 10 similarly administers the user with an account (different from the account of the reservation administration server 20). In principle, the meeting administration server 30 does not need to be aware of the account of the chat server 10. However, the meeting administration server 30 may designate and notify by designating an arbitrary account of the chat server 10.

The meeting administration server 30 can be implemented by one or more information processing apparatuses (a computer system) having an ordinary server OS or the like (corresponding to the information processing apparatus as claimed). As a process related to the external network N2, the meeting administration server 30 acquires the reservation information of the meeting room 6 from the reservation administration server 20, acquires the prospective participant set as the reservation information, and transmits a notification to a group (or an individual person such as a reservation person) of the chat server 10 associated with the prospective participant at a preset timing. Further, as a process related to the internal network N1, the check-in and the check-out to the meeting room 6 are administered, and the power source of the electronic apparatus 70 is controlled based on the reservation information of the meeting room 6 acquired from the reservation administration server 20.

The internal network N1 has a meeting room 6, the workplace 101 for the prospective participant, and the workplace 102 for the administrator. The prospective participant can access the external network N2 from various locations via the internal network N1. The internal network N1 is, for example, a local area network (LAN). The meeting room 6, a workplace 101 for the prospective participant, and a work place 102 of the administrator are not necessarily LANs within the same enterprise.

The meeting room terminal 90 and the electronic apparatus 70 are disposed in the meeting room 6. The meeting room terminal 90 and the electronic apparatus 70 may communicate over a small LAN or dedicated line. The electronic apparatus can be connected to the internal network N1 and the external network N2 without going through the meeting room terminal 90. The meeting room terminal 90 and the electronic apparatus 70 may communicate by a wireless or wired communication. Because the internal network N1 is present inside the firewall 73, a direct communication from the external network N2 to the internal network N1 is difficult.

The meeting room terminal 90 is an information processing apparatus (a facility terminal) operated by a participant of a meeting such as a reservation person who uses the meeting room 6. The meeting room terminal 90 is disposed on the desk of the meeting room 6 or at the entrance of the meeting room 6. A plurality of meeting room terminals 90 may be disposed in one meeting room 6. The meeting room terminal 90 can be implemented by one or more information processing apparatuses (a computer system) having a typical OS or the like.

The meeting room terminal 90 transmits the meeting room ID to the meeting administration server 30 and displays the reservation information of the meeting room 6 on the day. Further, the control information such as the power ON and OFF of the electronic apparatus 70 is acquired from the meeting administration server 30. Thus, the meeting room terminal 90 turns ON and OFF the power of the electronic apparatus 70.

The meeting room terminal 90 displays a standby screen for checking in, checkout, or the like, and communicates with the meeting administration server 30 for informing the meeting administration server 30 of the check-in or checkout. At the time of check-in, the meeting room terminal 90 transmits the meeting identification information input from the reservation person and the meeting room ID stored in advance to the meeting administration server 30. Therefore, the meeting administration server 30 can confirm that the meeting room 6 reserved by the reservation person who reserved the meeting room 6 is used based on the meeting identification information and the meeting room ID.

The electronic apparatus 70 is a variety of office equipment that may be used in the meeting room 6. The electronic apparatus 70 is a resource that is subject to the reservation together with the meeting room 6. For example, the electronic apparatus 70 includes an electronic blackboard, a multifunction peripheral, a projector, digital signage, a digital camera, and the like. The electronic blackboard has a large display with a touch panel, detects the coordinates of the panel pointed by the user, connects the coordinates, and displays the stroke. In addition, the image of the connected PC can be displayed, and the stroke can be synchronized by communicating with the electronic blackboard in the other sites. Incidentally, an electronic blackboard is sometimes called an electronic information board or an electronic whiteboard.

The multifunction peripheral has functions such as a copier, a scanner, a printer, and facsimile transmission/reception, and is used for printing materials during the meeting, copying a material, digitizing the material, and transmitting the materials. A projector is provided for projecting an image. For example, the terminal device 60 can share the image displayed on the display by projecting the image on the screen or the like among the participants. The digital signage is a large display and is used to display an arbitrary still image or movie. The digital camera is used by each participant to capture and store paper or electronic material displayed on the electronic blackboard.

The terminal device 60 capable of connecting to the internal network N1 is disposed in the worksite 101 of the prospective participant. The terminal device 60 may communicate by a wired or wireless communication. The terminal device 60 is an information processing apparatus used by a prospective participant (including a reservation person) when reserving a meeting room, but it is also assumed that the terminal device 60 is brought into the meeting room. Here, the terminal device is the information processing apparatus carried by the participant.

The terminal device 60 can be implemented by one or more information processing apparatuses (the computer system) having an ordinary OS or the like. The terminal device 60 may be, for example, a smartphone, a tablet terminal, a PC (Personal Computer), a PDA (Personal Digital Assistant), a wearable PC (a sunglass type, a wristwatch type, etc.), or the like. However, the browser software having the communication function or the application software dedicated to the chat server 10 or the reservation administration server 20 may operate. For example, a car navigation system, a game machine, a television set, or the like may also be the terminal device 60.

In the terminal device 60, application software (hereinafter, referred to as a "chat app") dedicated to the chat server 10 is operated, and application software dedicated to the resource reservation system 100 (hereinafter, referred to as a "meeting app") is also operated. However, these may be substituted with browser software.

A registration terminal 50 that can be connected to the internal network N1 is disposed in the workplace 102 for the administrator. The registration terminal 50 may communicate by a wire or wireless communication. The registration terminal 50 is the information processing apparatus used by the administrator to conduct initial setting for the meeting room terminal 90.

The registration terminal 50 may be an information processing apparatus similar to the terminal device 60. However, because it is mainly used by the administrator to set in the meeting administration server 30, there may be no chat app or meeting app. The registration terminal 50 communicates with the meeting administration server 30 mainly by browser software.

<Hardware Configuration>
<<Hardware Configuration of Meeting Administration Server>>

Figure 4:
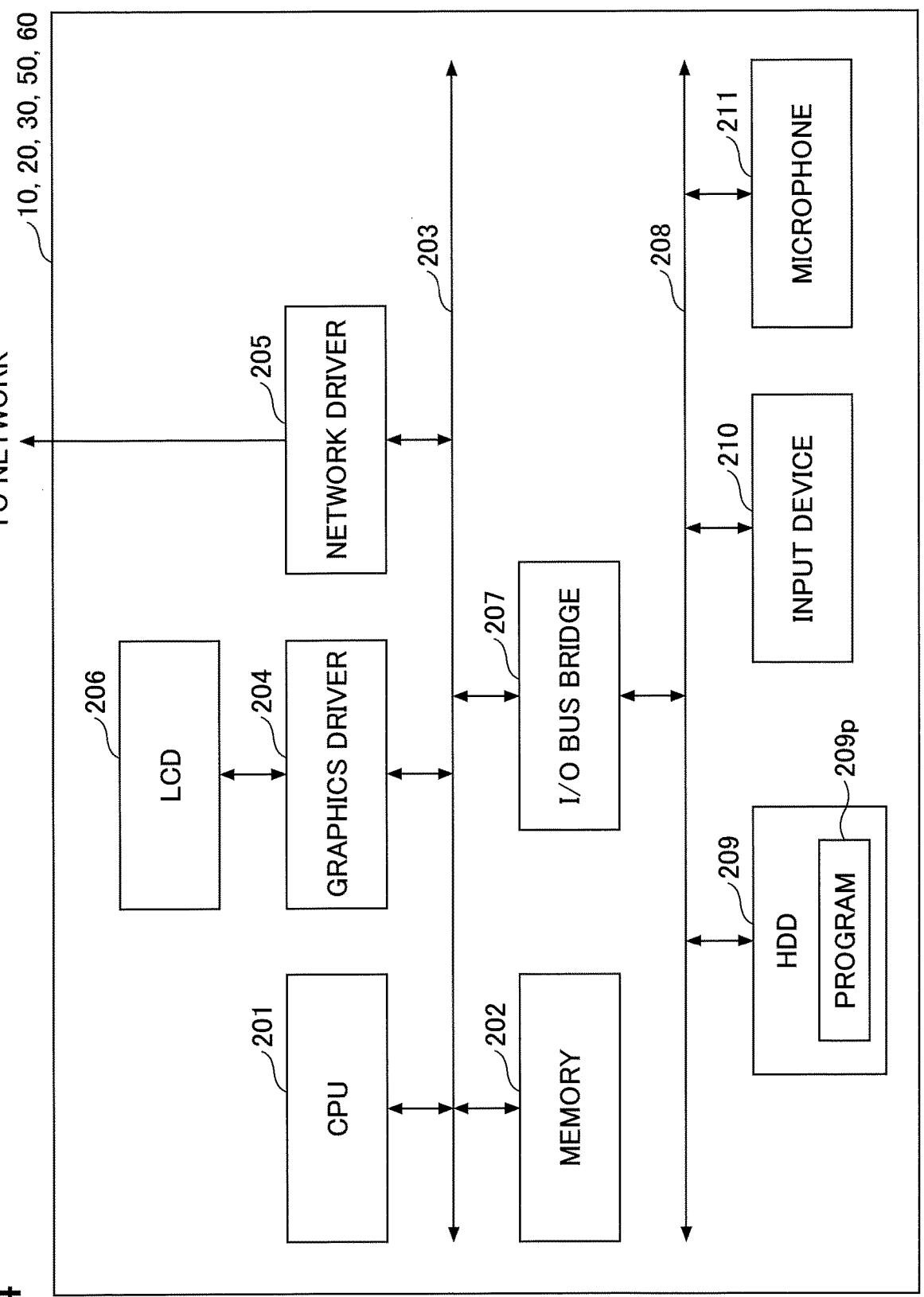
FIG. 4 illustrates an example of a hardware configuration diagram of a meeting administration server.

FIG. 4 illustrates an example of a hardware configuration diagram of a meeting administration server. It is an example of a schematic hardware configuration diagram of the meeting administration server 30. The meeting administration server 30 includes a CPU 201 and a memory 202 that enables fast access to data used by the CPU 201. The CPU 201 and memory 202 are connected via the system bus 203 to the other device or driver of the meeting administration server 30, such as the graphics driver 204 and the network driver (NIC) 205.

The graphics driver 204 is connected to an LCD (a display unit, an example of a display) 206 via a bus to monitor the process result by the CPU 201. The network driver 205 also connects the meeting administration server 30 to the external network N2 at the transport and physical layer levels to establish sessions with other devices.

The system bus 203 is further connected to an I/O bus bridge 207. A memory device such as an HDD (hard disk drive) 209 is connected to the downstream side of the I/O bus bridge 207 by an IDE, an ATA, an ATAP80I, a serial ATA, a SCSI, a USB, or the like via an I/O bus 208 such as a PCI. The HDD 209 stores a program 209p for controlling the entire meeting administration server 30. The HDD 209 may be an SSD (Solid State Drive). The program 209p may be distributed as stored on a memory medium, or it may be delivered from a program delivery server.

An input device 210, such as a keyboard and a mouse (referred to as a pointing device), is connected to the I/O bus 208 via a bus, such as a USB, for receiving an input and a command from an operator, such as a system administrator.

The hardware configuration of the illustrated meeting administration server 30 represents a hardware element preferably provided by the meeting administration server 30.

The hardware configuration diagram of the reservation administration server 20, the chat server 10, the registration terminal 50, and the terminal device 60 is similar to that of the meeting administration server 30, or even though the hardware configuration diagram is different, the difference is not a problem in explaining the resource reservation system 100 of this embodiment. In addition, because the meeting administration server 30, the reservation administration server 20, and the chat server 10 are applicable to cloud computing, the hardware configurations may be configured such that a hardware resource is dynamically connected and disconnected in accordance with the load. Cloud computing is a form of use in which resources on a network are used without being conscious of a specific hardware resource.

<<Meeting Room Terminal>>

Figure 5A:
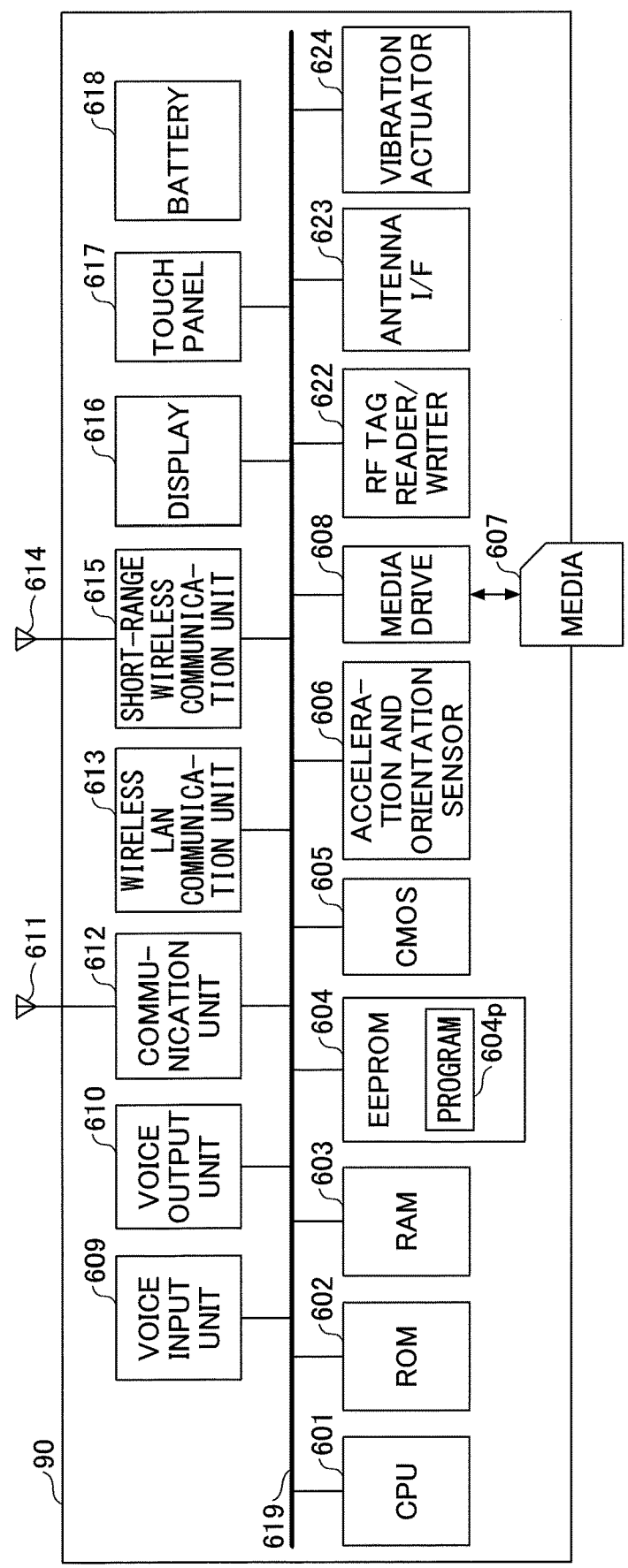
FIGS. 5A and 5B are examples of a hardware configuration diagram of a meeting room terminal.

FIG. 5 is an example of a hardware configuration diagram of a meeting room terminal 90. FIG. 5 illustrates two examples of hardware configurations of the meeting room terminal 90. Incidentally, the meeting room terminal 90 of FIG. 5 is assumed to be a tablet device. The meeting room terminal 90 of FIG. 5A includes a CPU 601, a ROM 602, a RAM 603, an EEPROM 604, a CMOS sensor 605, an acceleration and orientation sensor 606, and a media drive 608.

The CPU 601 controls the overall operations of the meeting room terminal 90. The ROM 602 stores the basic input/output program. The RAM 603 is used as the work area of the CPU 601. The EEPROM 604 reads or writes data according to the control of the CPU 601. The CMOS sensor 605 captures the photographic subject according to the control of the CPU 601 and obtains image data. The acceleration and orientation sensor 606 is an electromagnetic compass, gyrocompass, acceleration sensor, or the like that detects geomagnetic field.

The media drive 608 controls the reading or writing (storage) of data to the media 607, such as a flash memory. The media drive 608 is configured to detachably mount the media 607 for storing data read from or newly written from already recorded data.

The program 604p executed by the CPU 601 is stored in the EEPROM 604. The program 604p is application software, an OS, or the like for executing various processes in the embodiment. The program 604p may be distributed as stored in the media 607 or from a program delivery server.

The CMOS sensor 605 is a charge-coupled device that converts light into an electric charge to electronically convert an image of the photographic subject. The CMOS sensor 605 may be, for example, a CCD (Charge Coupled Device) sensor if the photographic subject can be imaged. The CMOS sensor 605 can read a bar code or two-dimensional bar code.

The meeting room terminal 90 further includes an RF tag reader/writer 622, an antenna I/F 623, and a vibration actuator 624. The RF tag reader/writer 622 communicates according to standards such as, for example, NFC (Near Field Communication).

The vibration actuator 624 is a motor that vibrates the meeting room terminal 90. For example, when the end of a meeting is approaching, the meeting room terminal 90 can vibrate to inform the participant of this approaching.

The meeting room terminal 90 further includes a voice input unit 609, a voice output unit 610, an antenna 611, a communication unit 612, a wireless LAN communication unit 613, a short-range wireless communication antenna 614, a short-range wireless communication unit 615, a display 616, a touch panel 617, and a bus line 619.

The voice input unit 609 converts the voice into a voice signal. The speech output unit 610 converts the speech signal to speech. The communication unit 612 communicates with the nearest base station device by a radio communication signal using the antenna 611. The wireless LAN communication unit 613 performs wireless LAN communication conforming to the IEEE 802.11 standard.

The short-range wireless communication unit 615 is a communication device that uses the antenna 614 for short-range wireless communication and complies with, for example, the communication standard of Bluetooth ("Bluetooth" is a registered trademark) or Bluetooth Low Energy ("Bluetooth registered trademark" is a registered trademark).

The display 616 is a liquid crystal or organic EL for displaying an image of a photographic subject, various icons, or the like. A touch panel 617 is mounted on the display 616 and is made of a pressure-sensitive or electro-static panel that detects a touch position on the display 616 by touching it with a finger, a touch pen or the like. The bus line 619 is an address bus, data bus, or the like for electrically connecting the above units.

The meeting room terminal 90 also includes a dedicated battery 618, which may be driven by either the battery 618 or a commercial power supply. The voice input unit 609 includes a microphone for inputting voice. The voice output unit 610 includes a speaker that outputs audio.

Figure 5B:
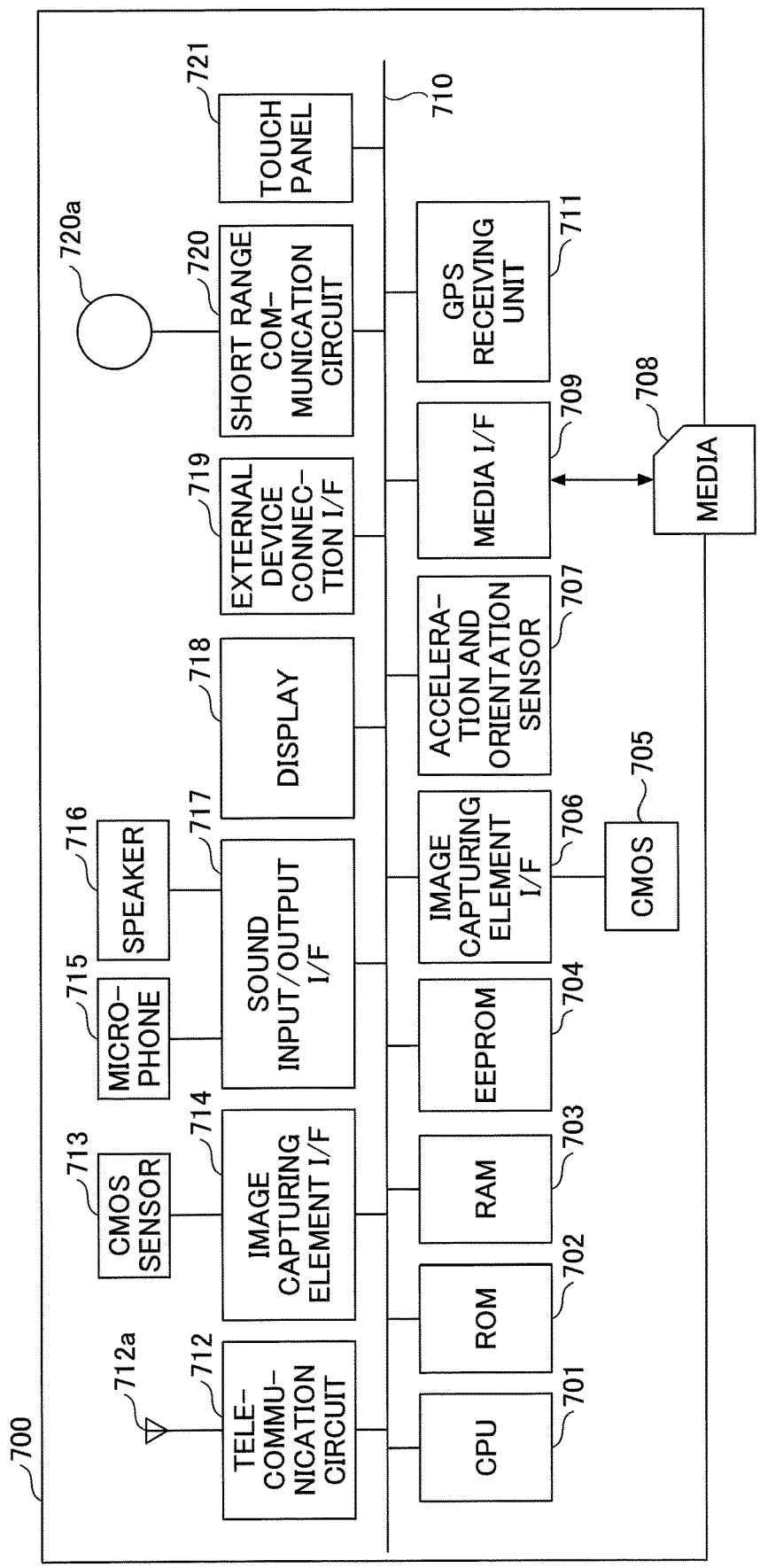

FIG. 5B is also an example of a hardware configuration diagram of the meeting room terminal 90. As illustrated in FIG. 5B, the meeting room terminal 90 includes a CPU 701, a ROM 702, a RAM 703, an EEPROM 704, a CMOS sensor 705, an image capturing element I/F 706, an acceleration and orientation sensor 707, a media I/F 709, and a GPS receiving unit 711.

From among these, the CPU 701 controls the operations of the meeting room terminal 90 as a whole. The ROM 702 stores programs used to drive the CPU 701 and an IPL for driving the CPU 701. The RAM 703 is used as the work area of the CPU 701. The EEPROM 704 reads or writes various data such as apps according to the control of the CPU 701. The CMOS (Complementary Metal Oxide Semiconductor) sensor 705 is a type of built-in imaging means that captures a photographic subject (mainly a self-image) according to the control of the CPU 701 to obtain image data. It may be an imaging means, such as a CCD (Charge Coupled Device) sensor, not a CMOS sensor. The imaging capturing element I/F 706 is a circuit that controls driving of the CMOS sensor 705. The acceleration and orientation sensor 707 is a variety of sensors, such as an electromagnetic compass, a gyrocompass, and an acceleration sensor, which detect geomagnetic fields. The media I/F 709 controls the reading or writing (storage) of data to a recording media 708, such as a flash memory. The GPS receiving unit 711 receives a GPS signal from a GPS satellite.

The meeting room terminal 90 includes a telecommunication circuit 712, a CMOS sensor 713, an image capturing element I/F 714, a microphone 715, a speaker 716, a sound input/output I/F 717, a display 718, an external device connection I/F (Interface) 719, a short range communication circuit 720, an antenna 720a of a near range communication circuit 720, and a touch panel 721.

From among these, the telecommunication circuit 712 is a circuit for communicating with other apparatuses via a communication network. The CMOS sensor 713 is a type of built-in imaging means that captures the photographic subject according to the control of the CPU 701 and obtains image data. The image capturing element I/F 714 is a circuit that controls the drive of the CMOS sensor 713. The microphone 715 is a built-in circuit that converts sound to an electrical signal. The speaker 716 is a built-in circuit that converts an electrical signal into physical vibrations to produce sound, such as music and voice. The sound input/output I/F 717 is a circuit that processes the input and output of the sound signal between the microphone 715 and the speaker 716 according to the control of the CPU 701. The display 718 is a type of display means such as a liquid crystal or an organic EL (Electro Luminescence) for displaying an image or various icons of the photographic subject. The external device connection I/F 719 is an interface for connecting various external apparatuses. The short range communication circuit 720 is a communication circuit such as a Near Field Communication (NFC) or Bluetooth ("Bluetooth" is a registered trademark). The touch panel 721 is a type of input means for operating the meeting room terminal 90 by a user pressing the display 718.

The meeting room terminal 90 also includes a bus line 710. The bus line 710 is an address bus, data bus, or the like for electrically connecting components such as the CPU 701 illustrated in FIG. 4.

<Function>

Figure 6:
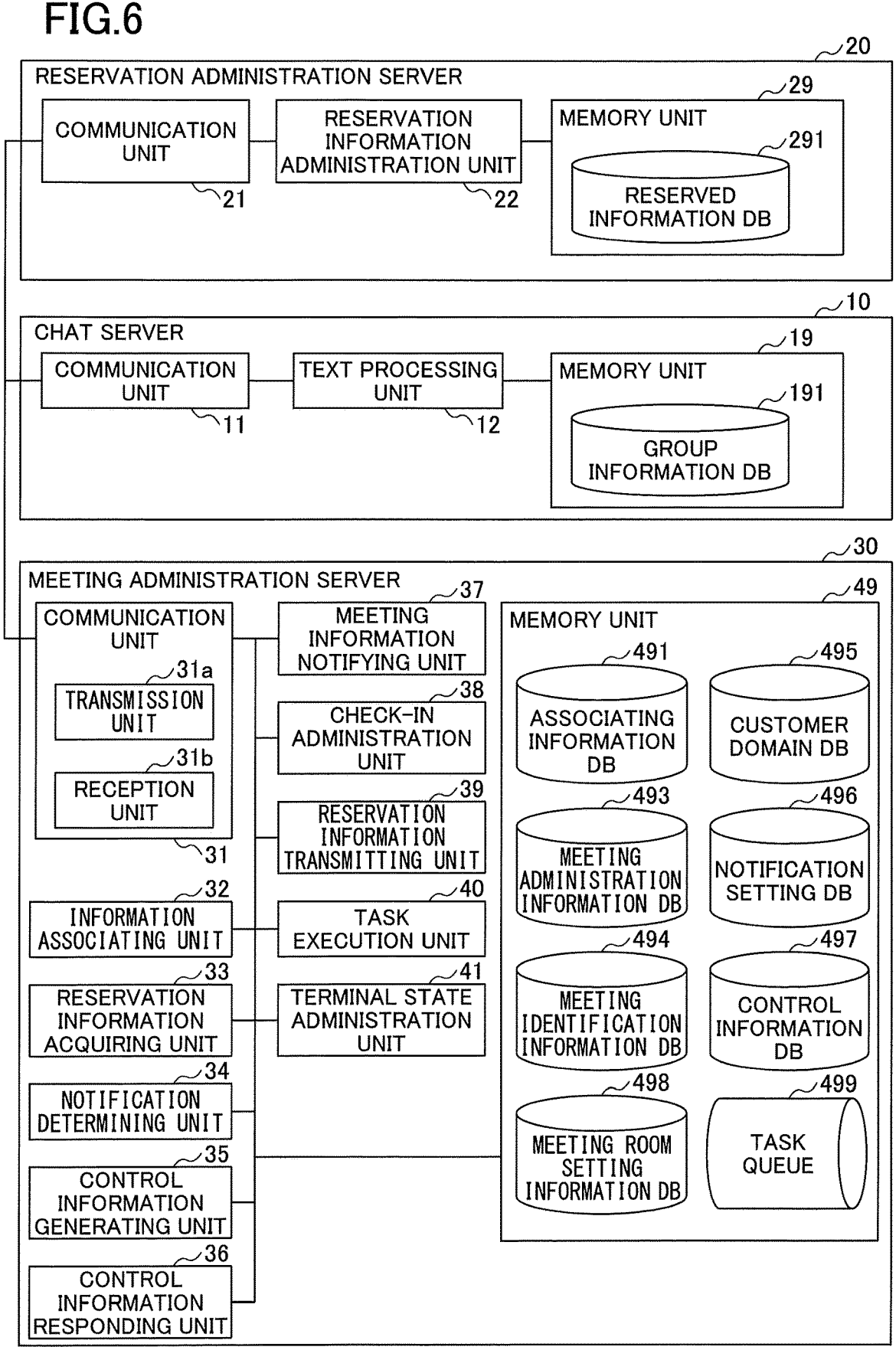
FIG. 6 is an example of a functional block diagram illustrating functions of the reservation administration server, a chat server, and the meeting administration server in a block pattern.

FIG. 6 is an example of a functional block diagram illustrating functions of the reservation administration server 20, the chat server 10, and the meeting administration server 30 in a block pattern.

<<Reservation Administration Server>>

The reservation administration server 20 includes a communication unit 21 and a reservation information administration unit 22. Each of the functional units provided by the reservation administration server 20 is a function or means that is substantialized by one of the components illustrated in FIG. 4 being operated by a command from the CPU 201 according to the program 209p deployed from the HDD 209 to the memory 202.

The communication unit 21 transmits and receives various information with the meeting administration server 30 and the terminal device 60. The communication unit 21 transmits screen information of the reservation setting screen to the terminal device 60 and receives the reservation setting from the terminal device 60. The reservation information is transmitted to the meeting administration server 30. The communication unit 21 is substantialized by the CPU 201 of FIG. 4 by executing the program 209p and controlling the network driver 205.

The reservation information administration unit 22 administers the reservation information registered by the user. The reservation information administration unit 22 reads out the reservation information of the meeting room 6 requested from the meeting administration server 30 from the reservation information DB 291 and transmits the reservation information to the meeting administration server 30 through the communication unit 21. Alternatively, when the reservation information is registered (or changed), the reservation information is transmitted to the meeting administration server 30 even if there is no request.

A typical web app is used as a method by which the prospective participant reserves the meeting room 6 in the reservation administration server 20. The reservation information administration unit 22 is substantialized by executing the program 209p in the CPU 201 of FIG. 4.

The reservation administration server 20 includes a memory unit 29. The memory unit 29 is substantialized by the memory 202 and the HDD 209 of FIG. 4. The reservation information DB (Data Base) 291, a constraint condition DB 292, and a requirement condition DB 293 are stored in the memory unit 29.

TABLE 1

RESERVATION INFORMATION DB

| RESERVATION ID | RESERVATION PERSON ACCOUNT | MEETING NAME | MEETING ROOM ID | START TIME OF DAY | END TIME OF DAY | PROSPECTIVE PARTICIPANT ACCOUNT |
|---|---|---|---|---|---|---|
| 001 | a@xfood.com | DEVELOPMENT OF COMMERCIAL PRODUCT Z | K-001 | 2017/ 07/07 10:00 | 2017/ 07/07 12:00 | b@xfood.com c@xfood.com d@xfood.com |
| 002 | e@xfood.com | DEVELOPMENT OF COMMERCIAL PRODUCT Y | K-001 | 2017/ 07/07 13:00 | 2017/ 07/07 14:00 | f@xfood.com g@xfood.com |
| ... | ... | ... | ... | ... | ... | ... |

Table 1 illustrates an example of reservation information stored in the reservation information DB 291. The reservation information is information to administer the reservation status of the meeting room 6. The reservation information contains items such as a reservation person account, a meeting name, a meeting room ID, a start time of day, end time of day, and prospective participant account in association with the reservation ID. The reservation ID is identification information that identifies one record of the reservation information. The ID stands for identification and means an identifier or identification information. An ID is a name, code, character string, numeric value, or one or more of these combinations used to uniquely distinguish a particular object from multiple objects.

The same applies to an ID other than the reservation ID. The reservation account is the account of the prospective participant who has reserved the meeting room 6. The meeting name is the name arbitrarily given to the prospective participant. The meeting room ID is the identification information identifying the meeting room 6 in the internal network.

The start time of day (a usage start time of day) is the start time of day of the time zone where the meeting room 6 is reserved (the time at which the meeting starts), and the end time of day (a usage end time of day) is the end time of day of the time zone where the meeting room 6 is reserved (the time of day at which the meeting ends). The prospective participant Account is the account of the prospective participant who is scheduled to attend the meeting. All of the accounts in Table 1 are accounts issued by the reservation administration server 20.

<<Chat Server>>

The chat server 10 includes a communication unit 11 and a text processing unit 12. Each of these functional portions of the chat server 10 is a function or means in which each of the configuration categories illustrated in FIG. 4 is implemented by operating in accordance with a command from the CPU 201 in accordance with the program 209p expanded from the HDD 209 to the memory 202.

The communication unit 11 transmits and receives various information from the meeting administration server 30. According to this embodiment, the information related to the reservation of the meeting room, the information (a token to be described later) identifying the bot and the information identifying the group of a notification destination are received from the meeting administration server 30. The information identifying the bot is notified in advance by the chat server 10 as the bot identification information when the bot of the meeting administration server 30 is created.

In addition, an individual account, such as a reservation person, may be specified. The communication unit 11 transmits the response of the scheduled participant to the meeting administration server 30 in response to the fact that the prospective participant has read the information concerning the reservation of the meeting room or the information concerning the displayed meeting room reservation. The communication unit 11 is substantialized by the CPU 201 of FIG. 4 executing the program 209p and controlling the network driver 205.

The text processing unit 12 transmits the reservation information of the meeting room 6 to the scheduled participants belonging to the group based on the information identifying the bot notified from the meeting administration server 30 and the information identifying the group to which the notification is made. When the account of the notification destination is further designated from the meeting administration server 30, information concerning the reservation of the meeting room 6 is transmitted to one of the prospective participant belonging to the group. Thus, the notification may be made only by the number of prospective participants or only by an arbitrary user such as the reservation person.

The text processing unit 12 can provide a so-called push notification. For example, a mechanism is as follows. The chat app 60a receives the ID (a token) for the push notification from the server operated by the manufacturer of the OS (operating system). In this server, the token is associated with the device (the terminal device 60). The chat app 60a stores the token and the account of the chat app 60a in the chat server 10. When the chat server 10 conducts a push notification, it is possible to identify the token to which the chat app 60a is associated because the push notification identifies the account. The chat system sends the notification content to the server operated by the manufacturer of the OS by specifying the token. The server sends a push notification to the device associated with the token (the terminal device 60).

The chat server 10 includes the memory unit 19. The memory unit 19 is substantialized by the memory 202 and the HDD 209 of FIG. 4. The group information DB 191 is stored in the memory unit 19.

operated by a command from the CPU 201 according to the program 209p deployed from the HDD 209 to the memory 202. The program 209p is delivered from a program delivery server or distributed as stored on a memory medium.

The communication unit 31 transmits and receives various information with the reservation administration server 20, the chat server 10, and the terminal device 60. The communication unit 31 includes a transmission unit 31a and a reception unit 31b. The reception unit 31b receives the

TABLE 2

| | | GROUP INFORMATION DB | | | | |
|---|---|---|---|---|---|---|
| WORKSPACE | CHANNEL | MEMBER ACCOUNT 1 | MEMBER ACCOUNT 2 | MEMBER ACCOUNT 3 | MEMBER ACCOUNT 4 | BOT ACCOUNT |
| http://sample.com/1 | #marketing | a@chat.com | b@chat.com | c@chat.com | d@chat.com | robo@chat.com |
| http://sample.com/2 | #team1 | b@chat.com | d@chat.com | | | |
| http://sample.com/3 | #ip | f@chat.com | g@chat.com | h@chat.com | | robo@chat.com |
| . . . | . . . | . . . | . . . | . . . | . . . | . . . |

Table 2 illustrates an example of group information stored in the group information DB 191. The group information is information in which the account of members belonging to the same group is registered. The group information includes member accounts 1 to n (n=4 in Table 2) and a bot account associated with workspaces and channels.

The workspace is identification information to identify an organization such as a company and department. In this embodiment, multiple members belong to the workspace (e.g., Company A). The workspace is, for example, a URL, which is sufficient to be unique. In addition, the workspace has multiple channels depending on the purpose of the chat and the like. The channel is a group of members for which common information is exchanged, e.g., a group for product A, a group for product B, etc. Any one of members from among the members belonging to the workspace belongs to the channel. That is, the destination is identified by the workspace and the channel. However, because the method of identifying the notification destination differs depending on the chat system, if there is identification information that can uniquely specify the group, this information is sufficient or may be specified by more than two pieces of information.

The channels are guaranteed to be unique. The member accounts 1-n are the accounts of the channel members, and these accounts are issued by chat server 10. In this embodiment, the bot is registered as a member for informing about the reservation in the meeting room 6. The bot is an agent of the meeting administration server 30 or a fictitious member. The bot speech (a text) is transmitted to the terminal device 60 having member accounts 1-n.

The workspace and channels are administered by the meeting administration server 30 to provide information for identifying the group to which the participant belongs.

<<Meetings Administration Server>>

The meeting administration server 30 includes a communication unit 31, an information associating unit 32, a reservation information acquiring unit 33, a notification determining unit 34, a control information generating unit 35, a control information responding unit 36, a meeting information notifying unit 37, a check-in administration unit 38, a reservation information transmitting unit 39, a task execution unit 40, and a terminal state administration unit 41.

Each of these functional units of the meeting administration server 30 is a function or means implemented in which each of the configuration categories illustrated in FIG. 4 is reservation information from the reservation administration server 20 and receives a request for the reservation information from the meeting room terminal 90. The reception unit 31b receives the check-in request from the meeting room terminal 90. The reception unit 31b receives a correspondence between the group of the chat system and the account from the registration terminal 50 operated by the administrator. The transmission unit 31a transmits the information concerning the reservation of the meeting room to the chat server 10 and transmits the reservation information to the meeting room terminal 90. The communication unit 31 is substantialized by the CPU 201 of FIG. 4 by executing the program 209p and controlling the network driver 205.

The information associating unit 32 mainly performs a process related to a pre-registration work. That is, the registration of the domain is received from the registration terminal 50 or the like, registered in the customer domain DB 495, and the workspace and the channel of the chat system transmitted from the registration terminal 50 or the like, and the account of the reservation administration server 20 are associated and registered in the associating information DB 491. The information associating unit 32 is substantialized by the CPU 201 of FIG. 4 executing the program 209p.

The reservation information acquiring unit 33 designates the account of the customer using the resource reservation system 100, acquires reservation information from the reservation administration server 20, and registers the reservation information as the meeting administration information in the meeting administration information DB 493. Alternatively, the reservation information is automatically received when there is a change. Accordingly, at least a part of the reservation information of the reservation administration server 20 is stored in the meeting administration information DB 493. The reservation information acquiring unit 33 acquires the reservation information for a predetermined period from the present from among the reservation information held by the reservation administration server 20. The predetermined period is determined by how far ahead the reservation of the meeting room 6 is to be notified.

When the reservation information acquiring unit 33 acquires the reservation information, the reservation information acquiring unit 33 generates the task of automatic cancel and registers it in the task queue 499. The task queue 499 is a FIFO (First In First Out) queue and is executed when the execution time of day arrives. The reservation information acquiring unit 33 is substantialized by executing the program 209p in the CPU 201 of FIG. 4.

The notification determining unit 34 determines whether there is a reservation of the start time of day that satisfies the condition of notification in the meeting administration information. For example, referring to the notification setting DB 496, it is determined that the notification will be made when the date and time set is calculated backward from the start time of day of the reservation. If the bots are separated according to roles, for example, a bots for reminder and a bot for reservation reception, the bots are specified according to the process. The notification determining unit 34 is substantialized by a program 209p executed by the CPU 201 of FIG. 4.

The meeting information notifying unit 37 requests the chat server 10 to designate information identifying the bot (for example, a token in the case of Slack) and information specifying the group of the notification destination, and to notify information related to the reservation of the meeting room 6, when the notification by the notification determining unit 34 is determined. The notification is divided several times, and at least one of the divided notifications contains the meeting identification information. The meeting identification information is information for the meeting administration server 30 to verify that participants have the right to use the scheduled meeting room 6 during the scheduled time period. The meeting information notifying unit 37 generates the meeting identification information at least before the final notification. The meeting identification information is registered in the meeting identification information DB 494. The meeting information notifying unit 37 is substantialized by the CPU 201 of FIG. 4 executing the program 209p.

The control information generating unit 35 generates control information of the electronic apparatus 70 by referring to the meeting administration information DB 493 and registers the control information in the control information DB 497. For example, several minutes prior to the start time of day of the meeting, control information is generated to turn on the power of the electronic apparatus 70, and control information is generated to turn off the power of the electronic apparatus 70 upon detection of a check-out. The control information is stored in the control information DB 497. The control information generating unit 35 is substantialized by the CPU 201 of FIG. 4 executing the program 209p.

The control information responding unit 36 receives the inquiry as to whether the control information is present from the meeting room terminal 90 of the meeting room 6 and transmits the control information corresponding to the meeting room 6 to the meeting room terminal 90 with reference to the control information DB 497. The control information responding unit 36 is substantialized by a program 209p executed by the CPU 201 of FIG. 4.

The check-in administration unit 38 administers the check-in and check-out of the meeting room. Also, the status of the meeting due to the check-in/check-out is registered in the meeting administration information DB 493. The check-in is permitted at, for example, 5 to 10 minutes prior to the start time of day of the meeting specified by the reservation ID. For example, 5 to 10 minutes before the start time of day of the meeting is called a check-in possible time (a possible time of day for a use start operation). When the combination of the meeting room ID and the meeting identification information transmitted by the meeting room terminal 90 are registered in the meeting identification information DB 494, the check-in is permitted. When the check-in is permitted, the check-in administration unit 38 deletes the task of automatic cancel. The check-in administration unit 38 is substantialized by executing the program 209p in the CPU 201 of FIG. 4.

The task execution unit 40 periodically checks the task stored in the task queue 499 and executes the task whose execution time of day arrives. Therefore, if the check-in request is not transmitted from the meeting room terminal 90 until the predetermined timing based on the start time of day, the task execution unit 40 cancels the reservation of the meeting room (automatic cancel) because the task has not been deleted. The task described in this embodiment is an automatic cancel task. Various tasks executed upon the time of day may be executed.

The terminal state administration unit 41 records the access time of day of, the meeting room terminal 90 at N-minute intervals by using a periodic request (polling) from the meeting room terminal 90. The polling stands for a regular communication. For M minutes (>N), the state of the meeting room terminal in the meeting room setting information DB 498 is changed to "disconnection," because it is determined that the communication detection state is determined if the access time of day is not updated.

The meeting administration server 30 includes a memory unit 49. The memory unit 49 is substantialized by the memory 202 and the HDD 209 of FIG. 4. The memory unit 49 stores the associating information DB 491, the meeting administration information DB 493, the meeting identification information DB 494, the customer domain DB 495, the notification setting DB 496, the control information DB 497, the meeting room setting information DB 498, and the task queue 499.

TABLE 3

ASSOCIATING INFORMATION DB

| WORKSPACE | CHANNEL | MEMBER ACCOUNT 1 | MEMBER ACCOUNT 2 | MEMBER ACCOUNT 3 | MEMBER ACCOUNT 4 |
|---|---|---|---|---|---|
| http://sample.com/1 | #marketing | a@xfood.com | b@xfood.com | c@xfood.com | d@xfood.com |
|  |  | a@chat.com | b@chat.com | c@chat.com | d@chat.com |
| http://sample.com/2 | #team1 | f@xfood.com | g@xfood.com | h@xfood.com |  |
|  |  | f@chat.com | g@chat.com | h@chat.com |  |
| ... | ... | ... | ... | ... | ... |

Table 3 illustrates an example of the associating information stored in the associating information DB 491. The associating information associates the account of the reservation administration system with the group of chat systems. The associating information includes various items such as a workspace, a channels, and member accounts 1 to n (n=4 in the figures). The workspace and channel are as described above. The accounts of each participant issued by the reservation administration server 20 are registered in the member accounts 1 to n. A chat system account may be registered as indicated in Table 3. In order to notify the group, the reservation administration server 20 may have information (in this embodiment, the workspace and the channel name) for identifying the account of the reservation administration server 20 of the user who has reserved the meeting and information for specifying the group and channel to which the meeting is to be notified, and the account of all members belonging to the group is not necessarily be registered. However, when notifying to the individual user, the account information of each chat system is required. Therefore, it may be registered as indicated in Table 3.

each item of the reservation ID, the meeting room ID, and the meeting identification information. These are the same as the reservation information except for the status (the reservation information received from the reservation administration server 20) and the description thereof is omitted. Note that the reservation ID is registered in order to identify the reservation in the same meeting room 6. Status means the status of the reservation. For example, the status of notified, confirmed, checked in, checked out, or canceled information about a meeting room reservation may be registered.

TABLE 6

| CUSTOMER DOMAIN DB | |
|---|---|
| CUSTOMER DOMAIN NAME | ADMINISTRATOR ACCOUNT IN CUSTOMER |
| xfood.com | a@xfood.com |
| ycar.com | f@ycar.com |
| . . . | . . . |

TABLE 4

| MEETING ADMINISTRATION INFORMATION DB | | | | | | | |
|---|---|---|---|---|---|---|---|
| RESERVATION ID | RESERVATION PERSON ACCOUNT | MEETING NAME | MEETING ROOM ID | START TIME OF DAY | END TIME OF DAY | PROSPECTIVE PARTICIPANT ACCOUNT | STATUS |
| 001 | a@xfood.com | DEVELOPMENT OF COMMERCIAL PRODUCT Z | K-001 | 2017/ 07/07 10:00 | 2017/ 07/07 12:00 | b@xfood.com c@xfood.com d@xfood.com | ALREADY CHECKED IN |
| 002 | e@xfood.com | DEVELOPMENT OF COMMERCIAL PRODUCT Y | K-001 | 2017/ 07/07 13:00 | 2017/ 07/07 14:00 | f@xfood.com g@xfood.com | ALREADY NOTIFIED |
| . . . | . . . | . . . | . . . | . . . | . . . | . . . | . . . |

Table 4 illustrates an example of the meeting administration information stored in the meeting administration information DB 493 of the meeting administration server 30. Because the reservation information is stored in the meeting administration information DB 493, the difference from the reservation information DB 291 in Table 4 is described. The meeting administration information in Table 4 has an item of a status. The status means the situation of the reservation. For example, registered is the situation that information about the reservation of the meeting room 6 is already notified, is confirmed to use, is already checked in, is checked out, or is canceled (is taken back).

TABLE 5

| MEETING IDENTIFICATION INFORMATION DB | | |
|---|---|---|
| RESERVATION ID | MEETING ROOM ID | MEETING IDENTIFICATION INFORMATION |
| 001 | K-001 | 1234 |
| 002 | K-002 | 5678 |
| . . . | . . . | . . . |

Table 5 illustrates an example of the meeting identification information control information stored in the meeting identification information DB 494. The meeting identification information administration information is information that administers the meeting identification information for each reservation in the meeting room 6. The meeting identification information administration information includes Table 6 illustrates an example of the customer domain information stored in the customer domain DB 495. Customer domain information is information that administers the customer's domain and the account of the customer's administrator. The customer domain information is registered while associating a customer domain name and an administrator account in customer. The customer domain name of Table 6 is the account (email address) domain issued by the reservation administration server 20. The administrator account is the account of the administrator account of customer (representation). The account in Table 6 is issued by the reservation administration server 20.

TABLE 7

| NOTIFICATION SETTING DB | |
|---|---|
| CUSTOMER DOMAIN NAME | NOTIFICATION SETTING |
| xfood.com | BEFORE 1 DAY |
| ycar.com | BEFORE 12 HOURS |
| . . . | . . . |

Table 7 illustrates an example of notification setting information stored in the notification setting DB 496. The notification setting information retains notification setting for each customer. The customer domain name and notification setting are associated and registered in the notification setting information. A timing of notifying how long before the start time of day of date of the meeting the information related to the reservation of the meeting room 6 is set in the notification setting information. Alternatively, a predetermined date and time may be set. The timing is not necessary to be one, and multiple notification settings may be registered for one customer.

TABLE 8

CONTROL INFORMATION DB

| MEETING ROOM ID | CONTROL CONTENT |
|---|---|
| K-001 | ELECTRIC POWER ON |
| K-002 | ELECTRIC POWER OFF |
| ... | ... |

Table 8 illustrates an example of control information stored in control information DB 497. The control information is information for controlling the electronic apparatus 70 of the meeting room 6. The control information includes items of the meeting room ID and the control content. The control is a specific control method of the electronic apparatus 70. The meeting administration server 30 can set detailed control content for each electronic apparatus 70. Further, the time of day to be controlled is not registered because the transmission from the meeting administration server 30 of the external network to the meeting room terminal 90 is difficult and the control content is transmitted when the meeting room terminal 90 accesses the meeting administration server 30, and at this time, if the control information is generated.

Before setup: before initial setting

Disconnected: No communication for a certain period (M minutes in this embodiment)

The authentication key is the authentication information for authenticating the meeting room terminal 90 by the meeting administration server 30. The authentication key is transmitted to the meeting room terminal 90 by the initial setting. The authentication key is combinations of a number, an alphabet, a symbol, etc., that are too long to be identified by the brute-force method. The authentication key may be determined by the meeting administration server 30 or by the administrator.

The administration start flag is a flag (True: starting False: not starting) indicating whether the administration of the meeting room is started by the meeting administration server 30 after the initial setting of the meeting room terminal 90 is completed. Because there is an administration start flag, it is possible to suppress the inconvenience caused by the time lag from the completion of the initial setting to the arrangement of the meeting room terminal 90. The access time is the time of day at which the reservation information requested regularly by the meeting room terminal 90 is recorded every N minute. The time of day of the communication with the meeting room terminal 90 may be recorded, as well as the request of the reservation information.

An N minute, M minute, and polling interval have the following relationships:

Polling interval<N minute<M minute

An access time of day may be recorded for each polling. However, when the polling interval is short, the load of the

TABLE 9

MEETING ROOM SETTING INFORMATION DB

| MEETING ROOM NAME | MEETING ROOM ID | STATE OF MEETING TERMINAL | AUTHENTICATION KEY | ADMINISTRATION START FLAG | ACCESS TIME OF DAY |
|---|---|---|---|---|---|
| MEETING ROOM A | K-001 | CONNECTING | ***** | True | 20XX/10/15 12:34 |
| MEETING ROOM B | K-002 | CONNECTING | ***** | False | 20XX/10/15 12:48 |
| MEETING ROOM C | K-003 | DISCONNECTED | ***** | True | 20XX/10/15 12:50 |

Table 9 illustrates an example of the meeting room setting information stored in the meeting room setting information DB 498. The meeting room setting information is information about the setting for each meeting room. The meeting room setting information includes items of the meeting room name, the meeting room ID, the state of the meeting room terminal, the authentication key, the administration start flag, and the access time of day. The meeting room name is the general name of the meeting room that the participant recognizes and is presented, for example, at the entrance to the meeting room.

The meeting room ID is the identification information that uniquely identifies the meeting room as described above. The meeting room ID may be common to the reservation administration server 20. The administrator can set the meeting room ID by providing a translation table separately from the reservation administration server 20. The state of the meeting room terminal indicates whether the initial setting of the meeting room terminal 90 has been completed, whether the communication is possible, etc. While the access time of day is being recorded, the state of the meeting room terminal 90 is set to "connecting".

meeting room setting information DB 498 of the meeting administration server 30 is increased. Therefore, the load is reduced by recording the access time every N minute greater than the polling interval.

Among the meeting room setting information stored in the meeting room setting information DB 498, the meeting room name and the meeting room ID are predetermined or can be set by the administrator. The meeting room setting information may be transmitted from the reservation administration server 20 and used. The initial state of the state of the meeting room terminal 90 (immediately after the setting by a provider) is "before setup", but the state of the communication changes as described in this embodiment. The authentication key is set by the meeting administration server 30 at the initial setting.

The administration start flag is set by the administrator. The access time of day is recorded every N minute by the terminal state administration unit 41.

TABLE 10

TASK QUEUE

| TASK ID | EXECUTION TIME OF DAY | TASK CONTENT | RESERVATION ID |
|---------|----------------------|--------------|----------------|
| T-001 | 20XX/10/17 10:10 | AUTOMATIC CANCEL | 002 |
| T-002 | 20XX/10/17 13:10 | AUTOMATIC CANCEL | 003 |

Table 10 illustrates an example of a task stored in task queue 499. In the task queue 499, the tasks to be executed by the meeting administration server 30 are registered in chronological order. The task queue 499 has items of a task ID, an execution time of day, a task content, and a reservation ID. The task ID is identification information for identifying the task. The execution time of day is the time at which this task is executed. The task content is a specific content of the task. The reservation ID is set to identify the reservation information of the meeting administration information DB 493.

For example, when a meeting room reservation is canceled, the task execution unit 40 is set to specify the reservation information of the meeting administration information DB 493 and changes the status to "canceled".

Further, when a check-in request is transmitted from the meeting room terminal 90, the check-in administration unit 38 updates the status of the meeting administration DB to "already checked-in", but upon detection of the check-in, the check-in administration unit 38 deletes the task of the task queue 499. That is, the check-in administration unit 38 specifies the task of the task queue 499 with the reservation ID of the meeting administration information whose status is "already checked-in" and deletes the task of automatic cancel. With this, the cancel during the checked-in can be prevented.

<<Terminal Device>>

Figure 7:
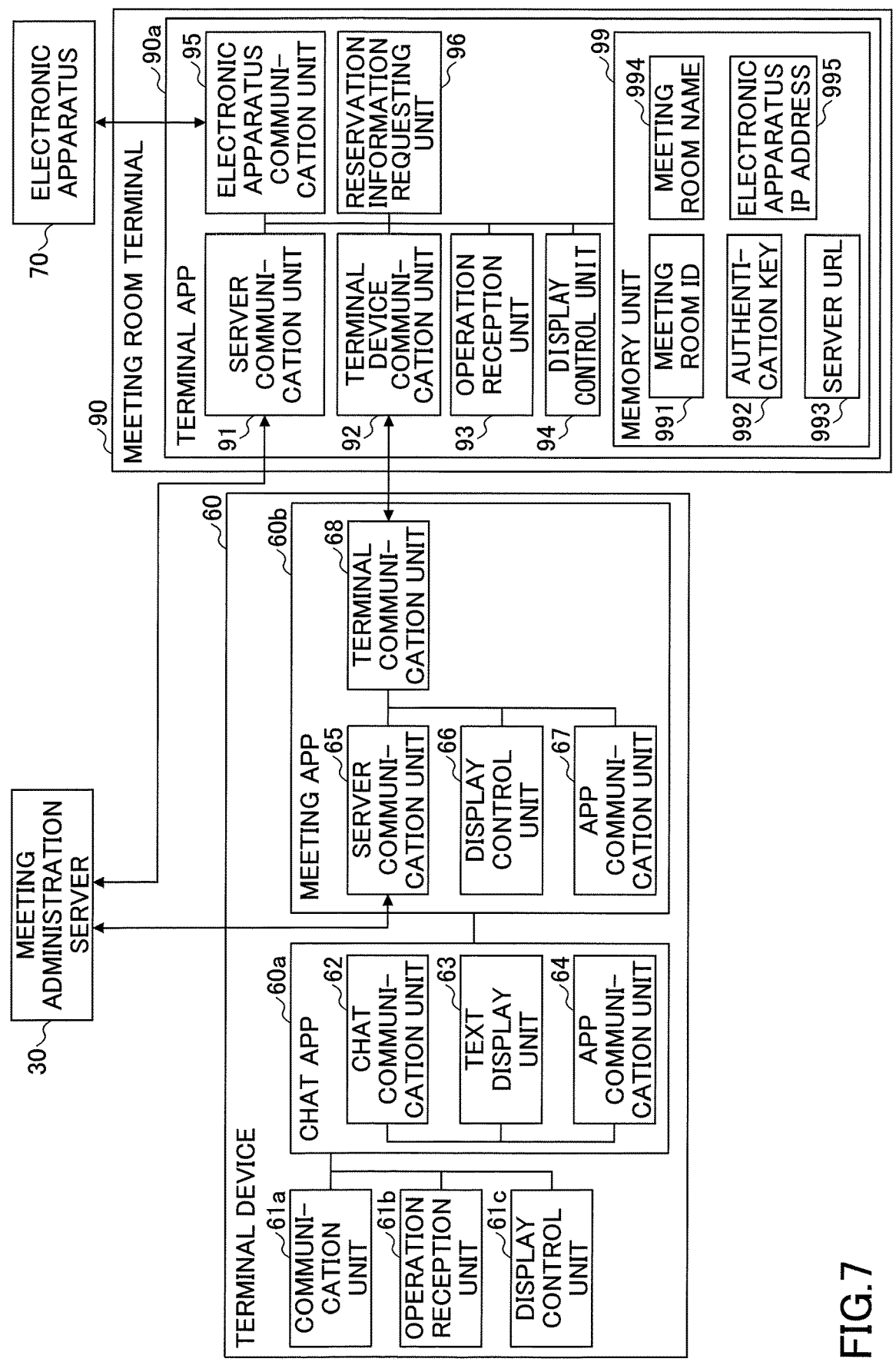
FIG. 7 is an example of a functional block diagram illustrating functions of a terminal device and a meeting room terminal in a block shape.

FIG. 7 is an example of a functional block diagram illustrating functions of the terminal device 60 and the meeting room terminal 90 in a block shape. The functions of the registration terminal 50 and the electronic apparatus 70 will be described as needed.

The terminal device 60 includes a communication unit 61*a*, an operation reception unit 61*b*, a display control unit 61*c*, a chat communication unit 62, a text display unit 63, an app communication unit 64, a server communication unit 65, a display control unit 66, an app communication unit 67, and a terminal communication unit 68. Each of the functional portions provided by the terminal device 60 is a function or means that is substantialized in which each of the configuration categories illustrated in FIG. 4 is operated by a command from the CPU 201 according to the program 209*p* deployed from the HDD 209 to the memory 202. The program 209*p* is delivered from a program delivery server or distributed as stored on a memory medium. Because the chat app 60*a* and the meeting app 60*b* are operated in the terminal device 60, the program 209*p* includes the chat app 60*a* and the meeting app 60*b*.

The communication unit 61*a* transmits and receives various information from the meeting administration server 30 and the reservation administration server 20. The communication unit 61*a* is substantialized by the CPU 201 of FIG. 4 executing the program 209*p* and controlling the network driver 205.

The operation reception unit 61*b* receives various operations of the participant in the terminal device 60. The operation reception unit 61*b* is substantialized by the CPU 201 illustrated in FIG. 4 executing the program 209*p* and controlling the input device 210.

The display control unit 61*c* interprets screen information of various screens and displays the screen information on a LCD 206. The operation reception unit 61*b* and the display control unit 61*c* have, for example, browser functions and can execute a web app. For example, the reservation setting screen received from the reservation administration server 20 is displayed, and the operation reception unit 61*b* receives the reservation information set by the reservation person.

The chat communication unit 62 of the chat app 60*a* transmits and receives various information from the chat server 10. According to this embodiment, the information regarding the reservation of the meeting room 6 is received from the chat server 10, and the chat server 10 is notified of the fact that the meeting room 6 has already been read, whether the meeting room 6 is used or canceled, or the like. The chat communication unit 62 is substantialized by the CPU 201 of FIG. 4 executing the program 209*p* and controlling the network driver 205.

The text display unit 63 of the chat app 60*a* displays a text (information concerning the reservation of the meeting room 6) transmitted from the chat server 10. For example, the text is displayed as if the source of utterance is a bot and the bot had entered the text. The text display unit 63 is substantialized by, for example, a chat app 60*a* executed by the CPU 201 of FIG. 4.

The app communication unit 64 of the chat app 60*a* calls the meeting app 60*b* and transmits the meeting identification information to the meeting app 60*b*. The chat server 10 transmits information identifying the meeting app 60*b* to the terminal device 60 when the information regarding the reservation of the meeting room 6 is notified. Therefore, the chat app 60*a* designates the meeting app 60*b* to the OS and requests the OS to notify the meeting identification information. The OS can start the meeting app 60*b*. The app communication unit 64 is substantialized by, for example, the CPU 201 of FIG. 4 executing the chat app 60*a*.

The server communication unit 65 of the meeting app 60*b* communicates with the meeting administration server 30. The two-dimensional code including the meeting identification information is acquired from the meeting administration server 30 or the like. The server communication unit 65 is substantialized by the CPU 201 of FIG. 4 executing the meeting app 60*b*. The two-dimensional code is used for authentication when checked in. It may be a number of digits for authentication.

The display control unit 66 of the meeting app 60*b* displays the two-dimensional code including the meeting identification information on the LCD 206. The display control unit 66 is substantialized by the CPU 201 of FIG. 4 by executing the meeting app 60*b* and controlling the graphics driver.

The app communication unit 67 of the meeting app 60*b* acquires various information (such as meeting identification information included in the information concerning the reservation of the meeting room 6) from the chat app 60*a* through the OS. The app communication unit 67 is substantialized by, for example, the CPU 201 of FIG. 4 executing the meeting app 60*b*.

The terminal communication unit 68 communicates with the meeting room terminal 90 and transmits the meeting identification information or the like. The terminal communication unit 68 detects the presence of the meeting room terminal 90 by near range radio communication such as Bluetooth ("Bluetooth" is a registered trademark) and transmits the meeting identification information when the meeting room terminal 90 is detected. In addition, a function for displaying a two-dimensional code to the meeting room terminal 90 is provided. The terminal communication unit 68 is substantialized by the CPU 201 of FIG. 4 executing the meeting app 60b or the like.

<<Meeting Room Terminal>>

The meeting room terminal 90 includes a server communication unit 91, a terminal device communication unit 92, an operation reception unit 93, a display control unit 94, an electronic apparatus communication unit 95, and a reservation information requesting unit 96. Each of these functions provided by the meeting room terminal 90 is a function or means implemented in which each of the configuration categories illustrated in FIG. 5 is operated by instructions from the CPU 601 according to the program 604p deployed from the EEPROM 604 to the RAM 603. The program 604p is delivered from a program delivery server or distributed as stored on the storage medium.

The server communication unit 91 communicates with the meeting administration server 30 by using the server URL 993 as a destination. Because the meeting room terminal 90 is present in the internal network, it is difficult to communicate with the meeting room terminal 90 from the meeting administration server 30. For this reason, the server communication unit 91 communicates with the meeting administration server 30 by communication technology such as polling (regularly communicating with the meeting administration server 30) or WebSocket. When there is no communication from the server communication unit 91, the connection interruption is registered in the meeting room setting information DB 498. The server communication unit 91 may communicate with a communication protocol such as HTTP, and the communication protocol is not particularly limited.

The server communication unit 91 according to this embodiment transmits the meeting identification information received from the terminal device communication unit 92 or manually input the meeting identification information to the meeting administration server 30 at the check-in time. The server communication unit 91 receives the control information from the meeting administration server 30. The server communication unit 91 is substantialized by the CPU 601 of FIG. 5 executing the program 604p and controlling the wireless LAN communication unit 613.

The terminal device communication unit 92 communicates with the terminal device 60. In this embodiment, the meeting identification information or the like is received. The terminal device communication unit 92 is substantialized by controlling the short-range wireless communication unit 615 or the RF tag reader/writer 622 by executing the program 604p of the CPU 601 of FIG. 5, for example.

The electronic apparatus communication unit 95 communicates with the electronic apparatus 70. In this embodiment, the control information received by the server communication unit 91 is transmitted to the electronic apparatus 70. The electronic apparatus communication unit 95 is substantialized by the CPU 601 of FIG. 5 executing the program 604p and controlling the wireless LAN communication unit 613.

The display control unit 94 displays a screen generated by the terminal app 90a on the display 616. This screen is a standby screen where check-in and check-out are possible. The display control unit 94 is substantialized by, for example, the CPU 601 of FIG. 5 executing the program 604p to control the display 616.

The operation reception unit 93 receives various operations on the meeting room terminal 90. The operation reception unit 93 is substantialized by, for example, the CPU 601 illustrated in FIG. 5 executing the program 604p to control the touch panel 617.

The reservation information requesting unit 96 repeatedly transmits the meeting room ID and the authentication key to the meeting administration server 30 through the server communication unit 91 at a regular timing when the reservation information is acquired. As a response, the reservation information requesting unit 96 acquires the reservation information through the server communication unit 91.

The reservation information can be acquired only when there is a change. The timing is a cycle of seconds to minutes. The shorter the cycle, the earlier the reservation information can be updated, but the communication load becomes high. Therefore, the decision of the cycle is made by weighing both. A resource reservation system for processing a resource reservation includes an information processing terminal associated with a resource and be capable of receiving a use start operation of starting using the resource, and the information processing apparatus configured to include reservation information including a use start time of day, transmit the reservation information to the information processing terminal in response to a periodic request from the information processing terminal, and receive a use start notification from the information processing terminal in a case where the information processing terminal receives the use start operation, wherein the information processing apparatus does not perform the cancel of the reservation information if the periodic request from the information processing terminal is not received within the constant time and even if the use start notification is not received within the predetermined time from the use start time of day. In this embodiment, for example, 30 seconds. At least the meeting administration information (reservation information) of the meeting room 6 of the present day can be received through the server communication unit 91.

When the reservation information requesting unit 96 cannot request the reservation information to the meeting administration server 30, the communication environment may be degraded. For example, radio waves may interfere, the access point of a wireless LAN may fail, or the power is turned off. The communication environment is likely to deteriorate even in the event of a power failure. In addition, communication may be difficult even when the meeting room terminal 90 is hard-broken. When the terminal app is not activated or is operating in the background, the reservation information requesting unit 96 does not request reservation information. In either case, the meeting administration server 30 detects a communication non-detecting state in which the state of the meeting room terminal 90 is set to "connected".

The meeting room terminal 90 includes a memory unit 99. The memory unit 99 is substantialized by the ROM 602, the EEPROM 604, or the like of FIG. 5. The memory unit 99 stores the meeting room ID 991, the authentication key 992, the server URL 993, the meeting room name 994, and the IP address 995 of the electronic apparatus 70. The meeting room ID 991, the authentication key 992, the server URL 993, and the meeting room name 994 are stored by default in the meeting room terminal 90. The meeting room terminal 90 can communicate with the meeting administration server 30 and obtain reservation information by the meeting room ID 991, the authentication key 992, and the server URL 993.

<Transition of Status of Meeting Room Terminal>

Figure 8:
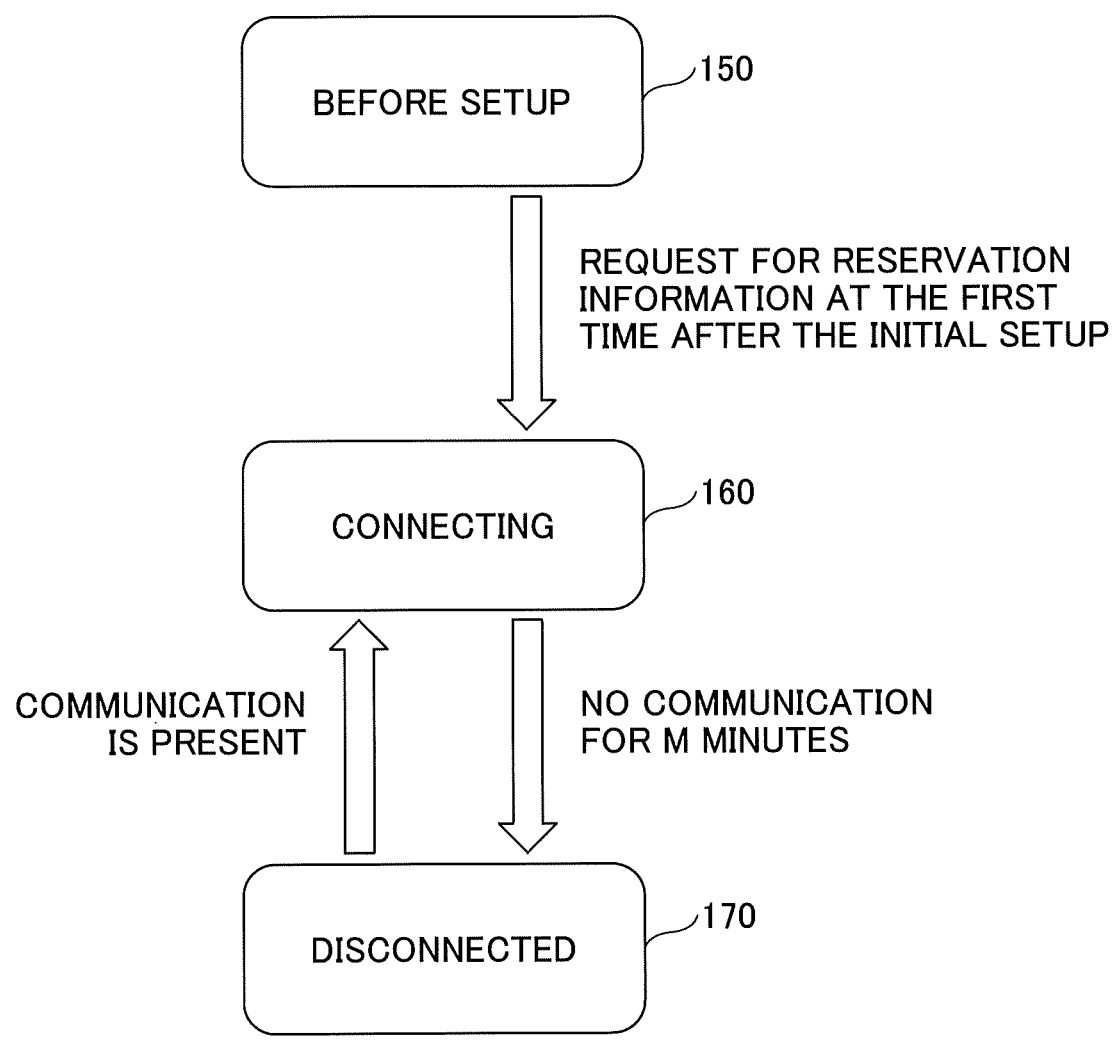
FIG. 8 is an example of a transition diagram illustrating the state of the meeting room terminal.

FIG. 8 is an example of a transition diagram of the state of the meeting room terminal 90.

A transition is made from the pre-setup 150 to the connecting 160 when the first reservation information is requested by the meeting room terminal 90 after the initial setting of the meeting room terminal 90. The setup and the initial setting are almost the same, and mean that the administrator can link the meeting room terminal 90 and the meeting room to make it possible to communicate with the meeting administration server 30. Specifically, the meeting room ID 991, the authentication key 992, the server URL 993, and the meeting room name 994 are stored in the memory unit 99.

From the connecting 160 to the connecting disconnecting 170, a transition is made when the meeting administration server 30 cannot detect a communication from the meeting room terminal 90 for M minutes (when a request for reservation information has not been received for a certain period or more).

M min is sufficient for a fixed period of time. If N minutes of the access time recording interval (e.g., a predetermined time longer than the periodic request interval) is 5 minutes, the M minute may be greater than 5 minutes as described above. In this embodiment, the M minute is about 10 minutes which can be estimated that the access time cannot be recorded consecutively twice. However, N and M are not limited to these.

Because the state of the meeting administration server 30 does not change until the time when communication is not detected continues for M minutes, it is possible to prevent the connection from being determined to be disconnected due to a temporary communication error. Further, as described above, the N-th is determined so that the load of the meeting room setting information DB 498 of the meeting administration server 30 is not increased, and the M-th inevitably exceeds the N-th. Therefore, it is possible to prevent the load of the meeting administration server 30 from increasing.

A transition is made from the disconnection 170 to the connecting 160 when the meeting administration server 30 detects a communication from the meeting room terminal 90. In other words, upon detection of communication, the connection is immediately switched from disconnection to connection. Once communication becomes possible, communication is often possible continuously thereafter. Upon detection of communication, the connection can be immediately switched from disconnection to connection, thus omitting the process of monitoring whether the communication is continuing or not.

<Example of Checking the Status of the Meeting Room Terminal>

Figure 9:
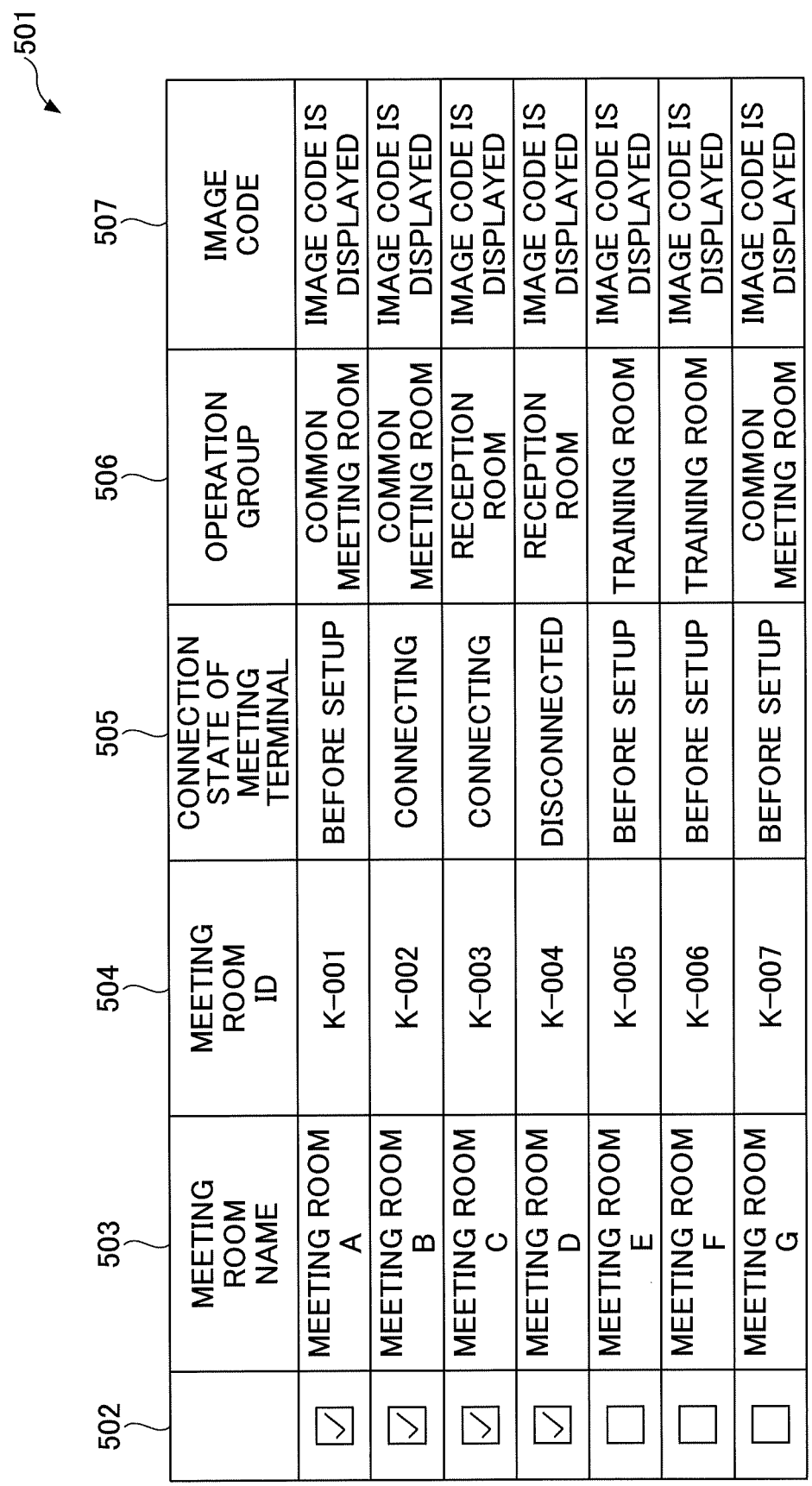
FIG. 9 is a diagram illustrating an example of a setting screen displayed by a registration terminal.

FIG. 9 is an example of the setting screen 501 displayed by the registration terminal. The setting screen 501 can be displayed when the administrator logs in to the meeting administration server 30. The setting screen 501 displays a check mark field 502, a meeting room name field 503, a meeting room ID field 504, a connection state field 505 of the meeting room terminal 90, an operation group field 506, and an image code field 507 (for example, a QR code (registered trademark)). The contents of the column are stored in the meeting room setting information DB 498 in Table 9, except for the operational group. The operation group determines the operation policy of the meeting room. The meeting room used by general employees, the meeting room used by the board member, the reception room, the training room, etc., can be mentioned as the meeting rooms, and there are cases where the operation policy is changed depending on the group.

For example, in the common meeting room, the start time of day of the meeting may be the timing of automatic cancel, while in the reception room, the timing of automatic cancel may be delayed in consideration of the possibility of a guests delaying. The timings of reminders may be different between the training room (an earlier start time of day is required for the preparation of the training) and the common meeting room.

In accordance with a connection state field 505 of the meeting room terminal 90, the administrator can check the state of the meeting room terminal 90 in each meeting room. For example, if the connection is disconnected, it is possible to deal with by checking the situation immediately.

A check mark field 502 corresponds to an administration start flag in the meeting room setting information DB 498 in Table 9. True is checked and False is not checked. The presence of the check mark field 502 prevents the meeting administration server 30 from starting administration of the meeting room, particularly the automatic cancel, even after the initial setting has been completed. For example, if the workplace 102 for administrator is away from the meeting room, it takes time for the administrator to initially set up the meeting room terminal 90 and set it to the meeting room. In a time period between the initial setup and the setting to the meeting room, when the cancel time of day of the meeting expires, there is a probability that the reservation of the meeting room may be canceled even though there remains a participant, and other people may enter the room.

When the administrator initially set up a great number of meeting room terminals 90, it may take a time for the administrator to initialize the last meeting room terminal 90 from the initial setting of the first meeting room terminal 90. During this time, when the cancel time of day of the meeting room expires, there is a probability that the meeting room reservation may be canceled even though the participant remains and others may enter the room.

Depending on the operation, it is also effective when the meeting rooms are required to start to be administered almost simultaneously.

The image code field 507 illustrated in FIG. 9 can be pressed by the administrator. When the administrator presses the image code field 507 in an arbitrary meeting room, the operation reception unit 52 of the registration terminal 50 accepts the press, and the registration terminal 50 requests the meeting administration server 30 to send the image code. Therefore, the communication unit 51 of the registration terminal 50 can receive the image code including the communication setting information (a meeting room ID 991, an authentication key 992, a server URL 993, and a meeting room name 994). The image code displayed by the registration terminal 50 is initially set by reading by the meeting room terminal 90.

Although FIG. 9 illustrates a plurality of meeting rooms, when the provider of the resource reservation system 100 does not make various settings related to the meeting rooms of the customer to the meeting administration server 30, none of them is displayed at all.

<Operation Procedure>

Figure 10:
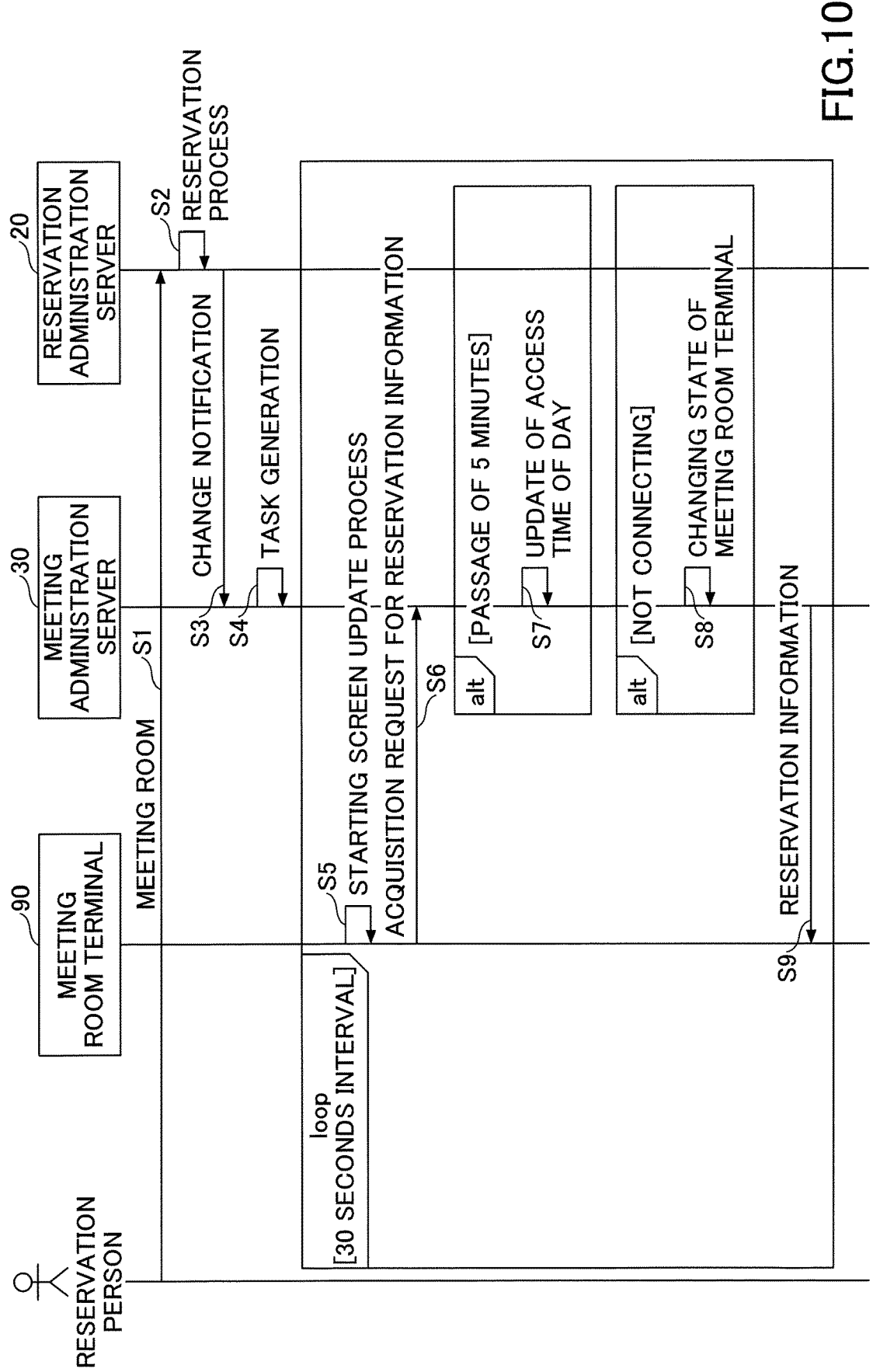
FIG. 10 is an example of a sequence diagram illustrating a procedure in which the meeting administration server records an access time of day.

FIG. 10 is an example of a sequence diagram illustrating a procedure for recording an access time of day by the meeting administration server 30. The process of FIG. 10 starts when the initial setting is completed.

S1: The reservation person operates the terminal device 60 to set the reservation of the meeting room to the reservation administration server 20.

S2: The reservation information administration unit 22 of the reservation administration server 20 stores the reservation information in the reservation information DB 291.

S3: The communication unit 21 of the reservation administration server 20 transmits the issue that the reservation information is changed to the meeting administration server 30. Accordingly, the reservation information acquiring unit 33 of the meeting administration server 30 requests the reservation information to synchronize the reservation information. The reservation information may be attached to the change notification.

S4: The reservation information acquiring unit 33 generates the task of automatic cancel based on the reservation information and registers it in the task queue 499.

The following process is performed every polling interval (e.g., 30 seconds).

S5: Because the interval of the polling is based on the update of the standby screen described later, the display control unit 94 of the meeting room terminal 90 starts updating the screen.

S6: The reservation information requesting unit 96 of the meeting room terminal 90 designates the meeting administration server 30 using the server URL, transmits the meeting room ID and the authentication key through the transmission unit 31a, and requests reservation information. The communication unit 31 of the meeting administration server 30 receives a request for reservation information and the reservation information transmitting unit 39 authenticates using the authentication key. According to this embodiment, the reservation information transmitting unit 39 transmits the reservation information specified by the meeting room ID to the meeting room terminal 90 as the authentication is successful.

S7: The terminal state administration unit 41 of the meeting administration server 30 reads out the access time of day associated with the meeting room ID from the cache of the meeting room setting information DB 498. Because the access time of day is read not from the meeting room setting information DB 498 but from the cache, it is difficult to increase the load of the meeting room setting information DB 498 even if the reading is executed at polling intervals. The cache is a faster memory device than an ordinary memory device and temporarily stores data in order to enable faster access to the data. In this embodiment, the meeting room setting information DB 498 is a slow memory device and the memory 202 of FIG. 4 is a high speed memory device. The function of the cache can be used if it is an ordinary database.

The terminal state administration unit 41 compares the access time of day and the present time of day to determine whether N minutes (for example, 5 minutes) have passed from the access time of day. When it has passed, the terminal state administration unit 41 updates the access time of day of the meeting room setting information DB 498 in place of the cache. The meeting room setting information DB 498 records the latest access time of day into the cache.

S8: The terminal state administration unit 41 reads out the state of the meeting room terminal 90 from the cache of the meeting room setting information DB 498 and determines whether the state is "connecting". In other words, it is determined whether the connection is "before setup" or "disconnected". When the state is not "connecting", the communication can be confirmed. Therefore, the terminal state administration unit 41 updates the state of the meeting room terminal 90 of the meeting room setting information DB 498 to "connecting".

S9: The reservation information transmitting unit 39 of the meeting administration server 30 transmits the reservation information to the meeting room terminal 90.

The reservation information requesting unit 96 of the meeting room terminal 90 receives the reservation information through the server communication unit 91. The display control unit 94 updates a standby screen based on the reservation information. Details are given below.

Through the above processes, the access time of day is recorded every N minute.

Figure 11:
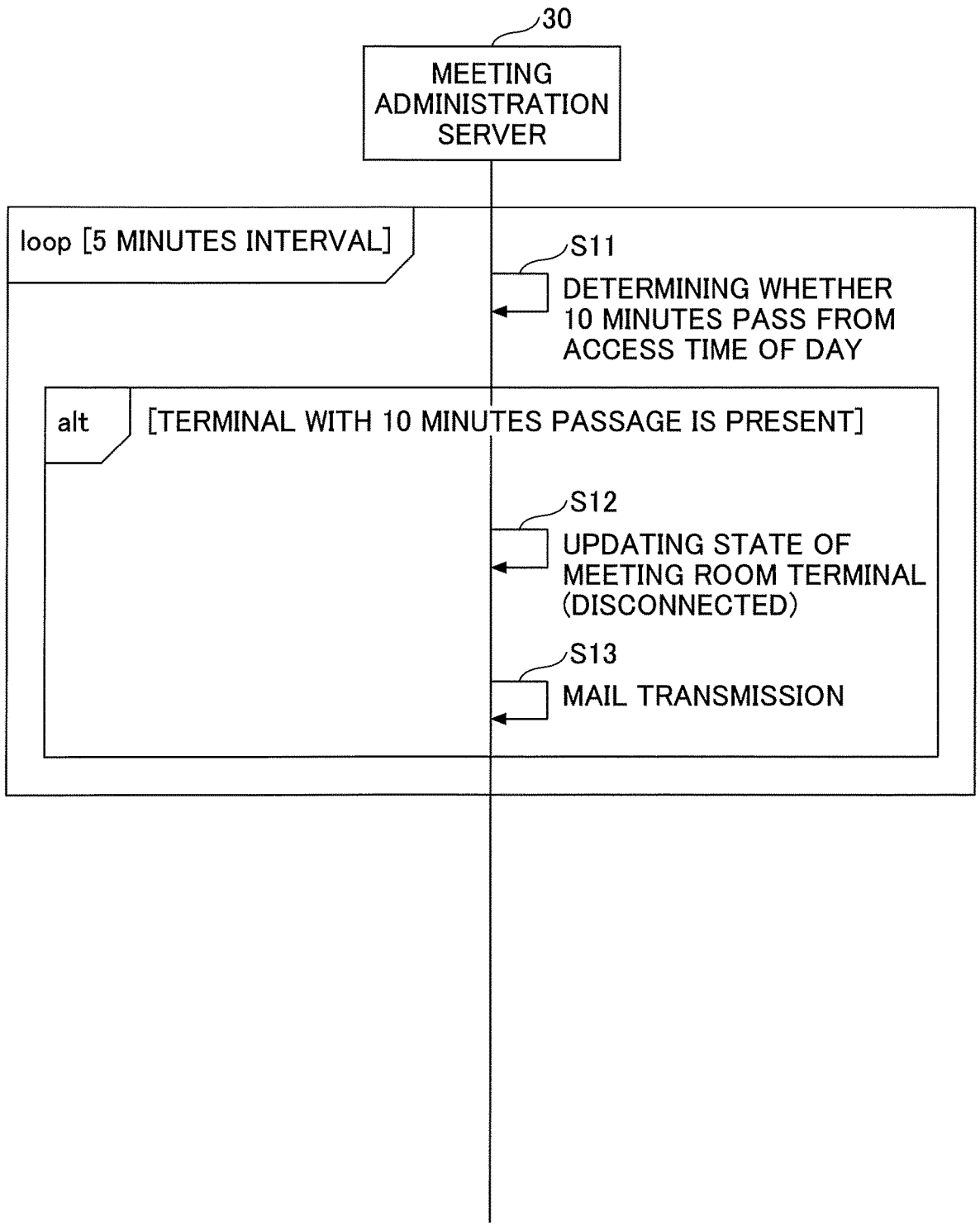
FIG. 11 is an example of a sequence diagram of a procedure in which a terminal state administration unit transfers the state of the meeting room terminal.

FIG. 11 is an example of a sequence diagram of a procedure in which the terminal state administration unit 41 transfers the state of the meeting room terminal 90. The terminal state administration unit 41 repeats this process every N minute. The state of the meeting room terminal 90 can be determined based on the updated access time by processing the access time at the same interval as the updated access time of day. The repeated intervals may be shorter than N minutes, but the load is increased. The repeated intervals may be longer than N minutes, but the load is reduced while the timing of detecting an undetected connection is delayed.

S11: The terminal state administration unit 41 reads out the access time of day from the cache of the meeting room setting information DB 498 and determines whether the difference between the present time of day and the access time of day exceeds M minutes (for example, 10 minutes, an example of a threshold value) compared with the present time of day. Only the meeting room in which the state of the meeting room terminal 90 is "connecting" is determined. This reduces the load.

S12: The terminal state administration unit 41 updates the state of the meeting room terminal 90 of the meeting room setting information DB 498 not of the cache to "disconnected" in a case where M minutes have passed from the access time of day, in other words, M minutes or longer, namely in a case where the access time is not updated. Therefore, it is detected that the communication of the meeting room terminal 90 is not detected.

S13: The terminal state administration unit 41 sends an email to the administrator or the like and notifies that the state of the meeting room terminal 90 is "disconnected". The email includes the meeting room name or the meeting room ID. The email address of the administrator is stored in the customer domain DB 495.

As described above, the terminal state administration unit 41 can register "disconnected" to the meeting room setting information DB 498.

Figure 12:
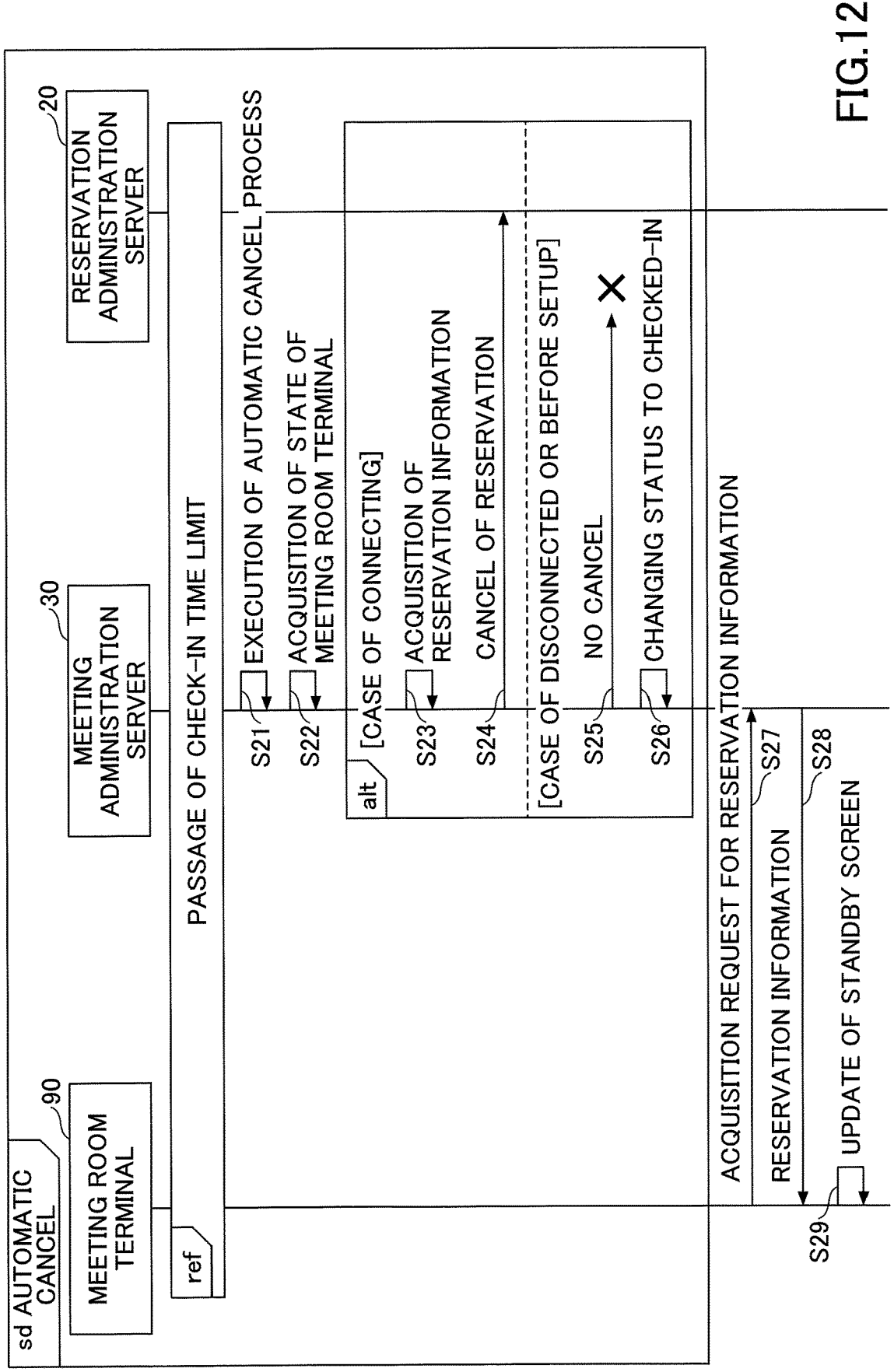
FIG. 12 is an example of a sequence diagram illustrating a process in which a check-in administration unit cancels or does not reserve the meeting room.
Figure 14A:
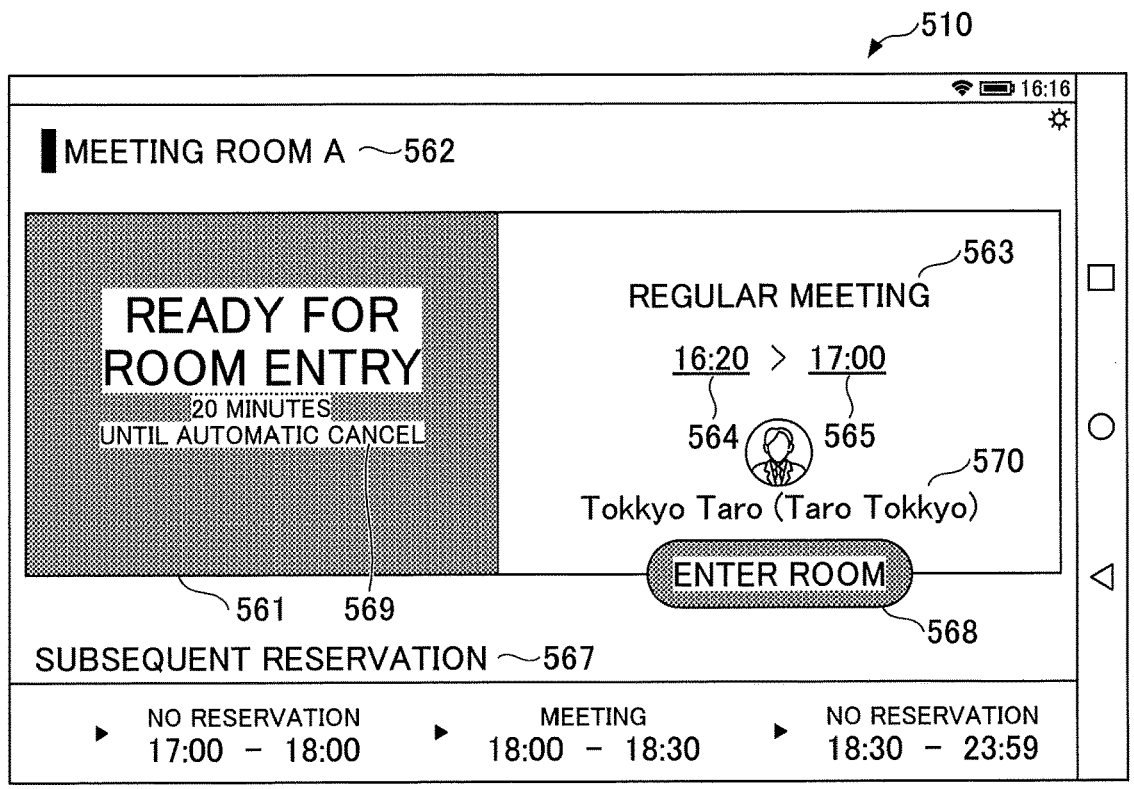
FIGS. 14A and 14B are diagrams illustrating an example of a standby screen.

FIG. 12 is an example of a sequence diagram illustrating a process in which the check-in administration unit 38 cancels or does not cancel the reservation of the meeting room. The process of FIG. 12 is executed when the check-in time limit expires because the above task is executed at the time when the check-in time limit expires. The check-in time limit is, for example, 10 minutes after the start time of day of the meeting. When the check-in time limit expires, a standby screen displayed by the meeting room terminal 90 is "Waiting for entry" as illustrated in FIG. 14A.

S21: The task execution unit 40 starts executing the automatic cancel task. That is, the task of automatic cancel is executed only when a predetermined time passes from the start time of day of the reservation information. This enables the reservation information that is automatically canceled to be limited to the reservation information for which a predetermined time has passed from the start time of day.

S22: The task execution unit 40 acquires the state of the meeting room terminal 90 of the meeting room specified by the reservation ID set to the task from the meeting room setting information DB 498.

When the state of the meeting room terminal 90 is "connecting", step S23 and step S24 are executed.

S23: The task execution unit 40 acquires the meeting administration information (reservation information) specified by the reservation ID set for the task from the meeting administration information DB 493. This is to confirm the existence and status of the meeting administration information (reservation information) specified by the reservation ID.

S24: Because the task is executed while the state of the meeting room terminal 90 is "connecting" (because the status of the meeting administration information DB is not updated to "already checked-in", the task execution unit 40 designates the reservation ID and requests the reservation administration server 20 to cancel the reservation of the meeting room. The information is sufficient to specify the reservation information such as the meeting room ID and meeting time of day, rather than the reservation ID. Accordingly, the reservation administration server 20 cancels the reservation information. Specifically, the reservation information is deleted.

When there is the deleted reservation information, the reservation administration server 20 specifies the deleted reservation information and transmits the reservation information to be administered to the meeting administration server 30. When the meeting administration server 30 requests the reservation administration server 20 to cancel, the cancel is also reflected in the meeting administration information DB 493 of the meeting administration server 30. The status of the meetings administration information DB 493 becomes "canceled". Alternatively, the reservation information may be deleted.

By canceling the reservation of the meeting room in the reservation administration server 20, the canceled reservation information is deleted so that an arbitrary user can reserve the canceled meeting room in a range from the start time of day to the end time of day of the canceled reservation information (enabling a registration of the reservation information different from the reservation information canceled for the meeting room in which the reservation information was canceled), thereby reducing an empty reservation.

As illustrated in steps S27 to S29, because the reservation information (status) of the meeting administration information DB 493 is transmitted to the meeting room terminal 90, the meeting room terminal 90 can reflect this cancel on the standby screen.

When the state of the meeting room terminal 90 is not "connecting" ("disconnected" or "before setup"), step S25 is executed.

S25: The task execution unit 40 does not cancel the reservation of the meeting room because it is estimated that the check-in administration unit 38 of the meeting administration server 30 cannot receive the check-in request even if the reservation person checks in because the state of the meeting room terminal 90 is not "connecting". Said differently, the cancel is not requested to the reservation administration server 20.

S26: The task execution unit 40 may assume that the reservation person has checked in and update the status of the meeting administration information DB 493 specified by the reservation ID to "already checked-in". Thus, the fact is displayed on the standby screen of the meeting room terminal 90, indicating that the meeting room is being used. Double reservations of the meeting room can also be eliminated.

S27 and S28: As previously described, the reservation information whose status has been changed is transmitted to the meeting room terminal 90.

Figure 14B:
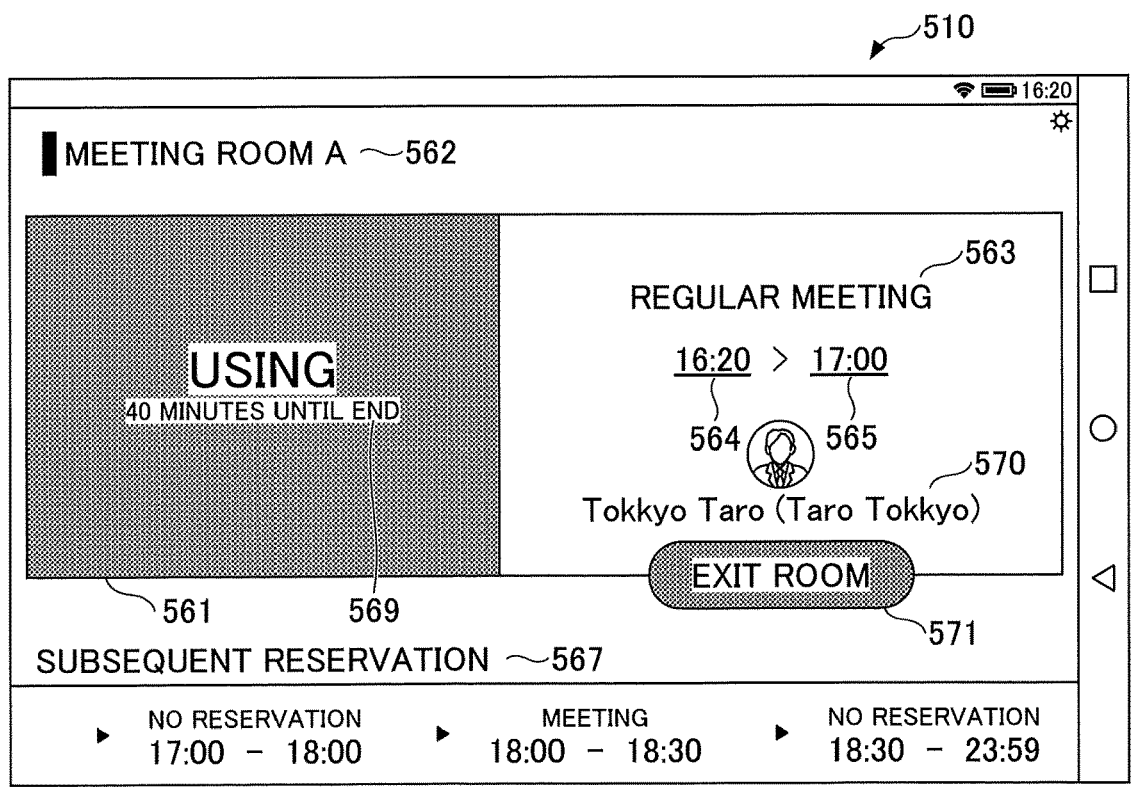
Figure 15:
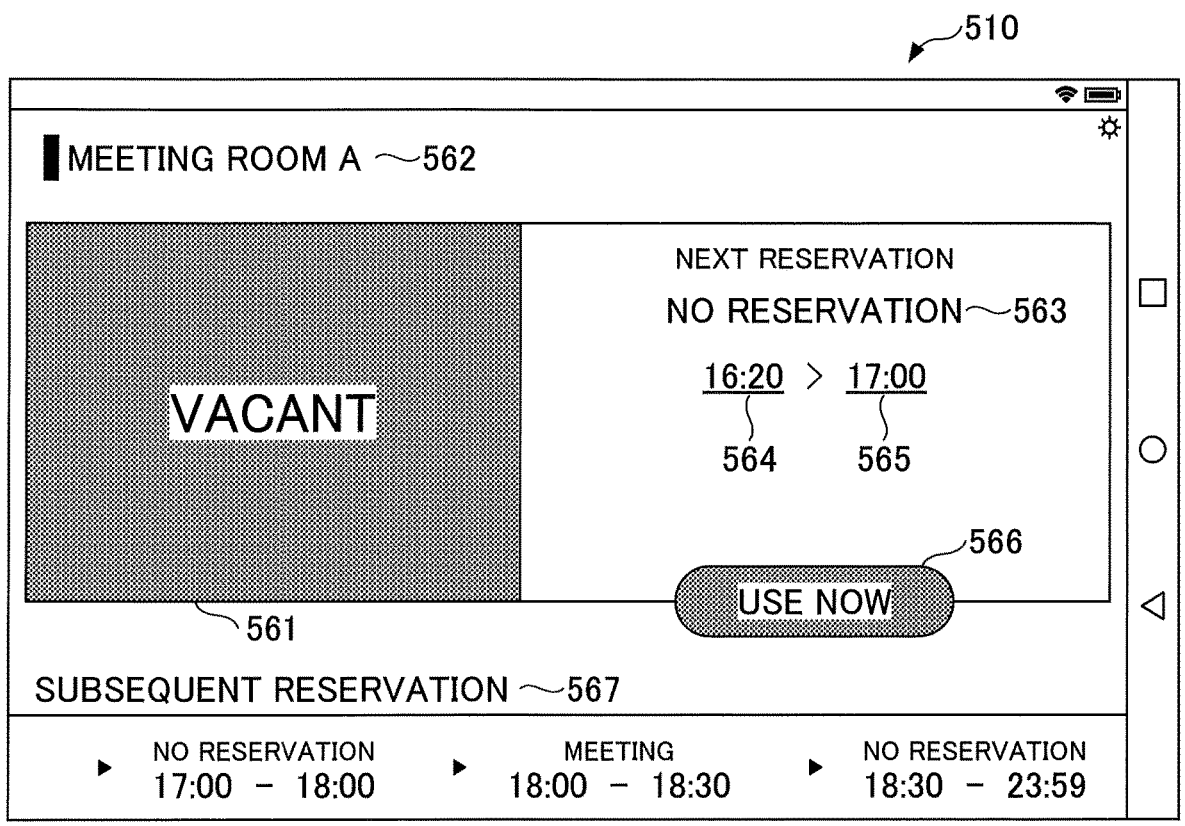
FIG. 15 is a diagram illustrating an example of a standby screen.

S29: The display control unit 94 of the meeting room terminal 90 displays a standby screen with the status reflected. For example, when the reservation is canceled in step S24, as illustrated in FIG. 15, it is displayed that the standby screen is "vacant". When the reservation is not canceled and is considered to have been checked in as in step S25, as illustrated in FIG. 14b, *"using" is displayed on the standby screen.*

Figure 13:
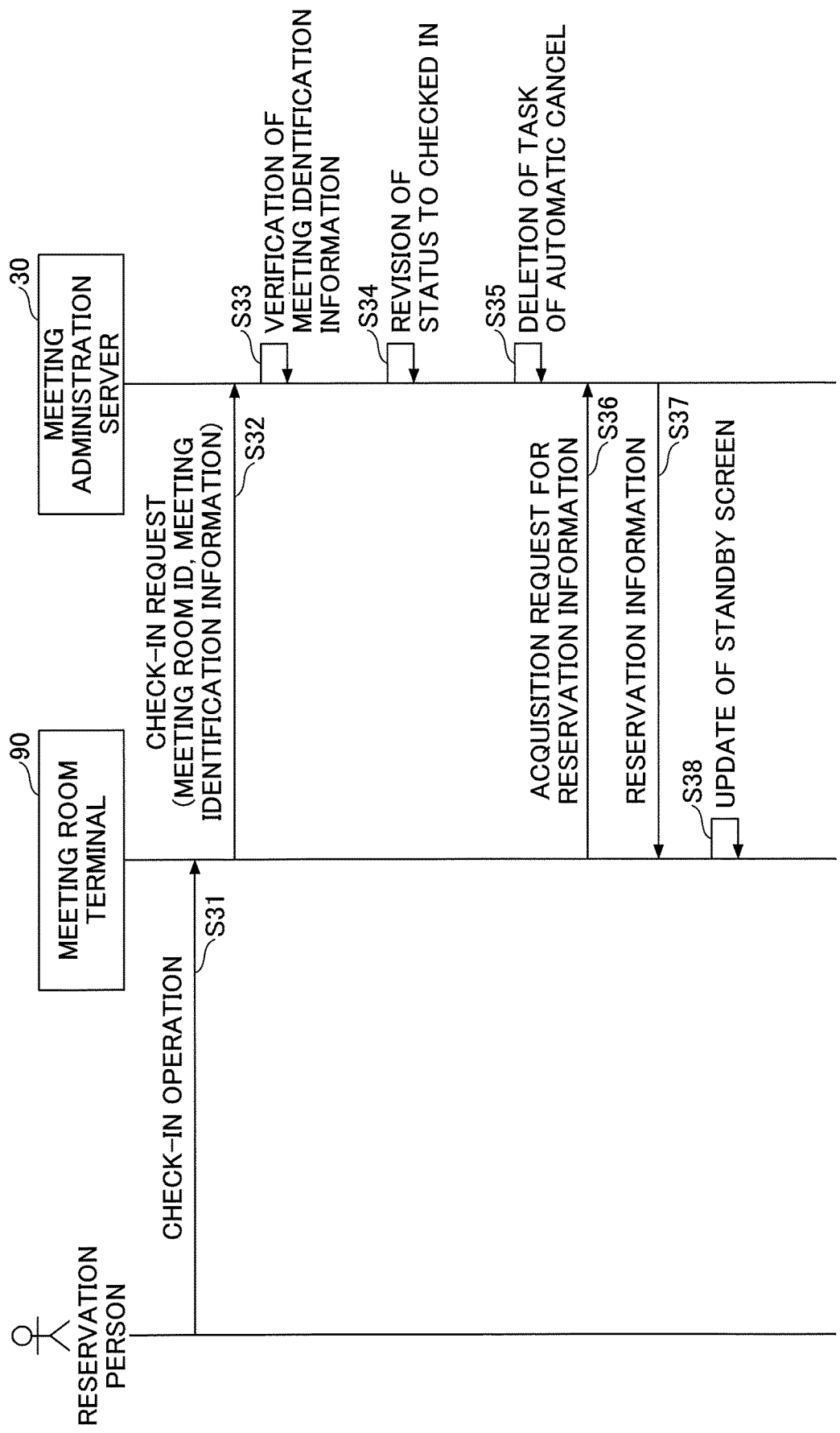

For a supplementary purpose, the process when the check-in request is transmitted by the meeting room terminal 90 to the meeting administration server 30 will be described with reference to FIG. 13. FIG. 13 is an example of a sequence diagram illustrating a process in which the reservation person checks.

S31: The reservation person who goes to the meeting room performs a check-in operation to the meeting room terminal 90. In this case, the meeting room terminal 90 displays a standby screen of "ready for room entry" as illustrated in FIG. 14A.

S32: The operation reception unit 93 or the like of the meeting room terminal 90 receives a check-in operation. For example, the operation reception unit 93 receives the meeting identification information input to the touch panel, and the terminal device communication unit 92 receives the meeting identification information through short-range wireless communication. The server communication unit 91 specifies the meeting room ID and the meeting identification information and transmits a check-in request to the meeting administration server 30.

S33: The reception unit 31b of the meeting administration server 30 receives the check-in request, and the check-in administration unit 38 verifies the meeting identification information. That is, in the meeting identification information DB 494, it is determined whether the received meeting identification information matches the meeting identification information associated with the meeting room ID. In the description of FIG. 13, it is assumed to be the same. The check-in administration unit 38 acquires the reservation ID associated with the meeting room ID from the meeting identification information DB 494. If the reservation ID or the information specifying the reservation information (such as the meeting room ID and the start time of day) is transmitted in step S31, the reservation ID may not be acquired from the meeting identification information DB 494.

S34: Because the check-in administration unit 38 permits check-in, the status associated with the reservation ID in the meeting administration information DB 493 is updated to "already checked-in".

S35: Because the check-in is detected, the check-in administration unit 38 deletes the task specified by the reservation ID from the task queue 499.

S36: The reservation information requesting unit 96 of the meeting room terminal 90 requests the meeting administration server 30 to make reservation information at a periodic timing through the server communication unit 91.

S37: Accordingly, the reservation information requesting unit 96 acquires reservation information through the server communication unit 91. Without waiting for the periodic timing, the transmission unit 31a of the meeting administration server 30 may transmit the reservation information in response to the check-in request. This enables the meeting room terminal 90 to reflect the check-in to the standby screen earlier.

S38: The display control unit 94 of the meeting room terminal 90 displays a standby screen with the status reflected. For example, because the check-in is permitted, the status is updated to the standby screen indicating "using" as illustrated in FIG. 14B, as in the case where the check-in is regarded as a check-in.

As described above, when the state of the meeting room terminal 90 is "disconnected" when the automatic cancel is determined, because the resource reservation system 100 does not automatically cancel, the meeting room can be used by the participants who are actually in the meeting room.

<Stand-By Screen>

The waiting screen will be described with reference to FIGS. 14A to 15. FIG. 14A illustrates an example of the standby screen 510 displayed by the meeting room terminal 90 when the meeting room is currently vacant but is within a predetermined time (e.g., 10 minutes) until the next meeting starts. The standby screen 510 displays the current situation field 561, the meeting room name field 562, the meeting name field 563, the start time of day field 564, the end time of day field 565, the enter room button 568, a subsequent reservation field 567, and so on.

The current situation field 561 illustrates the present situation of the meeting room. Ten minutes before the start time of day, the status changes to "check-in possible" or the like. Therefore, the display control unit 94 displays "ready for room entry" in the current situation field 561 and permits the check-in by displaying the enter room button 568. Said differently, the reservation person can check in. If the meeting room terminal 90 does not transmit the check-in request before the task of automatic cancel is executed as described above, the task execution unit 40 automatically cancels the request. Therefore, the display control unit 94 counts down the time 569 until the automatic cancel and displays the current situation field 561.

The meeting room name of the meeting room stored in the memory unit 99 is displayed in the meeting room name field 562. The meeting name of the meeting included in the reservation information is displayed in the meeting name field 563. The start time of day and end time of day contained in the reservation information are displayed in the start time of day field 564 and the end time of day field 565. The subsequent reservation field 567 will show the start and end time of days of each meeting booked later than the present according to the reservation information.

The enter room button 568 is a button for the user to check in. Clicking this button enables the reservation person to enter meeting identification information. The reservation person information is displayed in the reservation person name field 570. The reservation person may be an account included in the reservation information, or the name or nickname of the reservation person may be transmitted from the meeting administration server 30.

Once the enter room button 568 is pressed, the meeting identification information is transmitted to the meeting administration server 30, and the check-in is admitted, the status of the meeting room is changed to "already checked in". As illustrated in FIG. 14B, the status change is also reflected on the standby screen 510 when the meeting room terminal 90 receives the reservation information.

FIG. 14B illustrates an example of the standby screen 510 displayed by the meeting room terminal 90 when the meeting room is currently using. In the standby screen 510 of FIG. 14B, the current situation field 561 indicates "using" and an exit room button 571 is displayed. When the reservation person checks in, the status of the meeting administration information DB 493 becomes "already checked in". When the meeting room terminal 90 receives the reservation information, the display control unit 94 detects that the status is "already checked in". The display control unit 94 displays the current situation field 561 as "using" and displays the exit room button 571 until the status becomes "checked out". The display control unit 94 counts down the time until the end time of day and displays the time in the current situation field 561.

The exit room button 571 is a button for the reservation person to check out. When this button is pressed, a check-out request is sent to the meeting administration server 30, and the check-in administration unit 38 of the meeting administration server 30 updates the status of the meeting administration information DB 493 to be "already checked out". When the meeting room terminal 90 receives the reservation information, the display control unit 94 displays "vacant" (until the check-in of next reservation is enabled) or "ready for room entry" (after the check-in of next reservation is enabled) in the current situation field 561.

In this embodiment, even when the reservation person presses the enter room button 568 on the standby screen 510 of FIG. 14A and the check-in request is not transmitted to the meeting administration server 30 (because this is disconnected), the standby screen 510 of FIG. 14B may be displayed because the task execution unit 40 considers that the check-in has been performed.

This effect is additionally described. Even if the communication between the meeting room terminal 90 and the meeting administration server 30 resumes after the start of the meeting, the reservation person may not perform the check-in operation. In this case, although the automatic cancel is not performed in this embodiment, the standby screen remains as illustrated in FIG. 14A (ready for room entry). The time 569 to automatic cancel also has a negative value to thereby give uncomfortable feeling. On the other hand, in this embodiment, because the reservation person is considered to have checked in, the standby screen in FIG. 14B can be switched to the standby screen.

As a reference, the standby screen 510 when the automatic cancel is performed is illustrated. FIG. 15 illustrates an example of the standby screen that changes from FIG. 14A when it is automatically canceled. The display control unit 94 of the meeting room terminal 90 displays the status of the reservation information in the current situation field 561. If there is no reservation information at the present time of day, the displayed current status is "vacant" or "ready for room entry". Also displayed is the use start button 566 for use without reservation.

Modified Example

A modified example of the embodiment of this embodiment that improves the above embodiment will be described. For example, a meeting room may be booked between 15:00 and 16:00. Consequently, the automatic cancel is performed if the reservation person does not check in by 15:10 (in the case where the check-in time limit is 10 minutes after the start time of day of the meeting). Here, the state of the meeting room terminal 90 transits such that: until 15:08 disconnected; and 15:08 connecting. In this case, it is sufficient for the reservation person to check in between 15:08 and 15:10 (press the enter room button). However, it may be difficult to do so within 2 minutes. In this case, because the task is connecting at 15:10 that is the check-in time limit when the task is executed, it is automatically canceled.

Therefore, the terminal state administration unit 41 records the update time when the state of the meeting room terminal 90 is updated. It is effective for the meeting administration server 30 to process as follows.

TABLE 11

MEETING ROOM SETTING INFORMATION DB

| MEETING ROOM NAME | MEETING ROOM ID | STATE OF MEETING TERMINAL | AUTHENTICATION KEY | ADMINISTRATION START FLAG | ACCESS TIME OF DAY |
|---|---|---|---|---|---|
| MEETING ROOM A | K-001 | CONNECTING (20XX/10/15 9:00) | ***** | True | 20XX/10/15 12:34 |
| MEETING ROOM B | K-002 | CONNECTING (20XX/10/15 12:48) | ***** | False | 20XX/10/15 12:48 |
| MEETING ROOM C | K-003 | DISCONNECTED (20XX/10/15 13:00) | ***** | True | 20XX/10/15 12:50 |

Table 11 illustrates an example of the meeting room setting information stored in the meeting room setting information DB 498. Table 11 explains the difference from Table 9. In Table 11, the update time is recorded in the state of the meeting room terminal.

In this case, the task execution unit 40 performs the following process. In a case where the update time of day is before the start time of day, the reservation is canceled even when the "connecting". In a case where the update time of day is after the start time of day, the reservation is not canceled even when the "connecting". If the update time is before the start time of day, a sufficient time margin is considered to exist to check in before the task of automatic cancel is executed. If the update time is after the start time of day, the meeting may have already started and there may not an enough time margin to check in before the task of automatic cancel is executed. Therefore, by using the update time of day to determine whether the task execution unit 40 automatically cancels as described above, it is possible to prevent the reservation from being automatically canceled even when the state is "connecting" immediately before the execution of the task for automatic cancel.

When the state of the meeting room terminal 90 is updated, the terminal state administration unit 41 may record the update time of day in the state field of the meeting room terminal 90.

Figure 16:
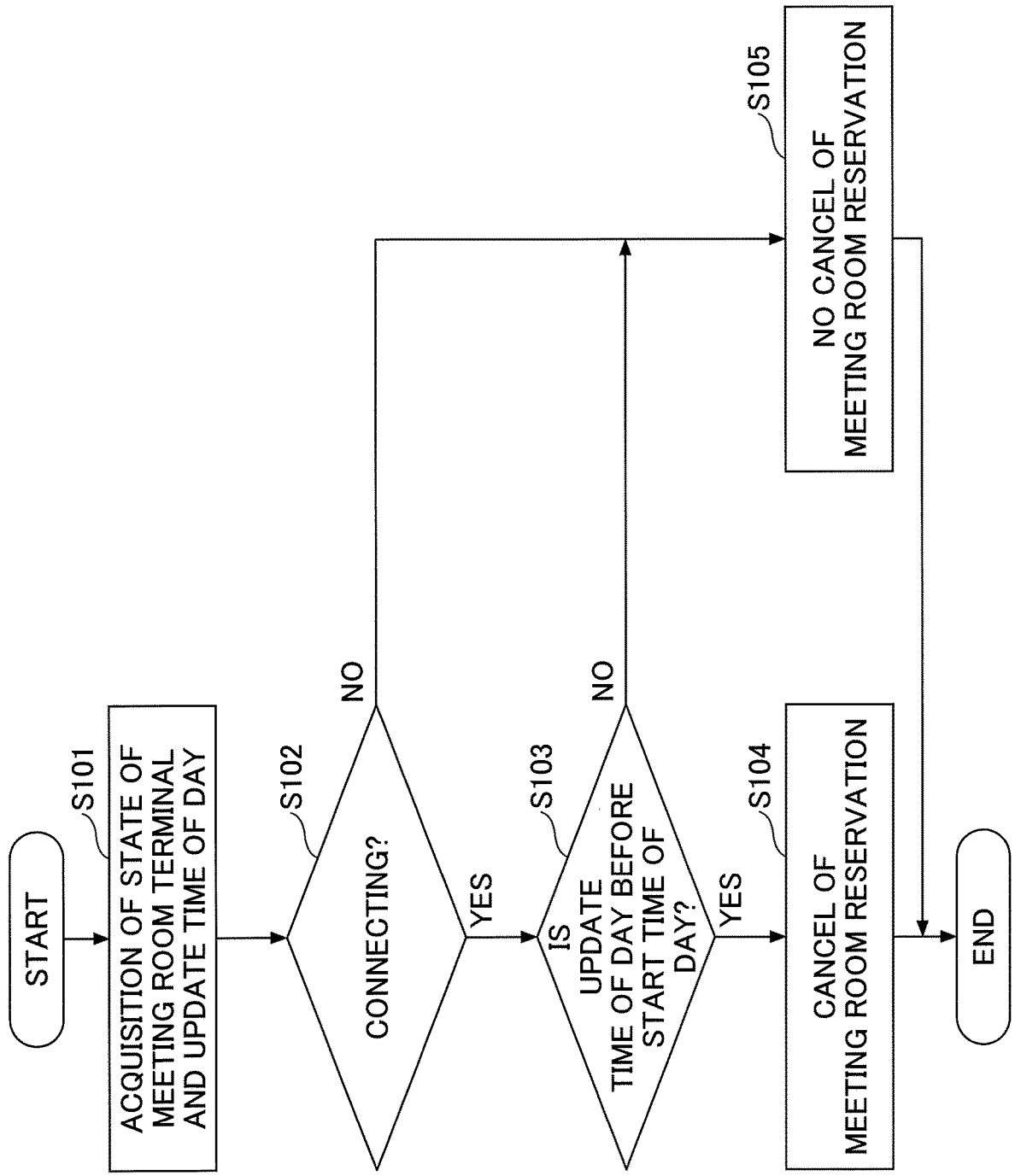
FIG. 16 is an example of a flowchart illustrating an automatic cancel procedure using an update time of day.

FIG. 16 is an example of a flowchart illustrating an automatic cancel process using an update time of day. The process of FIG. 16 starts when the task of automatic cancel is executed.

The task execution unit 40 acquires the state and the update time of day of the meeting room terminal 90 specified by the reservation ID set to the task from the meeting room setting information DB 498 (S101).

The task execution unit 40 determines whether the state of the meeting room terminal 90 is connected (S102).

When the determination of step S102 is NO, the task execution unit 40 does not cancel the reservation of the meeting room because the reservation person may have checked in.

When the determination of step S102 is Yes, the task execution unit 40 determines whether the update time is before the start time of day (S103). The opening time of the meeting is set in the reservation information of the meeting administration information DB 493 identified by the reservation ID.

When the determination in step S103 is NO, the task execution unit 40 does not cancel the reservation of the meeting room because the reservation person have possibly checked in (step S105).

When the decision in step S103 is Yes, the task execution unit 40 cancels the reservation in the meeting room because it is unlikely that the reservation person has checked in.

This process prevents the reservation from being canceled even if it is "connecting" just before the task of automatic cancel is executed.

The criterion for canceling or not canceling a connection while a task is running is not limited to the time before or after the start time of day. It is possible to compare the time just before or after the start time of day with the update time.

[Summary]

As described above, the resource reservation system 100 of this embodiment can prevent the automatic cancel when the meeting administration server 30 and the meeting room terminal 90 cannot communicate with each other.

Second Embodiment

In the resource reservation system 100 of the first embodiment, the state was "disconnected" when the user tried to check in. However, when the state is "connecting" at a determination time of day of the automatic cancel, the reservation may be automatically canceled after the user enters the room.

In this embodiment, the resource reservation system 100 will be described in which the automatic cancel is not performed in a case where the communication disconnection time of day is recorded from the check-in possible time to the determination time of day for automatic cancel.

<Automatic Cancel in First Embodiment>

Figure 17:
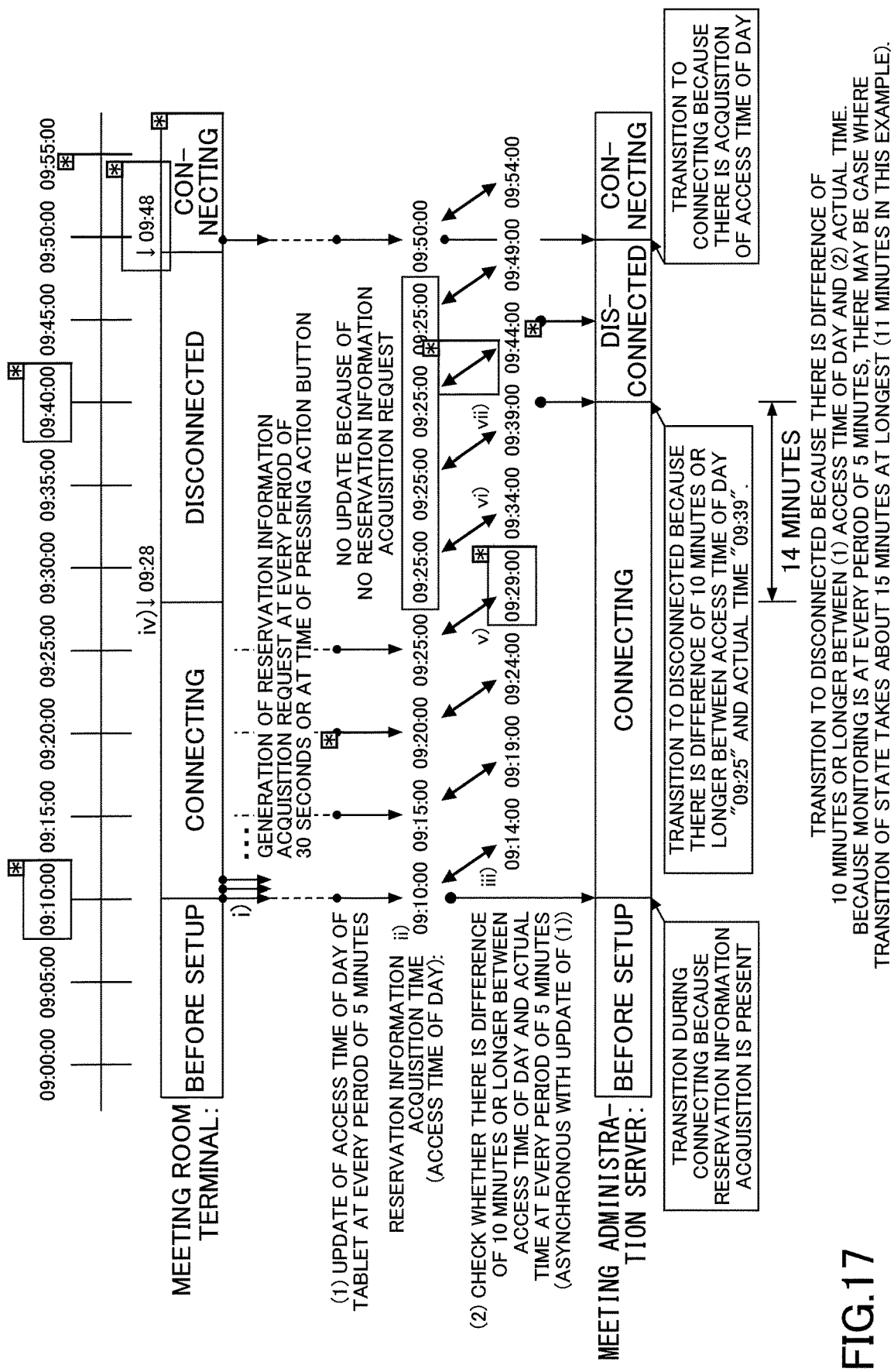
FIG. 17 is a diagram illustrating a situation in which a connection is disconnected when a user attempts to check in and is changed to connecting to at a determination time of day for automatic cancel.

FIG. 17 is a diagram illustrating a situation in which the state is "disconnected" when a user attempts to check in but is "connecting" at the determination time of day for the automatic cancel. FIG. 17 illustrates a relationship between whether the meeting room terminal 90 can actually communicate and the state of the meeting room terminal 90 set by the meeting administration server 30 to the meeting room setting information DB 498 during 09:00 and 10:00.

i) At 09:10, the administrator sets up the meeting room terminal 90, and the meeting room terminal 90 starts acquiring reservation information in a period of 30 seconds ("before setup" to "connecting"). Accordingly, the state of the meeting room terminal 90 set by the meeting administration server 30 to the meeting room setting information DB 498 is also "connecting".

ii) The meeting administration server 30 updates the access time of day (the request time of the reservation information) for a period of 5 minutes (N minutes of the first embodiment). Accordingly, in FIG. 17, the access time is updated as 09:10, 09:15, and 09:20 . . . .

iii) In order to detect "disconnected", the meeting administration server 30 determines whether there is a difference between the access time of day and the actual time of day by 10 minutes or longer (M minute in the first embodiment) in a period of 5 minutes (it is asynchronous with the record of the access time of day). In FIG. 17, the determination is made at timings such as 09:14, 09:19, and 09:24 . . . .

iv) At 09:28, the meeting room terminal 90 could not communicate with the meeting administration server 30. In this case, the last updated access time of day is 09:25.

v) The state of the meeting room terminal 90 of the meeting room setting information DB 498 remains "connecting" because the meeting administration server 30 still differs by only four minutes when comparing the access time of day with the actual time of day at 09:29.

vi) The state of the meeting room terminal 90 of the meeting room setting information DB 498 remains "connecting" because the meeting administration server 30 still differs by only 9 minutes when comparing the access time with the actual time to the 09:34.

vii) When the meeting administration server 30 compares the access time of day with the actual time of day at 09:39, there is a difference of 14 minutes or longer and the difference is 10 minutes or longer. Therefore, the meeting administration server 30 transits the state of the meeting room terminal 90 of the meeting room setting information DB 498 to "disconnected".

As described above, because the meeting administration server 30 monitors a period of 5 minutes, the state of the meeting room terminal 90 of the meeting room setting information DB 498 transits to "disconnected" after the meeting room terminal 90 ceases to communicate with the meeting administration server 30, there is a delay (a time lag) of up to 15 minutes (e.g., the access time of every five minutes is updated at 09:25, the meeting room terminal 90 stops communicating at 09:25, and is disconnected at 09:40. In the example of FIG. 17, the delay is 11 minutes). That is, the actual state of the meeting room terminal 90 and the state recognized by the meeting administration server 30 do not coincide with each other for a long time.

If there is a reservation starting at 09:30, you can't check in even if the user enters the room at 09:30. If the automatic cancel time is 09:35, because the state of the meeting room terminal 90 of the meeting room setting information DB 498 is "connecting", the meeting administration server 30 automatically cancels the reservation.

If there is a reservation starting at 10:00, and the user arrives early and enters the room at 09:45, the check-in is not possible. In FIG. 17, because the return time is 09:48, if the user performs the check-in operation after the return time, the automatic cancel is not performed. However, if the user does not notice the return time of the meeting room terminal 90, the automatic cancel is performed at 10:05.

<Example of Configuration>

First, in this embodiment, the hardware configuration diagram of FIGS. 4 to 5B described in Example 1 will be described as being capable of being incorporated.

Figure 18:
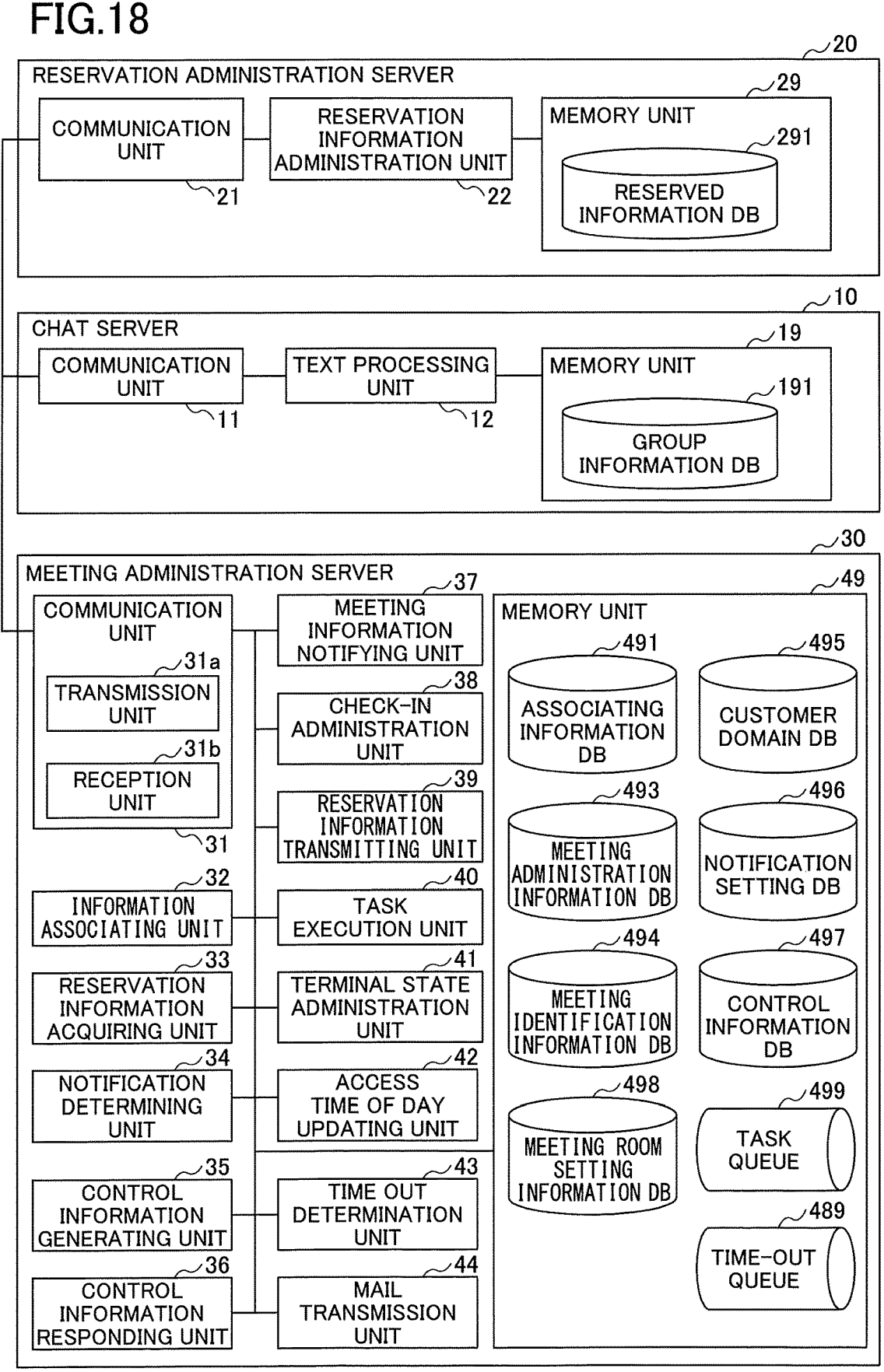
FIG. 18 is an example of a functional block diagram illustrating functions of the reservation administration server, the chat server, and the meeting administration server in a block pattern.

FIG. 18 is an example of a functional block diagram illustrating functions of the reservation administration server 20, the chat server 10, and the meeting administration server 30 according to this embodiment. In this embodiment, the identically signed components in FIG. 6 perform the same function, and therefore, only the main components of this embodiment may be described.

The meeting administration server 30 according to this embodiment includes an access time of day updating unit 42, a time-out determination unit 43, and a mail transmission unit 44. The access time of day updating unit 42 updates a time-out time of the time-out queue 489 stored in the memory unit 49 whenever the meeting room terminal 90 requests to acquire the reservation information. Accordingly, when the time-out time expires, the meeting room terminal 90 does not resultantly communicate with the meeting administration server 30.

The time-out determination unit 43 periodically checks the time-out queue 489 and determines whether there is a meeting room terminal 90 that has timed out. When there is the meeting room terminal 90 that has timed out, the terminal state administration unit 41 sets the "disconnected" at the communication disconnection time of day to the state of the meeting room terminal 90 of the meeting room setting information DB 498. As will be described later, the task execution unit 40 does not automatically cancel when the communication disconnection time of day is recorded from the check-in possible time of day to the automatic cancel time of day.

The mail transmission unit 44 transmits an email to the administrator when "disconnected" is recorded in the state of the meeting room terminal 90 of the meeting room setting information DB 498. Details are given below.

<<Time-Out Queue and Meeting Room Setting Information DB>>

Next, a time-out queue 489 will be described. In this embodiment, the time-out queue 489 is constructed in the memory unit 49.

TABLE 12

| MEETING ROOM ID | TERMINAL APP ID | TIME-OUT TIME |
|---|---|---|
| K-001 | AAAA | 2 min 00 sec |
| K-002 | BBBB | 1 min 11 sec |
| K-003 | CCCC | 0 min 39 sec |

Table 12 schematically illustrates the information stored in the time-out queue 489. The time-out time is registered in the time-out queue 489 in association with the meeting room ID and the terminal app ID. The meeting room ID is the same as that in the first embodiment. The terminal app ID is identification information that uniquely identifies the terminal app 90a installed in the meeting room terminal 90. For example, a Universally Unique Identifier (UUID) is used. The UUID is sufficient to be unique. Even when a plurality of meeting room terminals 90 is disposed in one meeting room by making the terminal app identifiable, the state can be administered for each meeting room terminal 90. The time-out time is the time to time out, and the initial value is P minutes (e.g., 2 minutes). The time-out time stored in the time-out queue 489 decreases (or may increase up to a predetermined time) with the passage of time unless the access time of day updating unit 42 is updated, and finally becomes zero. The state of zero is referred to as "timed out".

By setting the timer in this manner, even when it is impossible to communicate from the meeting administration server 30 to the meeting room terminal 90, the disconnection can be detected. That is, although it is desired as the meeting administration server 30 to detect that communication with the meeting room terminal 90 is impossible, there may be a case where an environment of enabling communication from the outside of the firewall to the inside is not prepared.

On the other hand, the meeting administration server 30 is unable to detect an omission (the fact that there is no communication) from the meeting room terminal 90. Therefore, the mechanism of the meeting administration server 30 prepares a timer and does not time out when there is communication from the meeting room terminal 90. Therefore, when the timer times out, it is possible to detect that there is no communication from the meeting room terminal 90.

The mechanism for substantializing the time-out queue 489 may depend on the environment provided by the cloud service. For example, in a cloud service that provides a mechanism for retaining an invisible message, the message set with an invisible time period is used instead of the time-out time. The content of the message is the terminal app ID. This message is invisible during the invisible period, but after the invisible period has passed, the meeting administration server 30 is able to check the message.

Because a processing load of confirming the invisible messages is low (because it is invisible, there is no object to be monitored), the increase in the processing load can be suppressed by checking whether there is the meeting room terminal 90 in which the meeting administration server 30 times out in a relatively short period of time.

Assuming that the invisible message is applied to the time-out queue, the timer count value is invisible until the time-out (unnecessary or difficult to confirm) and the time-out will reveal the timed-out terminal app ID (which meeting room terminal 90 will know which one has timed out).

Accordingly, by appropriately setting the time-out time and checking for the presence or absence of the time-out in a relatively short period, it is possible to reduce the time from when the meeting room terminal 90 does not communicate with the meeting administration server 30 until the state of the meeting room terminal 90 of the meeting room setting information DB 498 changes to "disconnected".

communication disconnection time of day is the time when the state of the meeting room terminal 90 is determined to be disconnected. A plurality of communication disconnection times of day may be recorded in one meeting room terminal 90. As described above, by recording the communication disconnection time of day for each meeting room terminal 90, it is possible to determine whether the communication disconnection time of day is recorded between the check-in possible time and the automatic cancel time of day.

<Communication Status of a Meeting Room Terminal and Status of the Meeting Room Terminal in the Meeting Room Setting Information DB>

Figure 19:
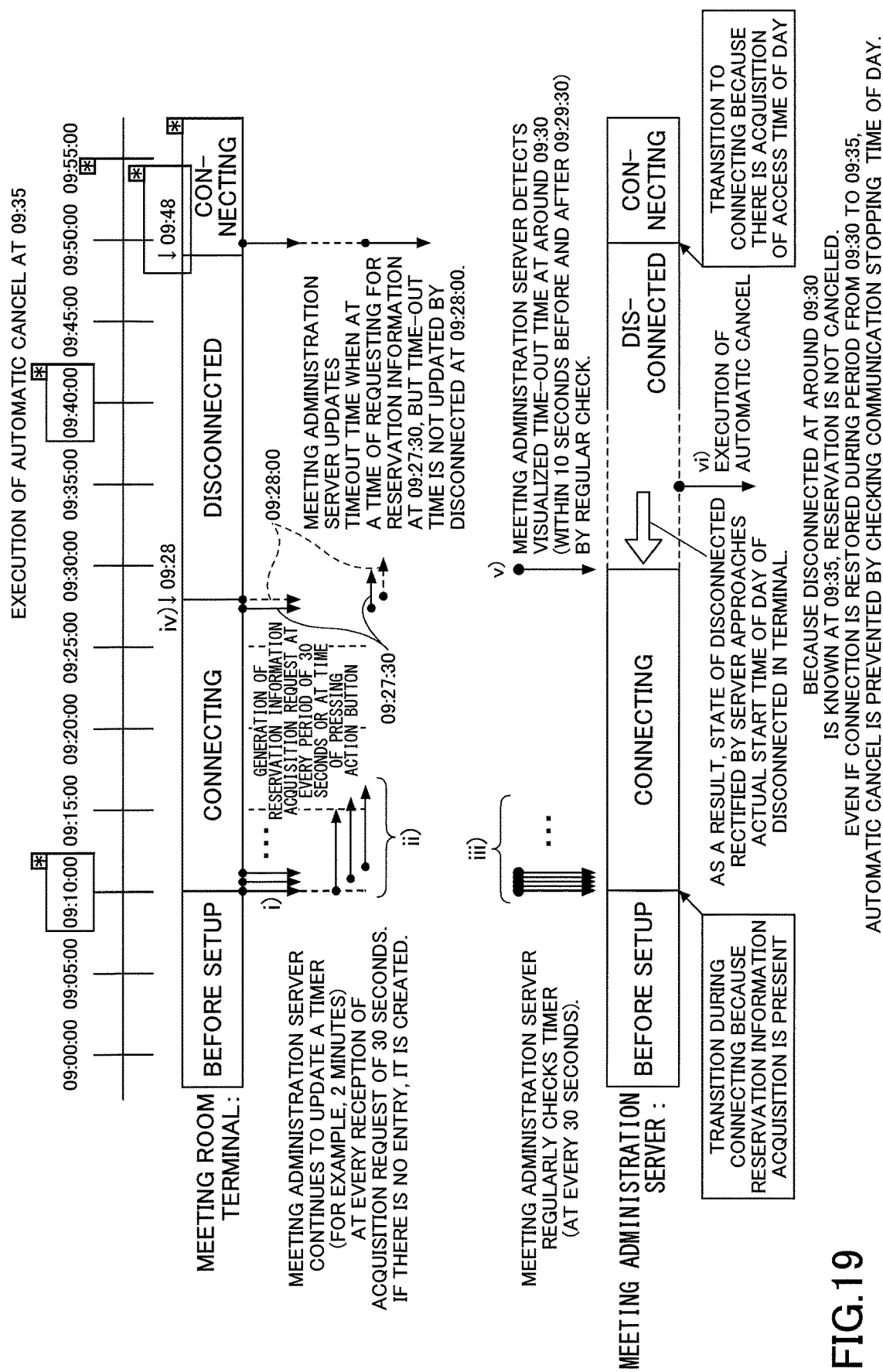
FIG. 19 is an example of a diagram illustrating a relationship between whether the meeting room terminal can actually communicate and the state of the meeting room terminal set by the meeting administration server in the meeting room setting information DB.

FIG. 19 illustrates the relationship between whether the meeting room terminal 90 can actually communicate and the state of the meeting room terminal 90 set by the meeting administration server 30 to the meeting room setting information DB 498 in this embodiment.

i) At 09:10, the administrator sets up the meeting room terminal 90, and the meeting room terminal 90 starts acquiring reservation information every 30 seconds. Accordingly, the state of the meeting room terminal 90 set by the meeting administration server 30 to the meeting room setting information DB 498 is also "connecting".

ii) The access time of day updating unit 42 of the meeting administration server 30 specifies the time-out time of the time-out queue 489 by the meeting room ID (more preferably the terminal app ID) included in the reservation information and updates the time-out time to P minutes (for example, 2 minutes) of the initial value each time the acquisition of the reservation information is requested. If there is no meeting room ID (more preferably, the terminal app ID) in the time-out queue 489, an entry (i.e., a meeting room ID and a terminal app ID) is newly registered. Thus, for example, the time-out time is updated every 30 seconds.

iii) Meanwhile, the time-out determination unit 43 of the meeting administration server 30 periodically checks the time-out queue 489 (for example, 30 seconds) to determine whether there is the meeting room terminal 90 that timed out.

TABLE 13

MEETING ROOM SETTING INFORMATION DB

| MEETING ROOM NAME | MEETING ROOM ID | TERMINAL APP ID | STATE OF MEETING TERMINAL | AUTHENICATION KEY | ADMINISTRATION START FLAG | ACCESS TIME OF DAY | COMMUNICATION DISCONNECTION TIME OF DAY |
|---|---|---|---|---|---|---|---|
| MEETING ROOM A | K-001 | AAAA | CONNECTING | ***** | True | 20XX/10/15 12:34 | NA |
| MEETING ROOM B | K-002 | BBBB | CONNECTING | ***** | False | 20XX/10/15 12:48 | 2018/12/25 15:00 |
| MEETING ROOM C | K-003 | CCCC | DISCONNECTED | ***** | True | 20XX/10/15 12:50 | 2018/12/25 14:00 2018/12/25 14:50 |

In this embodiment, a several number of information is newly stored in the meeting room setting information DB 498. Table 13 illustrates an example of the meeting room setting information stored in the meeting room setting information DB 498. Table 13 explains mainly the differences from Table 9.

The meeting room setting information DB 498 in Table 13 has a terminal app ID and a communication disconnection time of day. The terminal app ID is the same as Table 12. The iv) At 09:28, the meeting room terminal 90 ceased to communicate with the meeting administration server 30.

In this case, the access time of day updating unit 42 updates the time-out when requesting the reservation information at 09:27:30, but at 09:28:00, the time-out time is not updated because it is not communicated.

v) because the last time the time-out was updated at 09:27:30, if P minute=2 minutes, the time-out times out at 09:29:30. Because the time-out determination unit 43 detects a time-out time out periodically (for example, 30 seconds), the time-out is detected as about 09:30.

Because the meeting room terminal 90 fails to communicate with the meeting administration server 30 at 09:28 and the meeting administration server 30 detects "disconnected" at 09:30, the time lag (a delay time) between the time when the meeting room terminal 90 fails to communicate with the meeting administration server 30 and the time when the meeting administration server 30 detects "disconnected" can be reduced (in this example, 2 minutes).

vi) When the meeting room is reserved from 09:30, the automatic cancel time is 09:35, and the task execution unit 40 determines whether the reservation is automatically cancel at 09:35. The task execution unit 40 detects that the reservation information associated with the task is not checked in. In this case, the communication disconnection time of day associated with the meeting room ID (preferably the terminal app ID) of the reservation information is read from the meeting room setting information DB 498, and it is determined whether the communication disconnection time of day is included using the check-in possible time of day (for example, 10 minutes before the scheduled start time of day of the meeting) to the present time of day (an automatic cancel time of day).

In this example, because "disconnected" occurring at around 09:30 is known at 09:35, the task execution unit 40 does not cancel the reservation. Even if "connecting" is restored during the duration between 09:30 to 09:35, the automatic cancel can be prevented by checking the communication disconnection time of day.

Thus, by adding the determination of the communication disconnection time of day, it is possible to prevent the meeting administration server 30 from automatically canceling the reservation even when "disconnected" or "connecting" occurs at 09:35 that is the automatic cancel time.

Further, if the reservation is made to start at 10:00 and the user arrives early and enters the room at 09:45, the check-in cannot be performed, and the automatic cancel may be performed in the same way as illustrated in FIG. 17. However, for example, the automatic cancel can be prevented by setting the record of the communication disconnection time of day back to the predetermined time (e.g., 30 minutes) before the scheduled start time of day of the meeting.

In this embodiment, the time-out time of the time-out queue 489 may be monitored without searching all of the meeting room setting information DB 498, but the time-out queue is less computationally loaded than the whole search of the meeting room setting information DB 498 by utilizing the invisible messages provided by the cloud service described above. For example, the calculation amount of the message confirmation performed every 10 to 30 seconds is smaller than the calculation amount for the total search in the meeting room setting information DB 498 every 5 minutes.

Because the period of message confirmation is short, in FIG. 19, the time until the state of the meeting room terminal 90 of the meeting room setting information DB 498 changes to "connected" after the meeting room terminal 90 ceases to communicate with the meeting administration server 30 is shortened compared to FIG. 17 (max. 2 minutes 30 seconds=2 minutes time out time+30 seconds confirmation period at most. Said differently, this 2 minutes 30 seconds can be further shortened if "P minutes=2 minutes" is shortened.

The P minutes may be longer than an acquisition period (e.g., 30 seconds) of the reservation information. For example, the P minutes may be 1 minute. Accordingly, because the time from when the meeting room terminal 90 does not communicate with the meeting administration server 30 until when the meeting administration server 30 detects a disconnection is short, the administrator or the like can respond to at an early stage.

<Transmitting Mail>

When there is a meeting room terminal 90 in which "disconnected" is detected, the mail transmission unit 44 transmits an email to the administrator or the like. However, if, for example, there are many meeting rooms in the company and a problem occurs in the internal LAN, emails as many as the number of meeting room terminals 90 need to be transmitted to the administrator or the like and the administrator must open every email one by one to check their contents.

Therefore, the email transmission unit 44 may transmit the email indicating that there presents the meeting room terminal 90, in which "disconnected" is detected. The time-out determination unit 43 of the meeting administration server 30 lists the meeting room terminal 90 that has timed out in the memory unit 49. The mail transmission unit 44 refers to the list every predetermined time (for example, 5 minutes) to collectively transmit an email indicating that "disconnected" has been detected for at least one meeting room terminal 90 that is listed up to the administrator. Thus, the email received by the administrator or the like may be one regardless of the number of meeting room terminals 90 in which the disconnection is detected, thereby reducing the task of opening the emails and checking their contents.

The mail transmission unit 44 can also transmit an email to the meeting room terminal 90 which has returned to "connecting" during the time of setup. In this case, the meeting room terminal 90 returned from the setup by the terminal state administration unit 41 to "connecting" is listed.

FIG. 20 is an example of the text surface of an email sent by the mail transmission unit 44 to the administrator. As illustrated in FIG. 20, the email includes information 801 about the meeting room terminal 90 that was "disconnected" and information 802 about the meeting room terminal 90 that returned to "connecting" from "during setup". The information 801 regarding the meeting room terminal 90 occurring "disconnected" and the information 802 regarding the meeting room terminal 90 that returns from "during setup" to "connecting" contain items of the final connection time of day, the meeting room name, and the terminal app ID for each meeting room terminal 90. The final connection time of day is the access time of day of accessing the meeting room setting information DB 498.

The administrator or the like can refer to this to go to the meeting room where "disconnected" occurs and fix so that the connection is restored, or confirm that the meeting room terminal 90 which was "disconnected" becomes "connecting".

<Operation Procedure>

Figure 21:
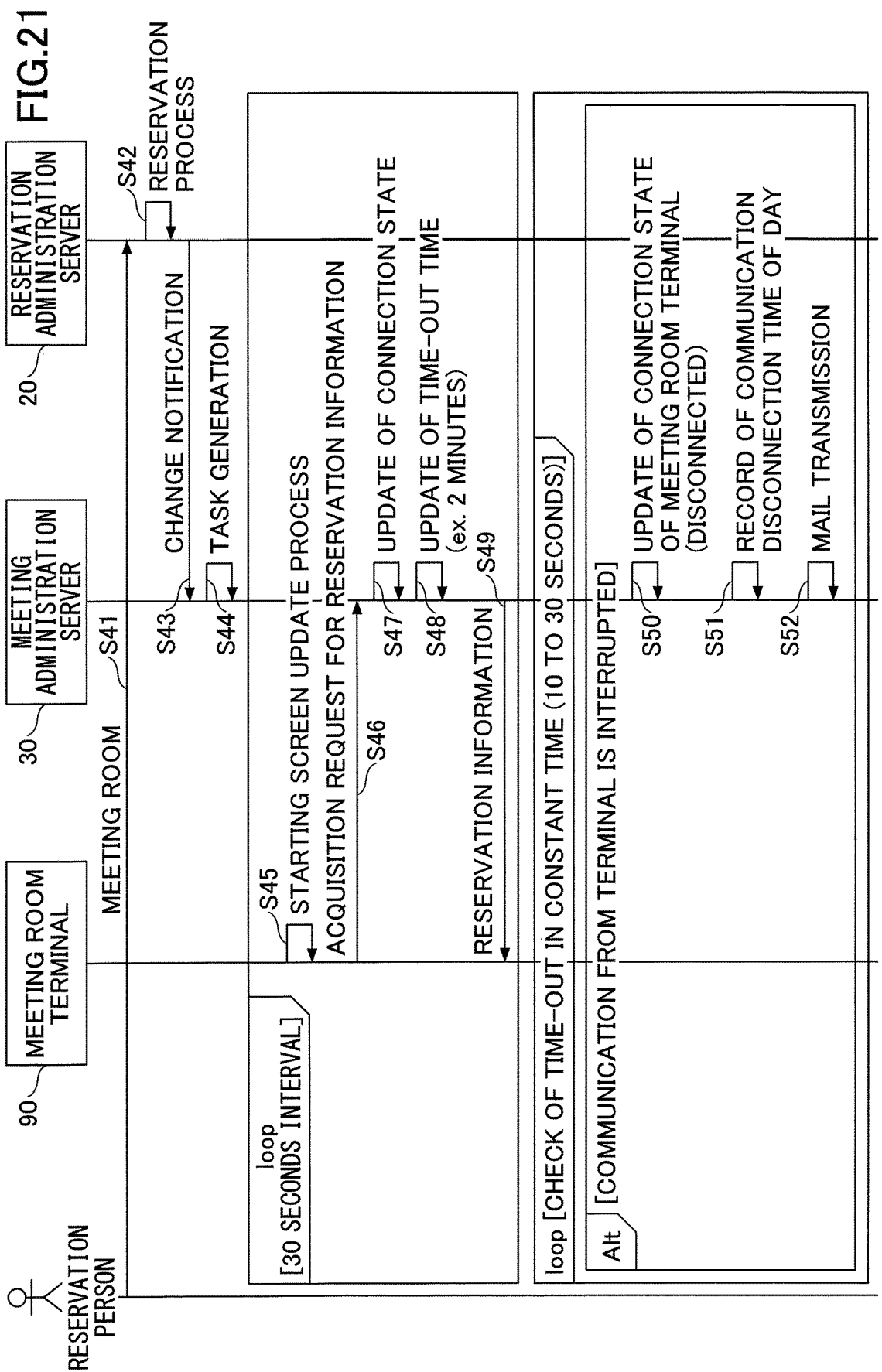
FIG. 21 is an example of a sequence diagram illustrating a communication process between the meeting room terminal and the meeting administration server.

FIG. 21 is an example of a sequence diagram illustrating a communication process between the meeting room terminal 90 and the meeting administration server 30.

S41: The reservation person operates the terminal device 60 to set the reservation of the meeting room to the reservation administration server 20.

S42: The reservation information administration unit 22 of the reservation administration server 20 stores the reservation information in the reservation information DB 291.

S43: The communication unit 21 of the reservation administration server 20 transmits a change in the reservation information to the meeting administration server 30. Accordingly, the reservation information acquiring unit 33 of the meeting administration server 30 requests the reservation information to synchronize the reservation information. The reservation information may be attached to a change notification.

S44: The reservation information acquiring unit 33 generates a task of automatic cancel based on the reservation information and registers the task in the task queue 499.

The following process is performed every polling interval (e.g., 30 seconds) at which a reservation information acquisition request is made.

S45: Because the polling interval is based on the update of the standby screen, the display control unit 94 of the meeting room terminal 90 starts update of the screen.

S46: The reservation information requesting unit 96 of the meeting room terminal 90 designates the meeting administration server 30 in the server URL and transmits the meeting room ID (preferably the terminal app ID) and an authentication key through the transmission unit 31a to request the reservation information.

The communication unit 31 of the meeting administration server 30 receives a request for the reservation information and the reservation information transmitting unit 39 authenticates using the authentication key.

According to this embodiment, the reservation information transmitting unit 39 transmits the reservation information specified by the meeting room ID (preferably the terminal app ID) to the meeting room terminal 90 as the authentication is successful.

S47: Because the communication can be confirmed, the terminal state administration unit 41 updates the state of the meeting room terminal 90 associated with the meeting room ID (preferably the terminal app ID) included in the reservation information acquisition request to "connecting" in the meeting room setting information DB 498.

Similar to the first embodiment, the state of the meeting room terminal 90 may be read from the cache of the meeting room setting information DB 498 and updated only when it is not "connecting".

S48: Because the communication can be confirmed, the access time of day updating unit 42 updates the time-out time associated with the meeting room ID (preferably the terminal app ID) included in the reservation information acquisition request to the initial value in the time-out queue 489. Updating such a timer to its initial value is called resetting the timer.

If the meeting room ID (preferably the terminal app ID) included in the reservation information acquisition request is not registered in the time-out queue, an entry is newly registered. This is done when the connection is disconnected and the entry (data corresponding to one line of the time-out queue 489) is removed from the time-out queue.

S49: The reservation information transmitting unit 39 of the meeting administration server 30 transmits the reservation information to the meeting room terminal 90.

The reservation information requesting unit 96 of the meeting room terminal 90 receives the reservation information through the server communication unit 91. The display control unit 94 updates the standby screen based on the reservation information.

The time-out determination unit 43 checks whether the time-out time of the time-out queue 489 occurs. 30 seconds is an example and may be shorter than 5 to 10 seconds. Alternatively, it may be longer than 30 seconds. Preferably, the load of the meeting administration server 30 is shorter to the extent that the load does not increase too much.

This confirmation is executed repeatedly in a manner independent of the reservation information acquisition request. Then, when there is the meeting room terminal 90 in which the time-out time passes, steps S50 to S52 are executed. In addition, due to the time-out, the entry of the timed-out meeting room terminal 90 is deleted from the time-out queue.

S50: The terminal state administration unit 41 reads the meeting room ID (or the terminal app ID) of the timed-out meeting room terminal 90 from the time-out queue 489 and changes the state of the meeting room terminal 90 associated with the meeting room ID (or the terminal app ID) in the meeting room setting information DB 498 to "disconnected".

S51: The terminal state administration unit 41 records the present date and time (the date and time when connection disconnection is detected) in the item of the communication disconnection time.

S52: The terminal state administration unit 41 retains a list of the meeting room terminal 90 in which the state of the meeting room terminal 90 is changed to "disconnected" and a list of the meeting room terminal 90 in which the state of the meeting room terminal 90 is changed to "connecting". The mail transmission unit 44 transmits an email indicating that there is the meeting room terminal 90 in which a disconnection is detected every certain time to the administrator or the like.

Figure 22:
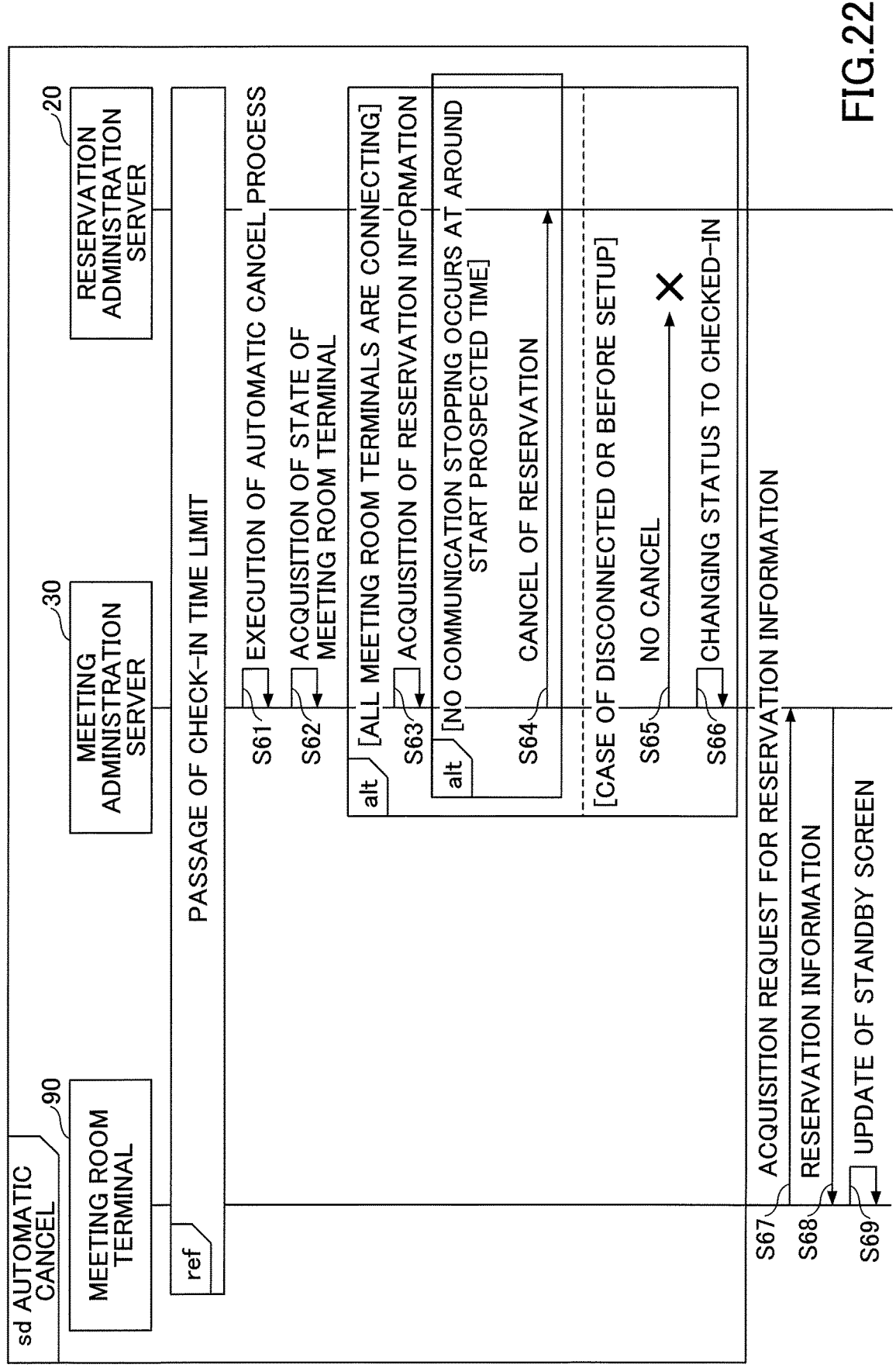
FIG. 22 is an example of a sequence diagram illustrating a process in which a check-in administration unit conducts a cancel of meeting room reservation or not.

Next, a check-out process will be described. FIG. 22 is an example of a sequence diagram illustrating a process in which the check-in administration unit 38 cancels the reservation of a meeting room or not. Referring to FIG. 22, the differences from FIG. 12 will be mainly explained. First, the processes of step S61 and step S62 may be the same as those of steps S21 and S22 of FIG. 12.

S63: Next, steps S63 and S64 are executed when the state of all meeting room terminals 90 disposed in the meeting room is "connecting".

S63: The task execution unit 40 acquires the meeting administration information (reservation information) specified by the reservation ID set for the task from the meeting administration information DB 493. This is to confirm the existence and status of the meeting administration information (reservation information) specified by the reservation ID.

S64: The task execution unit 40 determines whether "disconnected" occurs near the scheduled start time of day of the reservation information.

That is, the communication disconnection time of day is read by referring to the meeting room setting information DB 498 by using the meeting room ID of the reservation information (preferably, by the terminal app ID).

When this communication disconnection time of day is not included in the period from the check-in possible time of day to the automatic cancel time of day, the task execution unit 40 executes the automatic cancel in step S64.

Because a task is executed while the states of all of the meeting room terminals 90 in the meeting room are "connecting" (because the status of the meeting administration information DB is not updated to "already checked", the task execution unit 40 specifies the reservation ID and requests the reservation administration server 20 to cancel the reservation of the meeting room. The information is sufficient to be able to specify the reservation information such as the meeting room ID and meeting time of day, rather than the reservation ID.

Accordingly, the reservation administration server 20 cancels the reservation information. Specifically, reservation information is deleted.

By canceling the reservation of the meeting room in the reservation administration server 20, the canceled reservation information is deleted so that an arbitrary user can reserve the canceled meeting room in a range from the start time of day to the end time of day of the canceled reservation information (enabling registration of the reservation information different from the reservation information canceled for the meeting room in which the reservation information is canceled). Thus, a vacant reservation can be reduced.

When the state of the meeting room terminal 90 is not "connecting" ("disconnecting" or "before setup"), the process may be the same as that of FIG. 12.

Thus, by recording the communication disconnection time of day, it is possible to prevent the automatic cancel even when the state is "connecting" at the determination time of day of determining the automatic cancel although the state is "disconnected" at the time when the user tries to check in. Further, if the range around the scheduled start time of day of the reservation information is widened to a predetermined time of day before the check-in possible time of day, the automatic cancel can be prevented even when the user enters the room early.

[Summary]

As described above, the resource reservation system according to this embodiment can prevent the meeting administration server 30 from automatically canceling the reservation even when the state is "disconnected" or "connecting" at the automatic cancel time is interrupted or connected by adding the determination of the communication disconnection time of day.

Further, because it is possible to set the confirmation of whether a time-out exists (message) in the time-out queue 489 for 10 to 30 seconds or the like shorter than 5 minutes of the first embodiment, it is possible to reduce the time until the state of the meeting room terminal 90 of the meeting room setting information DB 498 changes to "disconnected". In this case, the increase in the processing load can be suppressed.

<Other Applications>

While the preferred embodiment of the present invention has been described with reference to the embodiments, various modifications and substitutions may be made thereto without departing from the spirit and scope of the invention.

A plurality of the meeting administration servers 30 may exist, or the functions of the meeting administration servers 30 may be distributed among a plurality of servers. The reservation administration server 20 and the meeting administration server 30 may be integrated.

The resource reservation system 100 of this embodiment may also be referred to as a web service. The web service is a variety of services provided through the application of Internet-related technology. A meeting room rental service and various rental services can be mentioned. A system that uses the web service is called a system that uses the web service.

Further, configuration examples such as FIGS. 6 and 7 illustrated in the above embodiments are divided according to the main functions for easier understanding of the processes of the resource reservation system 100. However, the present invention is not limited by the method of dividing or the name of each processing unit. The resource reservation system 100 may be divided into further more processing units depending on the processing contents. Alternatively, one processing unit can be divided so as to include more processing.

The functions of the embodiments described above may be implemented by one or more processing circuits. As used herein, a "processing circuit" includes a processor programmed to perform each function by software, such as a processor implemented in electronic circuits, an ASIC (Application Specific Integrated Circuit) designed to perform each function as described above, a digital signal processor (DSP), a field programmable gate array (FPGA), or a conventional circuit module.

A resource reservation system can be provided to suppress the reservation of resource from being canceled when the information processing terminal cannot communicate with the information processing apparatus.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a showing of the superiority or inferiority of the invention. Although the specified equipment has been described in detail, it should be understood that various changes, substitutions, and alterations could be made thereto without departing from the spirit and scope of the invention.

What is claimed is:

1. A resource reservation system for processing a resource reservation, the resource reservation system comprising:
   a hardware information processing terminal that is communicably connected to a hardware information processing apparatus via a network, and that is configured to be associated with a resource, the hardware information processing terminal including:
      a first processor;
      a CMOS sensor that is configured to read an image of a bar code or a two-dimensional code that includes meeting identification information of a meeting, and
      a first memory storing first program instructions that cause the first processor to
         transmit a periodic request for reservation information via the network to a hardware information processing apparatus at a first predetermined interval of time, and
         receive a use start operation to start using the resource for the meeting by causing the CMOS sensor to capture the barcode or the two-dimensional code and reading the barcode or the two-dimensional code; and
   the hardware information processing apparatus that includes:
      a second processor; and
      a second memory storing second program instructions that cause the second processor to
         store reservation information that identifies a reservation for the resource, the reservation information including a use start time of day at which use of the resource is to start,
         record a request reception time that indicates the time of day when the periodic request for reservation information is received from the hardware information processing terminal via the network,
         determine a connectivity between the hardware information processing apparatus and the hardware information processing terminal based on the recorded request reception time,
         transmit the reservation information to the hardware information processing terminal in response to the periodic request for reservation information, and receive a use start notification indicating that use of the resource has started from the hardware information processing terminal, the use start notification being transmitted by the hardware information processing terminal in response to receiving the use start operation, wherein the request reception time is recorded at a second predetermined interval of time that is greater than the first predetermined interval;

the second processor sends a request to cancel the reservation information associated with reservation ID thereof to a reservation management server and controls the reservation management server to automatically cancel the reservation information and make the resource available for another reservation if in a case where the recorded request reception time indicates the periodic request from the hardware information processing terminal for reservation information is received within a constant the first predetermined interval of time and the use start notification is not received within a predetermined time from the use start time of day, and the second processor updates a status of the reservation information associated with reservation ID to checked-in within a meeting, administration information database and control the reservation management server not to cancel the reservation in a case where the recorded request reception time indicates the periodic request for reservation information is not received within the first predetermined interval of time and the connectivity is lost, even if the use start notification is not received within the predetermined time from the use start time of day.

2. The resource reservation system according to claim 1, wherein the reservation information further includes a use end time of day, and the second program instructions further cause the second processor to:

delete the reservation information in a case where the reservation identified by the reservation information is canceled, and enable registration of new reservation information different from the canceled reservation information until the use end time of day indicated in the deleted reservation information.

3. The resource reservation system according to claim 1, wherein the second program instructions further cause the second processor to:

record a third predetermined interval time of day at which a third predetermined interval of time that is longer than the first predetermined interval of time has passed, and determine that the periodic request for reservation information is not received for at least the first predetermined interval of time when the difference between the recorded request reception time and the third predetermined interval time of day exceeds a threshold value.

4. The resource reservation system according to claim 1, wherein the second program instructions further cause the processor to:

determine whether to cancel the reservation information only when the predetermined time passes from the use start time of day.

5. The resource reservation system according to claim 1, wherein the second program instructions further cause the second processor to:

not cancel the reservation information even if the use start notification of the resource is not received within the predetermined time from the use start time of day in a case where the periodic request for reservation information is not received for at least the first predetermined interval of time from the hardware information processing terminal, and the reservation information is set to indicate a reception of the use start notification by assuming that the use start notification has been received.

6. The resource reservation system according to claim 5, wherein the hardware information processing terminal the second program instructions further cause the second processor to:

display a screen for receiving the use start operation to start using the resource based on the reservation information transmitted from the hardware information processing apparatus, display an issue of using the resource on the screen in a case where the hardware information processing terminal receives the reservation information, in which an issue that the information processing apparatus receives the use start notification is set, and display the issue of using the resource on the screen in the case where the hardware information processing terminal receives the reservation information, in which the issue that the information processing apparatus receives the use start notification is set, upon an assumption by the information processing apparatus of receiving the use start notification of the resource.

7. The resource reservation system according to claim 1, wherein the second program instructions further cause the second processor to:

record a determination time when the periodic request for reservation information is determined to be received from the hardware information processing terminal, and determine whether the reservation information is canceled based on the recorded determination time and the use start time of day in a case where the periodic request for reservation information is received within the first predetermined interval of time and the use start notification of the resource is not received within a predetermined time.

8. The resource reservation system according to claim 1, wherein the second program instructions further cause the second processor to:

record a communication disconnection time of day in response to detecting that the periodic request for reservation information is not received for the certain time or longer in association with the hardware information processing terminal, and not cancel the reservation information in a case where the use start notification of the resource is not received within a predetermined time from a possible time of the use start operation of the resource and the communication disconnection time of day is recorded within the predetermined time from the possible time of the use start operation of the resource.

9. The resource reservation system according to claim 8, wherein
the second program instructions further cause the second processor to:
not cancel the reservation information in a case where (i) the use start notification of the resource is not received within the predetermined time from the possible time of the use start operation of the resource, and (ii) the communication disconnection time of day is recorded within the predetermined time from a preset time of day that is earlier than the possible time of the use start operation of the resource.

10. The resource reservation system according to claim wherein
the second program instructions further cause the second processor to:
set a timer that is reset in a case where the periodic request for reservation information is received,
periodically check to determine whether the timer is timed out, and
determine that the periodic request for reservation information is not received for the first predetermined interval of time or longer in a case where the timer is timed out.

11. The resource reservation system according to claim 10, wherein
a count value of the timer is invisible until the timer is timed out.

12. The resource reservation system according to claim 8, wherein
the second program instructions further cause the second processor to:
record a list of a plurality of hardware information processing terminals from which the periodic request for reservation information has not been received for the first predetermined interval of time or longer, and
transmit an email indicating an event to an administrator at every passage of the first predetermined interval of time, the event being the detection of a disconnected state in the plurality of the hardware information processing terminals in the list.

13. A resource reservation method performed by a resource reservation system that reserves a resource and includes a hardware information processing terminal that includes a CMOS sensor that is configured to read an image of a bar code or a two-dimensional code that includes meeting identification information of a meeting, and is communicably connected to a hardware information processing apparatus via a network and that is associated with the resource, and the hardware information processing apparatus the processes a resource reservation, the resource reservation method comprising:
transmitting, by the hardware information processing terminal, a periodic request for reservation information via the network to the hardware information processing apparatus at a first predetermined interval of time;
receiving, by the hardware information processing terminal, a use start operation of starting, using the resource for the meeting by causing the CMOS sensor to capture the barcode or the two-dimensional code and reading the barcode or the two-dimensional code;
storing, by the hardware information processing apparatus, reservation information that identifies a reservation for the resource, the reservation information including a use start time of day at which use of the resource is to start;
recording, by the hardware information processing apparatus, a request reception time that indicates the time of day when the periodic request for reservation information is received from the hardware information processing terminal via the network,
determining, by the hardware information processing apparatus, a connectivity between the hardware information processing apparatus and the hardware information processing terminal based on the recorded request reception time,
transmitting, by the hardware information processing apparatus, the reservation information, to the hardware information processing terminal in response to the periodic request for reservation information;
receiving, by the hardware information processing apparatus, a use start notification indicating that use of the resource has started from the hardware information processing terminal, the user start notification being transmitted by the hardware information processing terminal in response to receiving the use start operation, wherein
the request reception time is recorded at a second predetermined interval of time that is greater than the first predetermined interval;
the hardware information processing apparatus sends a request to cancel the reservation information associated with reservation ID thereof to a reservation management server and controls the reservation management server to automatically cancel the reservation and make the resource available for another reservation in a case where the recorded request reception time indicates the periodic request for reservation information is received within a first predetermined interval of time and if the use start notification is not received within a predetermined time from the use start time of day; and
the hardware information processing apparatus updates a status of the reservation information associated with reservation ID to checked-in within a meeting administration information database and controls the reservation management server not to cancel the reservation in a case where the recorded request reception time indicates the periodic request for reservation information is not received within the first predetermined interval of time and the connectivity is lost, even if the use start notification is not received within the predetermined time from the use start time of day.

14. An information processing apparatus that is communicably connected to a hardware information processing terminal via a network and that performs a process based on reservation information that identifies a reservation for a resource, the hardware information processing terminal including a CMOS sensor that is configured to read an image of a bar code or a two-dimensional code that includes meeting identification information of a meeting, the reservation information including a use start time of day at which use of the resource is to start, the information processing apparatus comprising:
a circuitry; and
a memory device configured to store the reservation information,
the circuitry is configured to:
receive a periodic request for reservation information from the hardware information processing terminal via the network at a first predetermined interval of time via the network, record a request reception time that indicates the time of day when the periodic request for reservation information is received via the network,
determine a connectivity between the hardware information processing apparatus and the hardware information processing terminal based on the recorded request reception time,
transmit the reservation information to the hardware information processing terminal in response to the periodic request for reservation information, and
receive a use start notification indicating that use of the resource has started from the hardware information processing terminal, the use start notification being transmitted in response to the hardware information processing terminal receiving a use start operation to start using the resource for the meeting by causing the CMOS sensor to capture the barcode or the two-dimensional code and reading the barcode or the two-dimensional code, wherein the request reception time is recorded at a second predetermined interval of time that is greater than the first predetermined interval;

a request to cancel the reservation information associated with reservation ID thereof is sent to a reservation management server to control the reservation management server to automatically cancel the reservation and make the resource available for another reservation in a case where the recorded request reception time indicates the periodic request for reservation information is received within the first predetermined interval of time and the use start notification is not received within a predetermined time from the use start time of day, and a status of the reservation information associated with reservation ID is updated to checked-in within a meeting administration information database and the reservation management server is controlled not to cancel the reservation in a case where the recorded request reception time indicates the periodic request for reservation information is not received within the first predetermined interval of time and the connectivity is lost, even if the use start notification is not received within the predetermined time from the use start time of day.

* * * * *